United States Patent
Ibuki

(10) Patent No.: US 7,622,194 B2
(45) Date of Patent: Nov. 24, 2009

(54) OPTICAL FILM, ANTI-REFLECTION FILM, POLARIZING PLATE, AND IMAGE DISPLAY DEVICE

(75) Inventor: Shuntaro Ibuki, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 666 days.

(21) Appl. No.: 11/317,093

(22) Filed: Dec. 27, 2005

(65) Prior Publication Data

US 2006/0141243 A1    Jun. 29, 2006

(30) Foreign Application Priority Data

Dec. 28, 2004    (JP)    ............... 2004-381555

(51) Int. Cl.
*B32B 27/22*    (2006.01)
(52) U.S. Cl. ..................................... 428/447
(58) Field of Classification Search .............. 428/447; 359/896, 483
See application file for complete search history.

(56) References Cited

U.S. PATENT DOCUMENTS 5,753,373 A * 5/1998 Scholz et al. ............... 428/429
7,220,460 B2 * 5/2007 Murakami et al. .......... 427/491

FOREIGN PATENT DOCUMENTS

| JP | 5-17844 B2 | 3/1993 |
| JP | 8-57879 A | 3/1996 |
| JP | 2002-169001 A | 6/2002 |

* cited by examiner

*Primary Examiner*—Margaret G Moore
(74) *Attorney, Agent, or Firm*—Buchanan Ingersoll & Rooney PC

(57) ABSTRACT

An optical film comprises: a transparent support; and at least one functional layer provided the transparent support, wherein an unevenness in thickness of the transparent support is not greater than ±5% from an average thickness, and an unevenness in an amount of surface plasticizer on the transparent support on the functional layer side thereof is not greater than ±20% from an average residual amount of surface plasticizer.

10 Claims, 1 Drawing Sheet

OPTICAL FILM, ANTI-REFLECTION FILM, POLARIZING PLATE, AND IMAGE DISPLAY DEVICE

BACKGROUND OF THE INVENTION

1. Field of the Invention

The present invention relates to an optical film, an anti-reflection film, a polarizing plate comprising the optical film and an image display device comprising the optical film.

2. Description of the Invention

An optical functional film is normally applied to image display devices such as cathode ray tube display device (CRT), plasma display (PDP), electroluminescence display (ELD) and liquid crystal display device (LCD). Examples of such an optical film include anti-reflection films, anti-glare films, light-scattering films, optical compensation films, and polarizing plates.

These optical films are normally prepared by a thin layer forming method involving vacuum evaporation such as sputtering or physical adsorption such as atmospheric plasma evaporation. However, a thin layer forming method involving coating can more easily meet the requirements for larger area and provide a higher productivity than the aforementioned thin forming methods. The demand for this thin layer forming method has been recently growing.

In accordance with the thin layer forming method involving coating, it is often practiced to provide a functional layer by spreading a solution, particularly a solution comprising an organic solvent, over a transparent support. However, since the aforementioned optical films are used in an image display device adapted for viewing, an extremely severe quality against coating defects such as coating streak and drying unevenness is needed. In particular, with the trend for larger image display device screen, even weak coating defects can be easily recognized. It has thus been required that there occur little or no coating defects.

As the transparent support for the aforementioned optical films there is normally used a cellulose acylate film, particularly cellulose triacetate film. The cellulose acylate film is normally produced by a solution film forming method or fusion film forming method. The solution film forming method can produce a film having a higher planarity than the fusion film forming method. For example, JP-B-5-17844 discloses a method of producing a cellulose acylate film. Practically speaking, the solution film forming method has been normally employed.

It is normally practiced to incorporate a plasticizer in such a cellulose acylate film for the purpose of controlling the flexibility and moisture permeability of the transparent support. JP-A-8-57879 discloses a method of controlling the surface plasticizer content.

Referring to the aforementioned cellulose acylate film, the cellulose acylate and the plasticizer can be dissolved in a solvent. Accordingly, in the case where an organic solvent is spread directly over the cellulose acylate film to provide a coat layer, the solubility of the transparent support in the coating solvent and the power of penetration of the coating solution into the transparent support are affected. JP-A-2002-169001 discloses a method of controlling the kind and ratio of solvents having different powers of dissolving the support to control the adhesion and optical properties in the case where an optical functional layer is spread over such a cellulose acylate film.

As mentioned above, in the case where a coating solution comprising an organic solvent is spread over a cellulose acylate film containing a plasticizer, the spreadability and drying ability of the coating solution are affected by the affinity of the cellulose acylate or plasticizer for the organic solvent, the solubility of the cellulose acylate or plasticizer in the organic solvent, etc.

The coating solution normally contains components for forming an optical functional layer or physical functional layer. As a coating solvent, a solvent having a good power of dissolving the components and a good stability is needed. In the case where a coating solution comprising an organic solvent is spread, it is necessary from the standpoint of working atmosphere or residual solvents in the finished optical film that a solvent having little toxicity to human body and ecosystem and environmental safety problems.

SUMMARY OF THE INVENTION

An aim of the invention is to provide an optical film a high quality optical film which can be produced by spreading a coating solution comprising an organic solvent over a cellulose acylate film with a good stability of coating solution and little harmfulness and environmental burden of coating solvent and coating defects such as coating streak and drying unevenness.

Another aim of the invention is to provide a method of producing such an optical film.

A further aim of the invention is to provide a polarizing plate comprising the aforementioned optical film.

A still further aim of the invention is to provide an image display device comprising the aforementioned optical film or polarizing plate.

The inventors made extensive studies. As a result, it was found that the use of a transparent support having specific physical properties during the spreading of a functional layer over the transparent support makes it possible to control the spread and the penetration of solvent and hence provide a good quality optical film having little coating defects such as coating streak and drying unevenness.

In accordance with the invention, an optical film having the following constitution, a production method thereof, and an anti-reflection film, polarizing plate and image display device having the following constitution can be provided to accomplish the aforementioned aims.

1. An optical film wherein the unevenness in thickness of a transparent support having at least one functional layer provided thereon is not greater than ±5% from the average thickness and the unevenness in the amount of surface plasticizer on the transparent support on the functional layer side thereof is not greater than ±20% from the average residual amount of surface plasticizer.

2. The optical film as defined in Clause 1, wherein the unevenness in thickness of the transparent support having at least one functional group provided thereon is not greater than ±5% from the average thickness over a range in the longitudinal direction of not smaller than 1 m and in the crosswise direction of not smaller than 1 m and the unevenness in the amount of surface plasticizer on the transparent support on the functional layer side thereof is not greater than ±20% from the average residual amount of surface plasticizer over a range in the longitudinal direction of not smaller than 1 m and in the crosswise direction of not smaller than 1 m.

3. The optical film as defined in Clause 1 or 2, wherein the average thickness of the transparent support is from not smaller than 20 μm to not greater than 120 μm.

4. The optical film as defined in any one of Clauses 1 to 3, wherein the transparent support is cellulose triacetate.

5. The optical film as defined in any one of Clauses 1 to 4, wherein the at least one functional layer is a low refractive layer and has anti-reflection properties.

6. The anti-reflection film as defined in Clause 5, wherein the low refractive layer comprises at least one particulate silica incorporated therein having an average particle diameter of from not smaller than 30% to not greater than 150% of the thickness of the low refractive layer.

7. The anti-reflection film as defined in Clause 6, wherein the at least one particulate silica incorporated in the low refractive layer is a hollow particulate silica and the refractive index of the particulate silica is from 1.17 to 1.40.

8. The anti-reflection film as defined in any one of Clauses 5 to 7, wherein as the binder for the low refractive layer there is used a fluorine-containing polymer.

9. The anti-reflection film as defined in Clause 8, wherein the fluorine-containing polymer is a copolymer (P) containing a fluorine-containing vinyl monomer polymerizing unit and a polymerizing unit having a (meth)acryloyl group in its side chains and having a main chain composed of only carbon atoms.

10. The anti-reflection film as defined in Clause 9, wherein the copolymer (P) is represented by the following general formula 2:

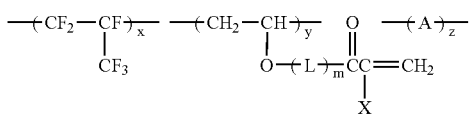

Formula 2 wherein L represents a $C_1$-$C_{10}$ connecting group; m represents 0 or 1; X represents a hydrogen atom or methyl group; A represents an arbitrary vinyl monomer polymerizing unit which may be a single component or may be composed of a plurality of components; and x, y and z each represent the molar percentage of the respective constituent, with the proviso that x, y and z satisfy the relationships $30 \leq x \leq 60$, $5 \leq y \leq 70$ and $0 \leq z \leq 65$.

11. The optical film as defined in any one of Clauses 1 to 10, wherein the at least one functional layer is formed by a coating solution comprising a solvent capable of partially dissolving or swelling the transparent support.

12. The optical film as described in any of Clauses 1 to 11 wherein the at least one functional layer comprises at least one of hydrolysate of organosilane and partial condensate thereof represented by the following general formula 1.

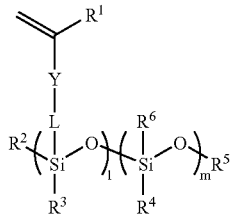

General Formula 1

(In the formula 1, $R^1$ represents a hydrogen atom, a methyl group, a methoxy group, an unsubstituted alkoxycarbonyl group, a cyano group, a fluorine atom, or a chlorine atom.

Y represents a single bond, *—COO—**, *—CONH—**, or *—O—**.

L represents a divalent connecting chain.

$R^2$ to $R^4$ each independently represent a halogen atom, a hydroxyl group, an unsubstituted alkoxy group, or an unsubstituted alkyl group.

$R^5$ represents a hydrogen atom or an unsubstituted alkyl group.

$R^6$ represents a substituted or unsubstituted alkyl group, or a substituted or unsubstituted aryl group.

l represents a number meeting the expression l=100-m, and m represents a number of 0 to 50.

Herein, the hydrolysates and/or their partial condensates may be hydrolysates and/or their partial condensates of plural mixtures of the compounds represented by general formula 1 having particular l and m).

13. The optical film as defined in any one of Clauses 1 to 12, wherein as the at least one functional layer there is provided any of hard coat layer, anti-glare layer, light-diffusing layer and high refractive layer.

14. The optical film as defined in Clause 13, wherein as the at least one functional layer there is provided a high refractive layer and the high refractive layer is a constituent layer having a refractive index of from 1.55 to 2.40 comprising titanium dioxide as a main component and an inorganic particulate material containing at least one element selected from the group consisting of cobalt, aluminum and zirconium.

15. A polarizing plate comprising an optical film defined in any one of Clauses 1 to 14 provided as one of two sheets of protective films for polarizer in the polarizing plate.

16. The polarizing plate as defined in Clause 15, wherein the film other than anti-reflection film among the two sheets of protective films for polarizer is an optical compensation film having an optical compensation layer containing an optically anisotropic layer, the optically anisotropic layer is a layer formed by a compound having a discotic structure unit, the disc surface of the discotic structure unit is disposed obliquely to the surface of the surface protective film and the angle of the disc surface of the discotic structure unit with respect to the surface of the surface protective film changes in the depth direction of the optically anisotropic layer.

17. The polarizing plate as defined in Clause 16, wherein at least one sheet of transparent support among two sheets of protective films for polarizer is a cellulose acylate film satisfying the following relationships (I) and (II):

$0 \leq Re(630) \leq 10$, and $|Rth(630)| \leq 25$     (I)

$|Re(400)-Re(700)| \leq 10$, and $|Rth(400)-Rth(700)| \leq 35$     (II)

18. An image display device comprising: an display; and an optical film defined in any one of Clauses 1 to 14 or a polarizing plate defined in any one of Clauses 15 to 17 provided on the outermost surface of the display.

19. A transmission type, reflection type or semi-transmission type liquid crystal display device of TN, STN, VA, IPS or OCB mode having at least one sheet of polarizing plate defined in any one of Clauses 15 to 17.

Figure 1A:
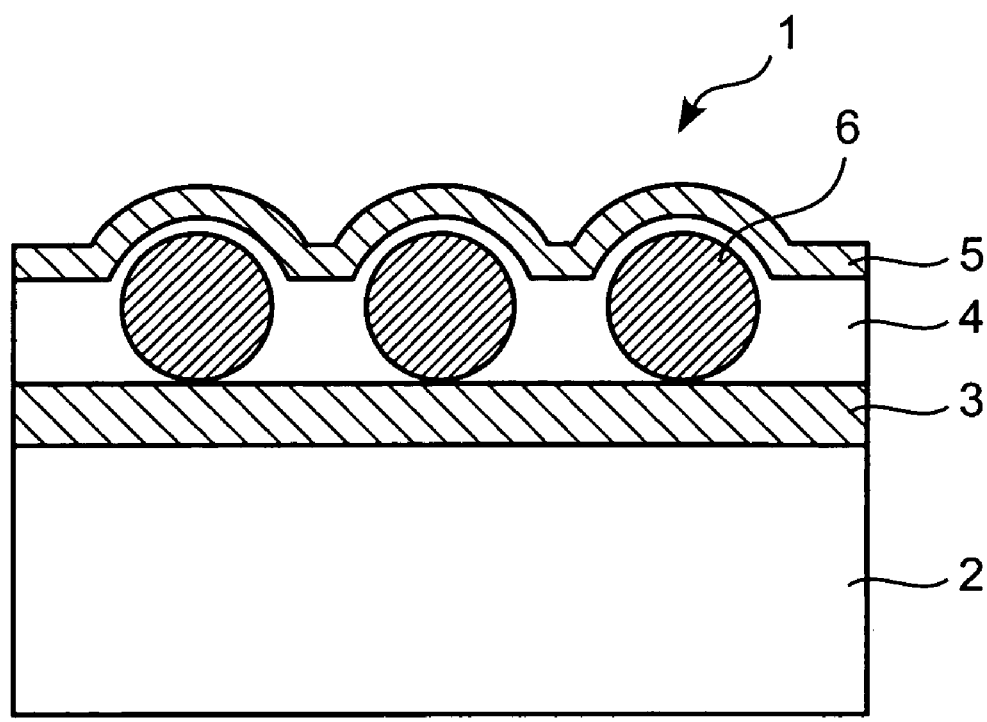
FIG. 1A is diagrammatic sectional view illustrating the layer configuration of an anti-glare anti-reflection film.

1 denotes an anti-reflection film; 2 denotes a transparent support; 3 denotes a hard coat layer; 4 denotes an anti-glare hard coat layer; 5 denotes a low refractive layer; 6 denotes a particulate material; 7 denotes a middle refractive layer; and 8 denotes a high refractive layer.

DETAILED DESCRIPTION OF THE INVENTION

The optical film of the invention will be further described hereinafter.

The optical film of the invention is an optical film formed by a process which comprises spreading a coating solution containing an organic solvent directly over a support made of cellulose acylate film.

The optical film, particularly anti-reflection film, of the invention exhibits an excellent scratch resistance while showing sufficient anti-reflection properties. Further, an image display device comprising the optical film or anti-reflection film of the invention and an image display device comprising a polarizing plate having the optical film or anti-reflection film of the invention undergoes little reflection of external light or background and thus shows an extremely high viewability.

The transparent support, the coat layer on the support and other layers will be sequentially described hereinafter. The term "(numerical value A) to (numerical value B)" as used herein to represent physical properties is meant to indicate "not smaller than (numerical value A) to not greater than (numerical value B)".

<Transparent Support>

As the transparent support for the optical film of the invention there is preferably used a plastic film. Examples of the polymer constituting the plastic film include cellulose acylates (e.g., cellulose triacylate, cellulose diacylate such as TAC-TD80U and TD80UF (produced by Fuji Photo Film Co., Ltd.)), polyamides, polycarbonates, polyesters (e.g., polyethylene terephthalate, polyethylene naphthalate), polystyrenes, polyolefins, norbornene-based resins (Arton, produced by JSR), and amorphous polyolefins (Zeonex, produced by ZEON CORPORATION). Preferred among these polymers are cellulose triacylate, polyethylene terephthalate and polyethylene naphthalate. Particularly preferred among these polymers is cellulose triacylate.

The cellulose acylate film of the invention is obtained by subjecting the following cellulose acylate having various additives incorporated to film-forming process. A solution can be spread over the film support to form a functional layer thereon.

Examples of the cellulose which is a raw material of the cellulose acylate film to be used in the invention include cotton linter, kenaf, and wood pulp (broadleaf tree pulp, needle-leaf tree pulp). Cellulose esters obtained from any raw celluloses may be used. In some cases, these cellulose esters may be used in admixture.

In the invention, cellulose is esterified to prepare cellulose acylate. In particular, cellulose obtained by purifying linter, kenaf or pulp is preferably used.

The term "cellulose acylate" as used herein is meant to indicate a carboxylic acid ester containing a cellulose having from 2 to 22 carbon atoms in total. The $C_2$-$C_{22}$ acyl group in the cellulose acylate of the invention is not specifically limited and may be an aliphatic group or aryl group. Examples of these aliphatic or aryl group include alkylcarbonyl ester, alkenylcarbonyl ester, cycloalkylcarbonyl ester, aromatic carbonylester and aromatic alkylcarbonylester of cellulose which may further have substituted groups. Preferred among these acyl groups are acetyl, propionyl, butanoyl, heptanoyl, hexanoyl, octanoyl, decanoyl, dodecanoyl, tridecanoyl, tetradecanoyl, hexadecanoyl, octadecanoyl, cyclohexanecarbonyl, adamanthanecarbonyl, oleoyl, phenylacetyl, benzoyl, naphthylcarbonyl, and cinnamoyl. More desirable among these acyl groups are acetyl, propionyl, butanoyl, hexanoyl, cyclohexanecarbonyl, dodecanoyl, octadecanoyl, oleoyl, benzoyl, naphthylcarbonyl, and cinnamoyl.

For the details of method for synthesis of cellulose acylate, reference can be made to Kokai Giho No. 2001-1745, Mar. 15, 2001, page 9, Japan Institute of Invention and Innovation.

The cellulose acylate preferably satisfies the following relationships (III) and (IV) with respect to the degree of substitution of cellulose by hydroxyl group:

$$2.3 \leq SA' + SB' \leq 3.0 \tag{III}$$

$$0 \leq SA' \leq 3.0 \tag{IV}$$

wherein SA' represents the degree of substitution of hydrogen atom in the hydroxyl group of cellulose by acetyl group; and SB' represents the degree of substitution of hydrogen atom in the hydroxyl group of cellulose by $C_3$-$C_{22}$ acyl group. SA represents the acetyl group that substitutes the hydrogen atom in the hydroxyl group of cellulose and SB represents the $C_3$-$C_{22}$ acyl group that substitutes the hydrogen atom in the hydroxyl group of cellulose.

The β-1,4-bonded glucose unit constituting the cellulose has a free hydroxyl group in the 2-, 3- and 6-positions. The cellulose acylate is a polymer obtained by esterifying some or whole of these hydroxyl groups by an acyl group. The degree of substitution by acyl group means the ratio of esterification of cellulose each in the 2-, 3- and 6-positions (100% esterification means a substitution degree of 1).

In the invention, the sum (SA'+SB') of the degrees of substitution of hydroxyl group by SA and SB is from 2.6 to 3.0, particularly from 2.80 to 3.00.

The degree (SA') of substitution by SA is preferably from 1.4 to 3.0, particularly from 2.3 to 2.9.

The cellulose acylate of the invention preferably satisfies the following relationship also.

$$0 \leq SB'' \leq 1.2 \tag{V}$$

wherein SB" represents a $C_3$-$C_4$ acyl group that substitutes the hydrogen atom in the hydroxyl group of cellulose.

SB" is preferably a substituent 28% or more, more preferably 30% or more, even more preferably 31% or more, particularly 32% or more of which is a 6-position hydroxyl group. Further, the sum of degree of substitution of hydrogen atom in the 6-position of cellulose acylate by SA' and SB" is preferably 0.8 or more, more preferably 0.85 or more, particularly 0.90 or more. The aforementioned cellulose acylate can form a solution having a desirable solubility. In particular, when dissolved in a nonchlorine-based organic solvent, the aforementioned cellulose acylate can form a good solution.

For the determination of substitution degree, the degree of bonding of aliphatic acid to hydroxyl group in the cellulose is measured. The measurements are then subjected to calculation. The measurement can be made according to ASTM D-817-91 or ASTM D-817-96.

How the hydroxyl group is substituted by acyl group is measured by $^{13}C$-NMR method.

The polymer component constituting the cellulose acylate film of the invention is preferably substantially composed of the above defined cellulose acylate. The term "substantially" as used herein is meant to indicate that the above defined cellulose acylate accounts for 55% by weight or more (preferably 70% by weight or more, more preferably 80% by weight or more) of the total amount of the polymer components. Cellulose acylates may be used singly or in combination of two or more thereof.

The polymerization degree of the cellulose acylate which is preferably used in the invention is from 200 to 700, preferably from 230 to 550, more preferably from 230 to 350, particularly from 240 to 320 as calculated in terms of viscosity-average polymerization degree. For the measurement of average polymerization degree, Uda and et al's intrinsic viscosity method (Kazuo Uda, Hideo Saito, "Journal of The Society of Fiber Science and Technology, Japan", vol. 18, No. 1, pp. 105-120, 1962. For further details, reference can be made to JP-A-9-95538.

The number-average molecular weight Mn of the cellulose acylate is preferably from $7 \times 10^4$ to $25 \times 10^4$, more preferably from $8 \times 10^4$ to $15 \times 10^4$. Mw/Mn, which is the ratio of number-average molecular weight Mn to weight-average molecular weight Mw, is preferably from 1.0 to 5.0, more preferably from 1.0 to 3.0. For the measurement of the average molecular weight and molecular weight distribution of cellulose acylate, high speed liquid chromatography can be used. From the results are calculated Mn and Mw from which Mw/Mn can then be determined.

As the aforementioned cellulose acylate film to be used in the invention there is preferably used one satisfying the aforementioned formulae (1) and (2).

[Plasticizer]

The plasticizer of the invention will be described hereinafter. The plasticizer is a component which is added to provide the cellulose acylate film with flexibility, enhance the dimensional stability of the cellulose acylate film, enhance the moisture resistance of the cellulose acylate film and eliminate curling of the cellulose acylate film. As the plasticizer to be used in the invention there may be used one which has heretofore been known as plasticizer for cellulose acylate. As such a related art plasticizer there is preferably used, e.g., phosphoric acid ester-based plasticizer, phthalic acid ester-based plasticizer, glycolate-based plasticizer or the like. Examples of the phosphoric acid ester-based plasticizer employable herein include triphenyl phosphate, tricresyl phosphate, cresyl diphenyl phosphate, octyl diphenyl phosphate, diphenyl biphenyl phosphate, trioctyl phosphate, and tributyl phosphate. Examples of the phthalic acid ester-based plasticizer employable herein include diethyl phthalate, dimethoxyethyl phthalate, dimethyl phthalate, dioctyl phthalate, dibutyl phthalate, and di-2-ethylhexyl phthalate. Examples of the glycolate-based plasticizer employable herein include butyl phthalyl butyl glycolate, ethyl phthalyl ethyl glycolate, and methyl phthalyl ethyl glycolate. Further, the plasticizer is preferably kept distributed uniformly and stably in the film. The plasticizer preferably exhibits excellent leaching properties and poor hydrolyzability.

Alternatively, as the plasticizer of the invention there is preferably used an aliphatic polyvalent alcohol ester. The aliphatic polyvalent alcohol ester of the invention is an ester of a divalent or higher aliphatic polyvalent alcohol with one or more monocarboxylic acids.

(Aliphatic Polyvalent Alcohol)

The aliphatic polyvalent alcohol to be used in the invention is a divalent or higher alcohol represented by the following general formula A:

$R_1—(OH)_n$      Formula A wherein $R_1$ is an aliphatic organic group having a valency of n; n represents a positive integer of 2 or more; and the plurality of OH groups each independently represent an alcoholic or phenolic hydroxyl group.

Examples of the aliphatic organic group having a valency of n include alkylene groups (e.g., methylene, ethylene, trimethylene, tetramethylene), alkenylene groups (e.g., ethenylene), alkinylene groups (e.g., ethynylene), cycloalkylene groups (e.g., 1,4-cyclohexanediil), and alkanetriil groups (e.g., 1,2,3-propanetriil). Examples of the aliphatic organic group having a valency of n include those having substituents (e.g., hydroxyl group, alkyl group, halogen atom). The valency of n is preferably from 2 to 20.

Preferred examples of the polyvalent alcohol employable herein include adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methyl pentane-1,3,5-triol, pinacol, sorbitol, trimethylol propane, trimethylol ethane, and xylytol. Particularly preferred among these polyvalent alcohols are triethylene glycol, tetraethylene glycol, dipropylene glycol, tripropylene glycol, sorbitol, trimethylol propane, and xylytol.

(Monocarboxylic Acid)

The monocarboxylic acid in the polyvalent alcohol ester of the invention is not specifically limited and may be any known aliphatic monocarboxylic acid, alicyclic monocarboxylic acid, aromatic monocarboxylic acid or the like. The use of the aliphatic monocarboxylic acid or aromatic monocarboxylic acid makes it possible to enhance moisture permeability and retention to advantage. Preferred examples of the monocarboxylic acid include the following compounds, but the invention is not limited thereto. As the aliphatic monocarboxylic acid there is preferably used a $C_1$-$C_{32}$ straight-chain or branched aliphatic acid. The number of carbon atoms in the monocarboxylic acid is more preferably from 1 to 20, particularly from 1 to 10. The incorporation of acetic acid makes it possible to raise the compatibility with cellulose ester. Acetic acid and other monocarboxylic acids are preferably used in admixture.

Preferred examples of the aliphatic monocarboxylic acid employable herein include saturated aliphatic acids such as acetic acid, propionic acid, butyric acid, valeric acid, caproic acid, enanthic acid, caprylic acid, pelargonic acid, capric acid, 2-ethyl-hexanecarboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanic acid, montanic acid, melissic acid and lacceric acid, and unsaturated aliphatic acids such as undecylenic acid, oleic acid, sorbitolic acid, linoleic acid, linolenic acid and arachidonic acid. These aliphatic monocarboxylic acids may further have substituents.

Preferred examples of the alicyclic monocarboxylic acid include carboxylic acids such as cyclopentanecarboxylic acid, cyclohexanecarboxylic acid, cyclooctanecarboxylic acid, bicyclononanecarboxylic acid, bicyclodecanecarboxylic acid, norbornenecarboxylic acid and adamanthanecarboxylic acid, and derivatives thereof. Preferred examples of the aromatic monocarboxylic acid include those obtained by introducing alkyl group into benzene ring in benzoic acid such as benzoic acid and toluic acid, aromatic monocarboxylic acid having two or more benzene groups such as biphenylcarboxylic acid, naphthalinecarboxylic acid and tetralinecarboxylic acid, and derivatives thereof. Particularly preferred among these alicyclic monocarboxylic acids is benzoic acid.

(Polyvalent Alcohol Ester)

The molecular weight of the polyvalent alcohol ester to be used in the invention is not specifically limited and is preferably from 300 to 1,500, more preferably from 350 to 750. From the standpoint of leaching properties, the molecular weight of the polyvalent alcohol is preferably as great as possible. From the standpoint of moisture permeability and compatibility with cellulose ester, on the contrary, the molecular weight of the polyvalent alcohol ester is preferably as small as possible.

The carboxylic acid in the polyvalent alcohol ester of the invention may be single or a mixture of two or more carboxylic acids. All of OH groups in the polyvalent alcohol may be esterified. Alternatively, some of OH groups may be left unesterified. Preferably, 3 or more aromatic ring or cycloalkyl rings may be incorporated in one molecule.

Examples of the polyvalent alcohol ester to be used in the invention will be given below.

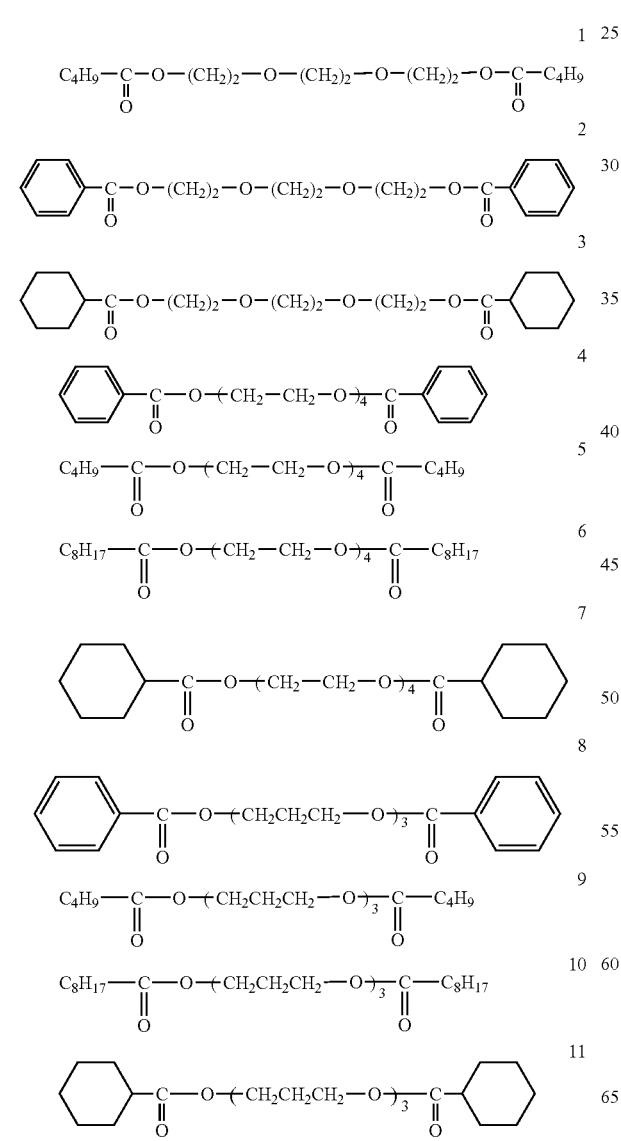
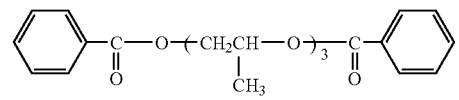
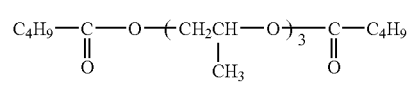
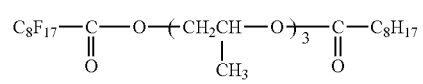
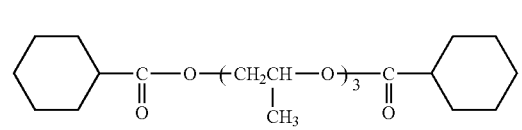
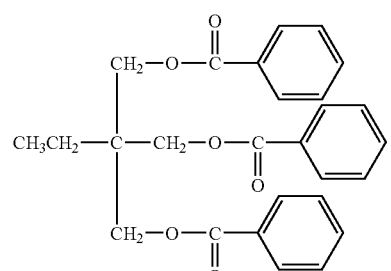
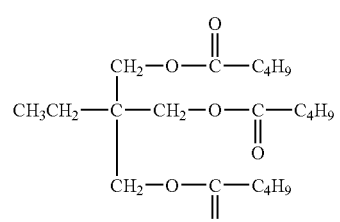
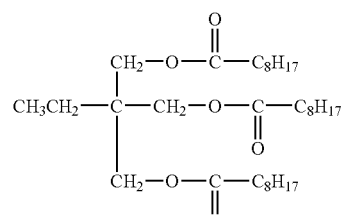
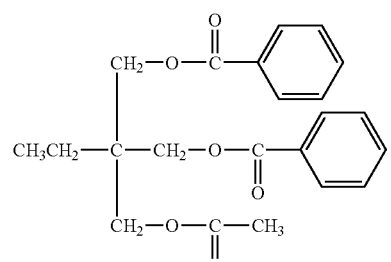

-continued
20
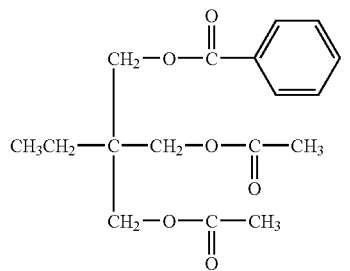
21
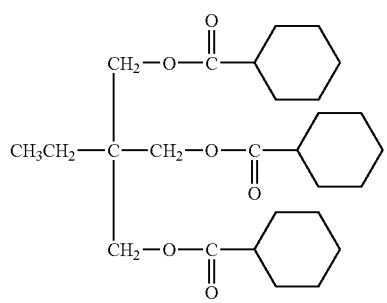
22
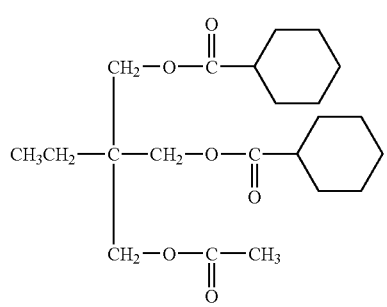
23
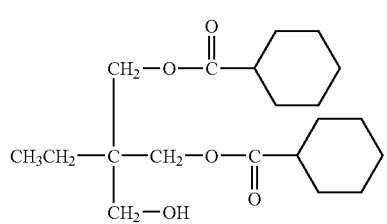
24
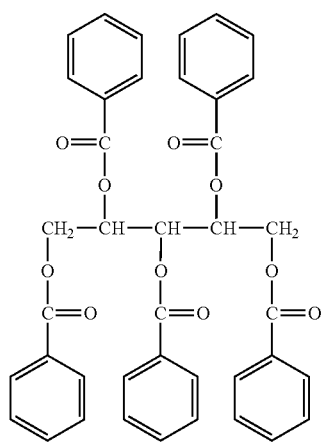
25
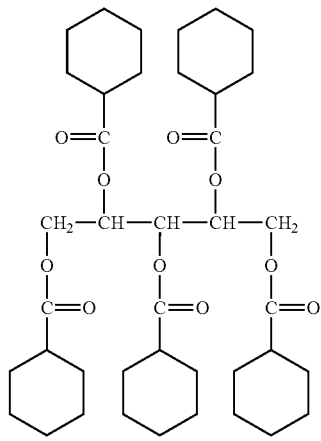
26
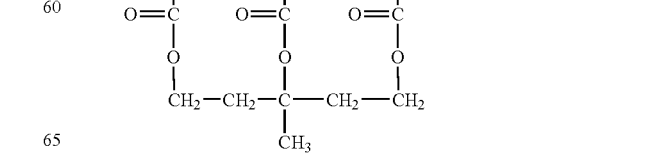
27
28

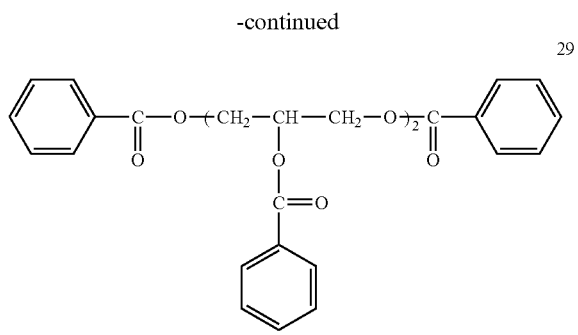

29

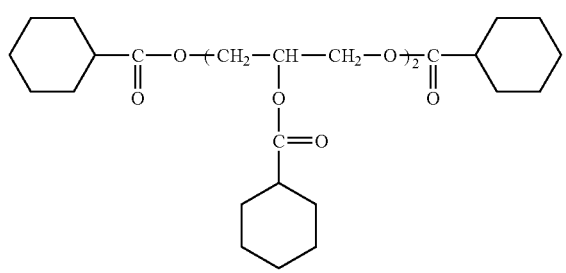

30

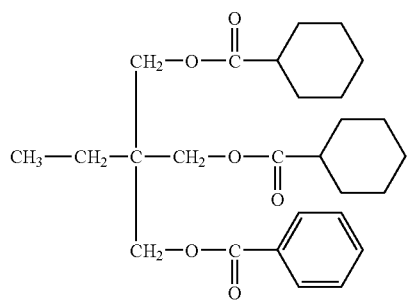

31

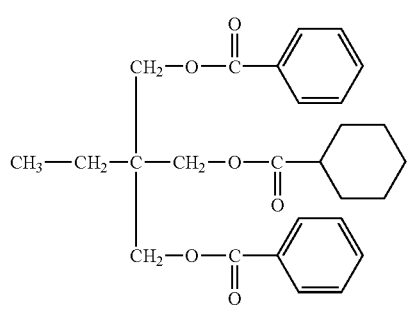

32

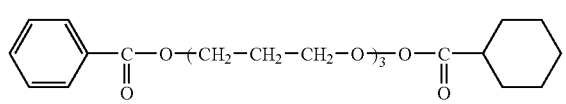

33

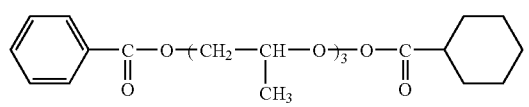

34

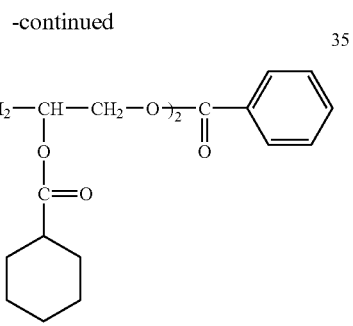

35

The plasticizer which is particularly preferred in the invention preferably has a boiling point of 200° C. or more and stays liquid at 25° C. or is a solid having a melting point of from 25° C. to 250° C. More preferably, the plasticizer has a boiling point of 250° C. or more and stays liquid at 25° C. or is a solid having a melting point of from 25° C. to 200° C. In the case where the plasticizer is a liquid, it is normally purified by distillation at reduced pressure. The pressure during distillation is preferably as low as possible. In the invention, a plasticizer purified at a vapor pressure of 1,333 Pa or less, preferably 667 Pa or less, more preferably from 1 to 133 Pa at 200° C. is preferably used.

Particularly preferred examples of the plasticizer employable herein include phosphoric acid ester-based plasticizers, and aliphatic polyvalent alcohol ester-based plasticizers. Phosphoric acid ester-based plasticizers are preferred.

The moisture permeability of the cellulose acylate film of the invention is preferably from 20 to 300 (g/m²; 24 h, 25° C., 90% RH), more preferably from 20 to 260 (g/m²; 24 h, 25° C., 90% RH), most preferably from 20 to 200 (g/m²; 24 h, 25° C., 90% RH).

The plasticizer of the invention preferably exhibits low leaching properties. The term "leaching properties" as used herein is meant to indicate a nature that when exposed to high temperature and humidity atmosphere, the additives such as plasticizer are precipitated or evaporated out of the film to cause the drop of the weight of the film. In some detail, the sample is allowed to stand at 23° C. and 55% RH for 1 day, and then measured for weight. The sample is then allowed to stand at 80° C. and 90% RH for 2 weeks and then at 23° C. and 55% RH for 1 day. The sample is then measured for weight. The measurements are then subjected to calculation according to the following formula.

Percent leaching={(weight of untreated sample−weight of treated sample)/weight of untreated sample}×100(%)

The percent leaching is preferably 2.0% or less, more preferably 1.0% or less, even more preferably 0.5% or less, still more preferably 0.1% or less.

The kind and amount of the plasticizer to be used herein can be determined from the comprehensive standpoints of view such as physical properties such as flexibility, moisture permeability, leaching properties and adhesion of the film of the invention. However, it was found that the kind and amount of the plasticizer has a great effect on the spreadability of the upper layer coating solution when an organic solvent is spread directly over the cellulose acylate film.

Referring to the cellulose acylate film of the invention, the amount of the plasticizer to be incorporated in the cellulose acylate film is preferably from 3% to 20% by weight, more preferably from 5% to 15% by weight, particularly from 5% to 12% by weight based on the total weight of the film.

It was found that when the coating solution is spread directly over a cellulose acylate film containing a plasticizer of the invention, the unevenness in the amount of the plasticizer in the surface of the film has a great effect on the spreadability and dryability of the coating solution thus spread. The reason for this effect can be thought as follows. In other words, the organic solvent components in the coating solution penetrate into the transparent support. As a result, the coatability of the support changes during spreading. Further, the penetration of the organic solvent components causes the acceleration of drying of the coating solution. Moreover, since the coat layer components penetrate into the support at the same time with the solvent, the surface roughness of the coat layer varies or the agglomeration of particulate components in the coat layer varies. These phenomena affect the unevenness in spreadability and dryability. Somehow, the reduction of the unevenness in the amount of plasticizer in the surface of the cellulose acylate film is effective for the elimination of unevenness in spreadability and dryability.

The content of the plasticizer in the cellulose acylate film can be determined by a method such as infrared absorption spectroscopy (IR) and Fourier transform infrared absorption spectroscopy (FT-IR). In accordance with these methods, the ratio of plasticizer to cellulose acylate is normally determined from the measurements of IR absorption peak of plasticizer and IR absorption peak of cellulose acylate. For example, JP-A-8-57879 discloses a method which comprises measuring the intensity of plasticizer absorption peak ($1,390$ cm$^{-1}$) and cellulose acylate absorption peak ($1,470$ cm$^{-1}$), and then determining the strength ratio. The amount of plasticizer can be determined on the calibration curve of samples having varied plasticizer/cellulose acylate ratios.

The effect of the amount of plasticizer in the surface of the cellulose acylate film on the spreadability of the invention is thought to be remarkable when the plasticizer is present in the region between the surface of the film and a depth of about 5 μm, particularly about 2 μm. In order to measure the amount of plasticizer in the surface of the cellulose acylate film, a film section is prepared. The amount of plasticizer present in the vicinity of surface can be measured by laser transmission IR (in the region between surface and a depth of about 10 μm) or attenuated total reflection IR (ATR-IR) (in the region between surface and a depth of about 2 μm). In the invention, the amount of plasticizer in the surface of the cellulose acylate film is presented by ART-IR measurements because ATR-IR is normally used for surface composition analysis and ATR-IR allows the analysis of composition in the region between surface and a depth of from about 0.2 μm to 2 μm. However, any other measurement methods may be employed so far as the amount of plasticizer can be determined. However, the amount of plasticizer in the surface cannot be defined by the amount of plasticizer in the extreme surface (depth of 0.1 μm or less).

The amount of plasticizer in the surface of the cellulose acylate film of the invention is preferably from 1% to 20% by weight, more preferably from 3% to 15% by weight, even more preferably from 3% to 12% by weight, particularly from 3% to 10% by weight.

In the invention, the less is the unevenness (or variation) in the amount of plasticizer in the surface of the film, the more fairly can be eliminated the unevenness in spreadability and dryability. The unevenness in the amount of plasticizer in the surface of the film is preferably not more than ±20%, more preferably ±15%, even more preferably ±10% of the average residual amount.

Here, "unevenness (or variation) in the amount of plasticizer is preferably not more than ±20% of the average residual amount" means that, when five points equally apart crosswise from each other over 1 m and five points equally apart longitudinally from each other over 1 m, totaling 25 points of the film are sampled to measure the residual amounts of surface plasticizer on the points, each of the residual amounts on the 25 points is preferably not more than ±20% of the average residual amount.

The unevenness in the amount of plasticizer in the surface of the film increases as the area of the cellulose acylate film increases. However, in order to eliminate the unevenness in spreadability and dryability in the invention, the unevenness in the amount of plasticizer in the surface area of 1 m or more, preferably 10 m or more, in the longitudinal direction and 1 m or more, 1.2 m or more, in the crosswise direction preferably falls within the above defined range of average residual amount.

The aforementioned unevenness in the amount of plasticizer in the surface of the film can be varied by the amount of plasticizer to be incorporated in the entire film, the method of casting cellulose acylate, the method of drying the material during casting and the method of drying the material thus casted. In some detail, the time and drying method between the casting of cellulose acylate and the peeling of cellulose acylate film thus casted and the heat treatment method and conveying speed after film formation may be used. These methods will be further described with reference to [Method of producing cellulose acylate film] below.

In the invention, when the amount of plasticizer in the surface of the film is small relative to the amount of plasticizer in the entire film, the coatability of the film can be enhanced while maintaining the flexibility of the film to advantage. The comparison of amount of plasticizer can be confirmed by the comparison of transmission IR of film thickness with surface IR. The amount of plasticizer can be controlled by the aforementioned casting and drying methods.

The cellulose acylate film according to the invention preferably comprises a hydrophobic particulate material incorporated therein to enhance the mechanical strength, dimensional stability and moisture permeability thereof. The primary average particle diameter of the particulate material is preferably from 1 nm to 100 nm from the standpoint of minimization of haze. The apparent specific gravity of the particulate material is preferably 70 g/l or more. The added amount of the particulate material is preferably from 0.01 to 10 parts by weight, particularly from 0.05 to 7 parts by weight based on 100 parts by weight of cellulose acylate.

Specific examples of the particulate material employable herein include inorganic compounds such as compound containing silicon, silicon dioxide, titanium oxide, zinc oxide, aluminum oxide, barium oxide, zirconium oxide, strontium oxide, antimony oxide, tin oxide, tin antimony oxide, calcium carbonate, talc, clay, calcined kaolin, calcined calcium silicate, hydrous calcium silicate, aluminum silicate, magnesium silicate, calcium phosphate, ITO and zinc antimonate. More desirable among these compounds are inorganic compounds containing silicon and zirconium oxide. Silicon dioxide is particularly preferred because it can inhibit the rise of haze of cellulose acylate film.

The particulate material is preferably subjected to hydrophobicization on the surface thereof. As the surface treatment agent there is preferably used an organic compound containing a polar group having affinity for the surface of the particulate material or a coupling agent.

[Ultraviolet Absorber]

The cellulose acylate film of the invention comprises an ultraviolet absorber incorporated therein to enhance the light-resistance thereof or prevent the deterioration of polarizing plate, liquid crystal compound in image display device and image display member such as organic EL compound.

As the ultraviolet absorber there is preferably used one having an excellent ultraviolet absorption capacity at a wavelength of 370 nm or less from the standpoint of prevention of deterioration of liquid crystal and as little visible light absorption as possible at a wavelength of 400 nm or more from the standpoint of image display properties.

Examples of the ultraviolet absorber employable herein include oxybenzophenone-based compounds, benzotriazole-based compounds, salicylic acid ester-based compounds, benzophenone-based compounds, cyanoacrylate-based compounds, and nickel complex-based compounds.

Specific examples of the ultraviolet absorber employable herein will be given below, but the invention is not limited thereto.

2-(2'-Hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl) benzotriazole, 2-(2'-hydroxy-3',5'-di-tert-butylphenyl)-5-chlorobenzotriazole, 2-(2'-hydroxy-3'-(3",4",5",6"-tetrahydrophthalimidemethyl)-5'-methylphenyl)benzotriazole, 2,2-methylenebis(4-(1,1,3,3-tetramethylbutyl)-6-(2H-benzotriazole-2-il)phenol), 2-(2'-hydroxy-3'-tert-butyl-5'-methylphenyl)-5-chlorobenzotriazole, 2,4-dihydroxybenzophenone, 2,2'-dihydroxy-4-methoxybenzophenone, 2-hydroxy-4-methoxy-5-sulfobenzophenone, bis(2-methoxy-4-hydroxy-5-benzoylphenylmethane), (2,4-bis-(n-octylthio)-6-(4-hydroxy-3,5-di-tert-butylanilino)-1,3,5-triazine, 2(2'-hydroxy-3',5'-di-tert-butylphenyl)-5-chlorobenzotriazole, (2(2'-hydroxy-3',5'-di-tert-amylphenyl)-5-chlorobenzotriazole, 2,6-di-tert-butyl-p-cresol, pentaerystyryl-tetrakis[3-(3, 5-di-tert-butyl-4-hydroxyphenyl)propionate], triethylene glycol-bis[3-(3-tert-butyl-5-methyl-4-hydroxyphenyl)propionate], 1,6-hexanediol-bis[3-(3,5-di-tert-butyl-4-hydroxyphenyl)propionate], 2,4-bis-(n-octylthio)-6-(4-hydroxy-3, 5-di-tert-butyrylanilino)-1,3,5-triazine, 2-(2'-hydroxy-4'-hexyloxyphenyl)-4,6-diphenyltriazine, 2,2-thiodiethylenebis[3-(3,5-di-tert-butyl-4-hydroxyphenyl) propionate], octadecyl-3-(3,5-di-tert-butyl-4-hydroxyphenyl)propionate, N,N'-hexamethylenebis(3,5-di-tert-butyl-4-hydroxy-hydrocinnamide), 1,3,5-trimethyl-2,4, 6-tris(3,5-di-tert-butyl-4-hydroxybenzyl)benzene, tris-(3,5-di-tert-butyl-4-hydroxybenzyl)-isocyanurate, phenyl salicylate, p-tert-butyl salicylate, 2,4-dihydroxybenzophenone, 2,2'-dihydroxy-4-methoxy benzophenone, 2-hydroxy-4-methoxy-5-sulfobenzophenone, bis(2-methoxy-4-hydroxy-5-benzoylphenylmethane-2'-ethylhexyl-2-cyano-3,3-diphenyl acrylate, ethyl-2-cyano-3-(3',4'-methylene dioxyphenyl)-2-acrylate.

Further, ultraviolet absorbers disclosed in JP-A-6-148430 are preferred.

Moreover, a hydrazine-based metal deactivator such as N,N'-bis[3-(3,5-di-tert-butyl-4-hydroxyphenyl) propionyl] hydrazine or a phosphor-based working stabilizer such as tris(2,4-di-tert-butylphenyl) phosphite may be used in combination with the aforementioned ultraviolet absorbers.

The added amount of these stabilizer compounds is preferably from 0.0001 to 1.0 parts by weight, more preferably from 0.001 to 0.1 parts by weight based on 100 parts by weight of cellulose acylate.

The ultraviolet absorber according to the invention preferably exhibits a transmission of 20% or less, more preferably 10% or less, even more preferably 5% or less at a wavelength of 370 nm.

Two or more ultraviolet absorbers may be used. The ultraviolet absorber may be incorporated in the dope composition directly or in the form of solution in an organic solvent such as alcohol, methylene chloride and dioxolane. Ultraviolet absorbers in the form of inorganic powder or like form which cannot be dissolved in an organic solvent may be dispersed in an organic solvent and cellulose ester by means of a dissolver or sand mill before being incorporated in the dope.

In the invention, the amount of the ultraviolet absorber to be used is from 0.1 to 15 parts by weight, preferably from 0.5 to 10 parts by weight, more preferably from 0.8 to 7 parts by weight based on 100 parts by weight of cellulose acylate.

As the ultraviolet absorber of the invention there is preferably used also an ultraviolet absorber having little effect such as maladhesion due to precipitation or haze rise. This is a copolymer of an ultraviolet-absorbing monomer having a molar absorptivity of 4,000 or more at 380 nm and an ethylenically unsaturated monomer. An ultraviolet-absorbing copolymer having a weight-average molecular weight of from 2,000 to 20,000 is preferred because it is little precipitated.

When the molar absorptivity of the ultraviolet absorber at 380 nm is 4,000 or more, the ultraviolet-absorbing properties of the ultraviolet absorber is good. The ultraviolet absorber having a molar absorptivity of 4,000 or more at 380 nm exerts a sufficient effect of shielding ultraviolet rays, making it possible to prevent the yellowing of the optical film and hence enhance the transparency of the optical film.

As the ultraviolet-absorbing monomer to be incorporated in the ultraviolet-absorbing copolymer in the invention there is preferably used one having a molar absorptivity of 4,000 or more, preferably 8,000 or more, even more preferably 10,000 or more at 380 nm. When the molar absorptivity of the ultraviolet-absorbing copolymer at 380 nm is less than 4,000, the ultraviolet-absorbing copolymer needs to be added in a large amount to provide desired ultraviolet-absorbing properties. The resulting haze rise or precipitation of ultraviolet absorber causes a remarkable drop of transparency and a great tendency for lower film strength.

The ultraviolet-absorbing monomer to be incorporated in the aforementioned ultraviolet-absorbing copolymer needs to have a molar absorptivity at 400 nm at a ratio of 20 or more to that at 380 nm. When this ratio is less than 20, the resulting ultraviolet-absorbing copolymer is much colored and thus is not suitable for optical film.

In other words, in order to inhibit the absorption of light rays having a wavelength of closer to visible light range and close to 400 nm and obtain desired ultraviolet-absorbing properties, it is preferred in the invention to incorporate an ultraviolet-absorbing monomer having high ultraviolet-absorbing properties.

a. Ultraviolet-absorbing Monomer

Known examples of the ultraviolet-absorbing monomer include salicylic acid-based ultraviolet absorbers (e.g., phenylsalicylate, p-tert-butyl salicylate), benzophenone-based ultraviolet absorbers (e.g., 2,4-dihydroxybenzophenone, 2,2'-dihydroxy-4,4'-dimethoxybenzophenone), benzotriazole-based ultraviolet absorbers (e.g., 2-(2'-hydroxy-3'-tert-butyl-5'-methylphenyl)-5-chlorobenzotriazole, 2-(2'-hydroxy-3',5'-di-tert-butylphenyl)-5-chlorobenzo triazole, 2-(2'-hydroxy-3',5'-di-tert-amyl-phenyl) benzotriazole), cyano acrylate-based ultraviolet absorbers (2'-ethylhexyl-2-cyano-3,3-diphenyl acrylate, ethyl-2-cyano-3-(3',4'-methylene dioxyphenyl)-acrylate), triazine-based ultraviolet absorbers (e.g., 2-(2'-hydroxy-4'-hexyloxyphenyl)-4,6-diphenyltriazine), and compounds disclosed in JP-A-58-185677 and JP-A-59-149350.

As the ultraviolet-absorbing monomer of the invention there is preferably used selectively a polymerizable compound having a molar absorptivity of 4,000 or more at 380 nm having substituents containing ethylenically unsaturated bond incorporated therein and a basic skeleton properly selected from the above exemplified known various types of ultraviolet absorbers. As the ultraviolet-absorbing monomer of the invention there is preferably used a benzotriazole-based compound from the standpoint of storage stability.

A particularly preferred ultraviolet-absorbing monomer is represented by the following general formula 3.

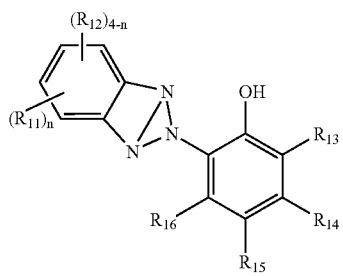

Formula 3 wherein $R^{11}$ represents a halogen atom or a group which substitutes on benzene ring via oxygen atom, nitrogen atom or sulfur atom; $R^{12}$ represents a hydrogen atom, aliphatic group, aromatic group or heterocyclic group; $R^{13}$, $R^{15}$ and $R^{16}$ each independently represent a hydrogen atom, aliphatic group, aromatic group or heterocyclic group; $R^{14}$ represents a group which substitutes on benzene ring via oxygen atom or nitrogen atom, with the proviso that any one of $R^{11}$ to $R^{16}$ has a group having the following structure as a basic structure; and n represents an integer of from 1 to 4:

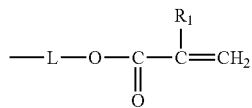

wherein L represents a divalent connecting group; and $R^1$ represents a hydrogen atom or alkyl group.

Preferred examples of the ultraviolet-absorbing monomer to be used in the invention will be given below, but the invention is not limited thereto.

UVM-1

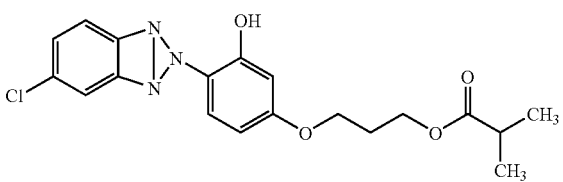

UVM-2

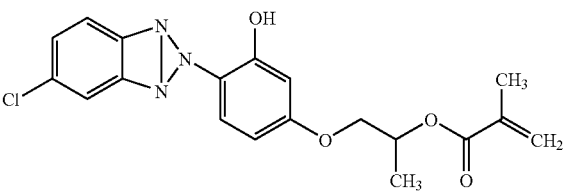

UVM-3

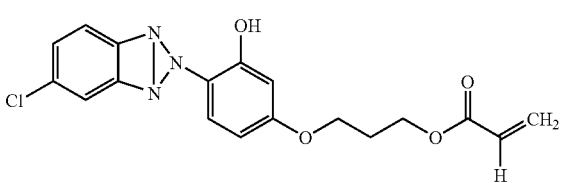

UVM-4

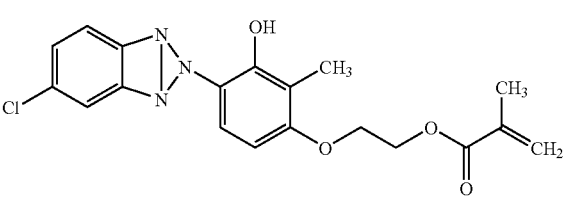

UVM-5

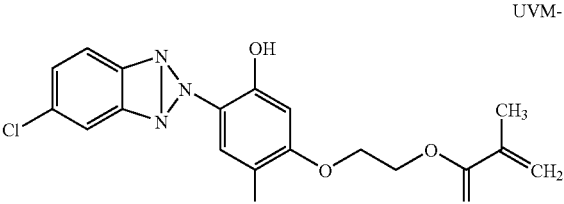

UVM-6

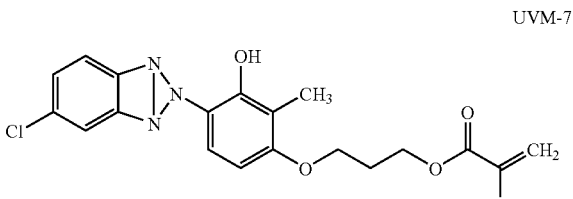

UVM-7

UVM-8

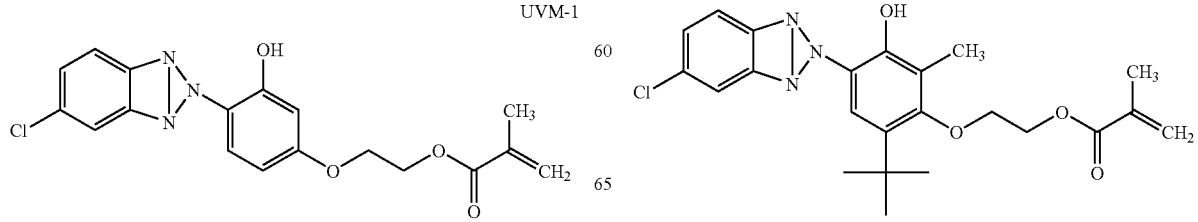

-continued

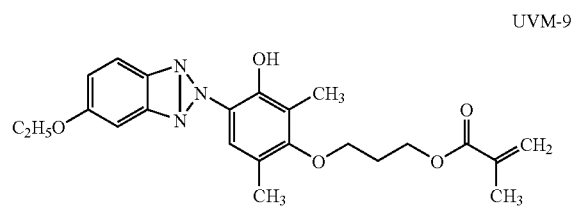
UVM-9

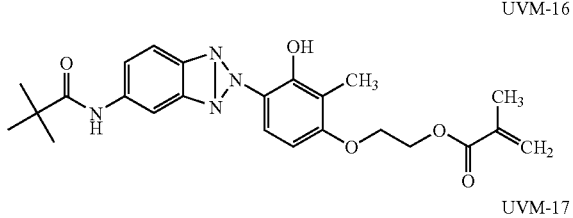
UVM-16

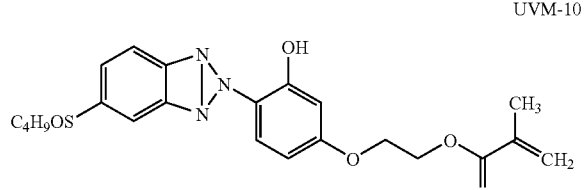
UVM-10

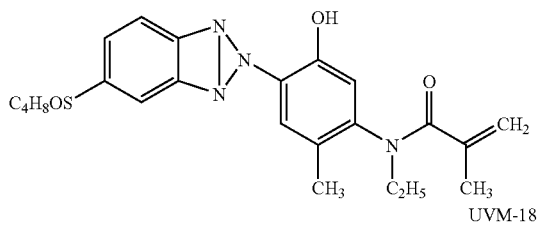
UVM-17

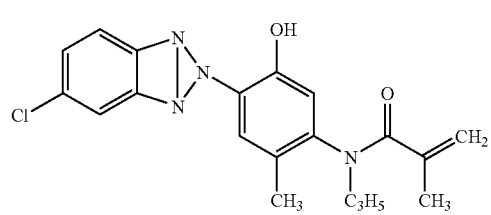
UVM-11

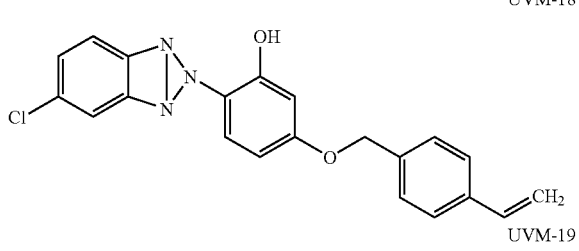
UVM-18

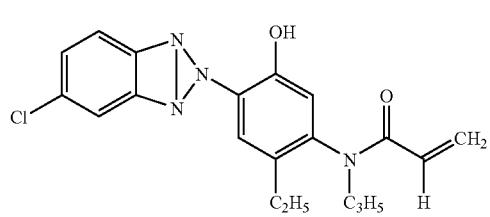
UVM-12

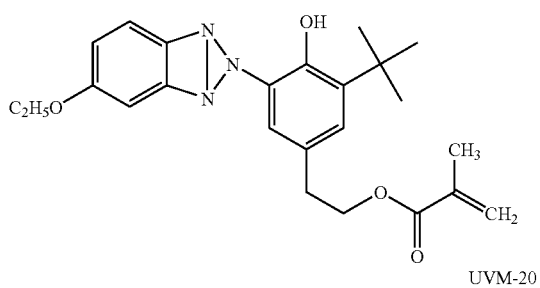
UVM-19

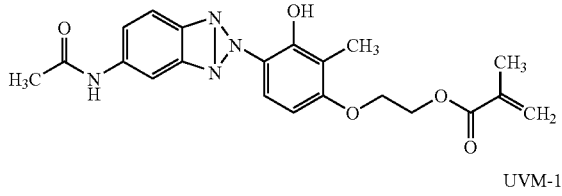
UVM-13

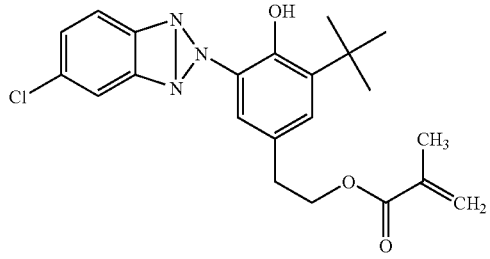
UVM-20

UVM-14

UVM-15 b. Polymer

The ultraviolet-absorbing copolymer which is preferably used in the invention is a copolymer of the aforementioned ultraviolet-absorbing monomer and ethylenically unsaturated monomer. The weight-average molecular weight of the copolymer is preferably from 2,000 to 20,000, more preferably from 7,000 to 15,000.

The ultraviolet-absorbing monomer in the form of homopolymer causes remarkable haze rise and great transparency drop and thus is not suitable for optical film. Further, the ultraviolet-absorbing monomer in the form of homopolymer exhibits a low solubility in solvent and a deteriorated workability in film forming. When the weight-average molecular weight of the copolymer falls within the above defined range, the copolymer exhibits a good compatibility with resin and thus causes no leaching on the surface of the film and no coloring of the film with time.

Examples of the ethylenically unsaturated monomer copolymerizable with the aforementioned ultraviolet-absorbing monomer include methacrylic acid and ester derivatives thereof (e.g., methyl methacrylate, ethyl methacrylate, propyl methacrylate, butyl methacrylate, i-butyl methacrylate, t-butyl methacrylate, octyl methacrylate, cyclohexyl methacrylate, 2-hydroxyethyl methacrylate, 2-hydroxypropyl methacrylate, tetrahydrofuryl methacrylate, benzyl methacrylate, dimethylaminoethyl methacrylate, diethylaminoethyl methacrylate), acrylic acid and ester derivatives thereof (e.g., methyl acrylate, ethyl acrylate, propyl acrylate, butyl acrylate, i-butyl acrylate, t-butyl acrylate, octyl acrylate, cyclohexyl acrylate, 2-hydroxyethyl acrylate, 2-hydroxypropyl acrylate, tetrahydrofuryl acrylate, 2-ethoxyethyl acrylate, diethylene glycol ethoxylate acrylate, 3-methoxybutyl acrylate, benzyl acrylate, dimethylamioethyl acrylate, diethylaminoethyl acrylate), alkyl vinyl ethers (e.g., methyl vinyl ether, ethyl vinyl ether, butyl vinyl ether), alkyl vinyl esters (e.g., vinyl formate, vinyl acetate, vinyl butyrate, vinyl caproate, vinyl stearate), acrylonitrile, vinyl chloride, and styrene.

Preferred among these ethylenically unsaturated monomers are acrylic acid ester having hydroxyl group or ether bond and methacrylic acid ester (e.g., 2-hydroxyethyl methacrylate, 2-hydroxypropyl methacrylate, tetrahydrofuryl methacrylate, 2-hydroxyethyl acrylate, 2-hydroxypropyl acrylate, tetrahydrofuryl acrylate, 2-ethoxyethyl acrylate, diethylene glycol acrylate, 3-methoxybutyl acrylate). These ethylenically unsaturated monomers, singly or in admixture of two or more thereof, may be copolymerized with the ultraviolet-absorbing monomer.

The proportion of the aforementioned ethylenically unsaturated monomer copolymerizable with the aforementioned ultraviolet-absorbing monomer is predetermined taking into account the compatibility of the resulting ultraviolet-absorbing copolymer with the transparent resin, the transparency or mechanical strength of the optical film, the desired ultraviolet absorbing properties, the added amount of copolymer, the haze rise of copolymer, the solubility of copolymer in solvent, etc. Preferably, the two monomers are mixed in such an amount that the ultraviolet-absorbing monomer is incorporated in the copolymer in an amount of from 20% to 70% by weight, more preferably from 30% to 60% by weight.

The polymerization of the ultraviolet-absorbing copolymer of the invention can be carried out by any known method such as radical polymerization, anionic polymerization and cationic polymerization. Examples of the radical polymerization initiator include azo compounds, and peroxides. Specific examples of these compounds include azobisisobutylonitrile (AIBN), azobisisobutylic acid diester derivatives, benzoyl peroxide. The polymerizing solvent to be used herein is not specifically limited but may be an aromatic hydrocarbon-based solvent such as toluene and chlorobenzene, halogenated hydrocarbon-based solvent such as dichloroethane and chloroform, ether-based solvent such as tetrahydrofurane and dioxane, amide-based solvent such as dimethyl formamide, alcohol-based solvent such as methanol, ester-based solvent such as methyl acetate and ethyl acetate, ketone-based solvent such as acetone, cyclohexanone and methyl ethyl ketone or aqueous solvent. When a proper solvent is selected, solution polymerization involving polymerization in a uniform system, precipitation polymerization involving precipitation of resulting polymer or emulsion polymerization involving polymerization in micelle state can be effected.

The weight-average molecular weight of the aforementioned ultraviolet-absorbing copolymer can be adjusted by any known molecular weight adjusting method. Examples of such a molecular weight adjusting method include method involving the addition of a chain transfer agent such as carbon tetrachloride, lauryl mercaptan and octyl thioglycolate. The polymerization temperature is normally from room temperature to 130° C., preferably from 50° C. to 100° C.

The aforementioned ultraviolet-absorbing copolymer is preferably incorporated in the cellulose acylate in a proportion of from 0.01% to 40% by weight, more preferably from 0.5% to 10% by weight. Although there is no restriction as far as the haze of the optical film thus formed is 0.5 or less, preferably 0.2 or less. More preferably, the haze and transmission at 380 nm are 0.2 or less and 10% or less, respectively.

Further, the aforementioned ultraviolet-absorbing copolymer can be incorporated in the transparent resin optionally with other low molecular compounds, polymer compounds and inorganic compounds. For example, the aforementioned ultraviolet-absorbing copolymer and other low molecular ultraviolet absorbers may be incorporated in the transparent resin at the same time. Similarly, additives such as oxidation inhibitor, plasticizer and flame retardant may be also incorporated in the transparent resin.

(Other Additives)

The cellulose acylate composition of the invention may further comprise other various additives (e.g., deterioration inhibitor such as oxidation inhibitor, peroxide decomposer, radical inhibitor, metal deactivator, acid scavenger and amine, optical anisotropy controller, release agent, antistatic agent, infrared absorber) incorporated therein at various steps depending on the purpose. These additives may be in solid or oily form. In other words, these additives are not specifically limited in its melting point or boiling point. Known examples of infrared absorber employable herein include those disclosed in JP-A-2001-194522.

These additives may be added at any time during the preparation of the dope, but a step of adding these additives may be added to the final step during the preparation of the dope. Further, the added amount of the various materials is not specifically limited so far as their functions are performed. In the case where the cellulose acylate film is composed of a number of layers, the kind and added amount of the additives to be incorporated in the various layers may be different. As disclosed in JP-A-2001-151902, this is a technique which has heretofore been known. For the details of the materials which are preferably used herein, reference can be made to Kokai Giho No. 2001-1745, Mar. 15, 2001, pp. 16-22, Japan Institute of Invention and Innovation. It is preferred that these additives be incorporated in a proper amount of from 0.001 to 20% by weight based on the total amount of cellulose acylate.

The thickness of the transparent support of the invention is normally from 20 µm to 120 µm, preferably from 25 µm to 80 µm, even more preferably from 30 µm to 60 µm. When the thickness of the transparent support falls within the above defined range, the break or wrinkling of the support can be inhibited during production. Further, the polarizing plate and display device can be reduced in thickness. Moreover, the transparent support is excellent in optical properties, cost, productivity, workability, etc.

The thickness unevenness is within ±5%, preferably ±4%, more preferably ±3% from the average thickness. When the thickness unevenness falls within this range, the thickness of the support has substantially no effect on anti-reflection properties to advantage.

In order to predetermine the thickness unevenness within ±5%, it is effective to take the following actions:

(1) To exclude low molecular components (oligomer) of cellulose acylate;

(2) To adjust the concentration and viscosity of the solution (dope) having cellulose acylate for constituting the polymer film dissolved in an organic solvent as a main component during casting; and (3) To adjust the drying temperature for the film surface during drying and the air flow, wind direction, etc., if drying air is used. The dissolution step, the casting step and the drying step will be described later with reference to [Method of producing cellulose acylate film].

The transparent support of the invention is preferably in the form of roll of web of continuous length having a length of from 100 m to 5,000 m and a width of from 0.7 m to 2 m. When the transparent support is in the form of roll, the thickness and weight of the optical film, anti-reflection film, polarizing plate protective film and image display device of the invention can be reduced. Further, good optical properties such as enhanced contract and display brightness developed by high transmission can be stably obtained. A wide web of continuous length can be easily handled without having troubles such as wrinkle.

The aforementioned thickness unevenness of the transparent support rises as the area of the cellulose acylate film rises. However, in order to eliminate unevenness in coating and drying in the invention, it is preferred that the thickness unevenness in an area having a size of at least 1 m in the longitudinal direction and 1 m in the crosswise direction fall within the above defined range. It is more desirable that the thickness unevenness in an area having a size of at least 10 m in the longitudinal direction and 1.2 m in the crosswise direction fall within the above defined range.

The crosswise curling of the cellulose acylate film to be used in the invention is preferably from −7/m to +7/m, particularly from −5/m to +5/m. When the crosswise curling of the film falls within the above defined range during the provision of the coat layer described later on the wide cellulose acylate film of continuous length, the film can be easily handled and thus doesn't break. Further, the film doesn't come in strong contact with the conveying roll at the edge of center thereof, causing no attachment of foreign matters to the film and hence making it possible to predetermine the frequency of dot defects or coating streak on the anti-reflection film or polarizing plate within the tolerable range. Moreover, when the curling of the film falls within the above defined range, the entrance of bubbles during the lamination of polarizing layer can be prevented.

The curling can be measured according to the measuring method defined by American National Standards Institute (ANSI/SSCPH1.29-1985).

[Method of Producing Cellulose Acylate Film]

The cellulose acylate film to be used as a support of the invention there is preferably produced by a solvent casting method. In accordance with the solvent casting method, a solution (dope) having the aforementioned cellulose acylate, etc. dissolved in an organic solvent is used.

(Step of Preparing Solution)

The organic solvent to be used in the solvent casting method is not specifically limited so far as it is an organic solvent commonly used in solvent casting method and is preferably one having a solubility parameter of from 17 to 22. Specific examples of the organic solvent employable herein include chlorides of lower aliphatic hydrocarbons, lower aliphatic alcohols, $C_3$-$C_{12}$ ketones, $C_3$-$C_{12}$ esters, $C_3$-$C_{12}$ ethers, $C_5$-$C_8$ aliphatic hydrocarbons, and $C_6$-$C_{12}$ aromatic hydrocarbons.

The ether, ketone and ester may have a cyclic structure. A compound having two or more of any of functional groups (i.e., —O—, —CO—, —COO—) of ether, ketone and ester may be used as an organic solvent. Further, the organic solvent may have other functional groups such as alcoholic hydroxyl group. In the case where the aforementioned organic solvent has two or more functional groups, the number of carbon atoms in the organic solvent may fall within the aforementioned preferred number of carbon atoms in the compound having any functional group.

Specific examples of these organic solvents include compounds disclosed in Kokai Giho No. 2001-1745, pp. 12-16, Japan Institute of Invention and Innovation.

Specific examples of the organic solvent for dissolving cellulose acylate film therein include hydrocarbons (e.g., benzene, toluene), halogenated hydrocarbons (e.g., methylene chloride, chlorobenzene), alcohols (e.g., methanol, ethanol, diethylene glycol), ketones (e.g., acetone), esters (e.g., methyl acetate, ethyl acetate, propyl acetate), and ethers (tetrahydrofurane, methyl cellosolve).

Preferred among these organic solvents are $C_1$-$C_7$ halogenated hydrocarbons, particularly methylene chloride. Further, from the standpoint of solubility of cellulose acylate, releasability from support, mechanical strength of film and physical properties such as optical properties, one or more $C_1$-$C_5$ alcohols are used in admixture besides methylene chloride. The alcohol content is preferably from 2% to 25% by weight, more preferably from 5% to 20% by weight based on the total amount of solvents. Specific examples of the alcohols employable herein include methanol, ethanol, n-propanol, isopropanol, and n-butanol. Preferably, methanol, ethanol, n-butanol or mixture thereof is used.

Technically speaking, a halogenated hydrocarbon such as methylene chloride can be used without any problems. From the standpoint of global environment or working atmosphere, however, the organic solvent is preferably substantially free of halogenated hydrocarbon. The term "substantially free of halogenated hydrocarbon" as used herein is meant to indicate that the proportion of halogenated hydrocarbon in the organic solvent is less than 5% by weight (preferably less than 2% by weight). It is also preferred that no halogenated hydrocarbons such as methylene chloride be detected in the cellulose acylate film thus produced.

Examples of such a non-chlorine-based solvent include solvents disclosed in JP-A-2002-146043, paragraphs [0021]-[0025] and JP-A-2002-146045, paragraphs [0016]-[0021].

The aforementioned non-chlorine-based solvent is preferably a mixture of at least one organic solvent having from 3 to 12 carbon atoms selected from the group consisting of ether, ketone and ester and an alcohol having an alcohol content of from 2% to 40% by weight.

The solvent mixture preferably has an aromatic or aliphatic hydrocarbon having from not smaller than 5 to not greater than 10 carbon atoms incorporated therein in an amount of from not smaller than 0 vol-% to not greater than 10 vol-%. Examples of the hydrocarbon employable herein include cyclohexane, hexane, benzene, toluene, and xylene.

In particular, a mixture of two or more organic solvents is preferably used, particularly a mixture of three or more different organic solvents. It is preferred that the first solvent be a $C_3$-$C_4$ ketone or a $C_3$-$C_4$ ester or mixture thereof, the second solvent be selected from the group consisting of $C_5$-$C_7$ ketones or acetoacetic acid esters and the third solvent be selected from the group consisting of alcohols or hydrocarbons having a boiling point of from 30° C. to 170° C.

It is particularly preferred from the standpoint of solubility of cellulose acylate that a mixture of acetic acid ester, ketone and alcohol in a proportion of from 20% to 90% by weight, from 5% to 60% by weight and from 5% to 30% by weight, respectively, be used.

The mixing proportion of alcohols in the solvent mixture is preferably from not smaller than 2 vol-% to not greater than 40 vol-%, more preferably from not smaller than 3 vol-% to not greater than 30 vol-%, even more preferably from not smaller than 5 vol-% to not greater than 20 vol-%.

Preferred examples of the aforementioned alcohols include $C_1$-$C_8$ monoalcohols and dialcohols, and $C_2$-$C_{10}$ fluoroalcohols. More desirable among these alcohols are methanol, ethanol, 1-propanol, 2-propanol, 1-butanol, 2-butanol, tert-butanol, 1-pentanol, 2-methyl-2-butanol, cyclohexanol, ethylene glycol, 2-fluoroethanol, 2,2,2-trifluoroethanol, and 2,2,3,3-tetrafluoro-1-propanol. These alcohols may be added singly or in admixture of two or more thereof.

The aforementioned dope preferably comprises a fluoroalcohol incorporated therein in an amount of 10% by weight or less, more preferably 5% by weight or less besides the aforementioned organic solvent to enhance the transparency of the film or the solubility of the dope. Examples of the fluoroalcohol employable herein include compounds disclosed in JP-A-8-143709, paragraph [0020] and JP-A-11-60807, paragraph [0037]. These fluoroalcohols may be used singly or in combination of two or more thereof.

In the invention, during the preparation of the aforementioned dope, the vessel may be filled with an inert gas such as nitrogen gas.

The viscosity of the dope shortly before film forming may be such that the dope can be casted during film forming and is preferably from 10 ps.s to 2,000 ps.s, particularly from 30 ps.s to 400 ps.s.

The method of dissolving the dope is not specifically limited. The dissolution of the dope may be effected at room temperature. Alternatively, a cooled dissolution method or a high temperature dissolution method may be used. Alternatively, these dissolution methods may be in combination. For the details of the method of preparing a cellulose acylate solution, reference can be made to JP-A-5-163301, JP-A-61-106628, JP-A-58-127737, JP-A-9-95544, JP-A-10-95854, JP-A-10-45950, JP-A-2000-53784, JP-A-11-322946, JP-A-11-322947, JP-A-2-276830, JP-A-2000-273239, JP-A-11-71463, JP-A-04-259511, JP-A-2000-273184, JP-A-11-323017, and JP-A-11-302388. The aforementioned method of dissolving raw polymer as support in an organic solvent as disclosed in these patents may be applied also to the invention. In the case where cellulose acylate is used as polymer, the cellulose acylate dope solution is then normally subjected to concentration and filtration. For the details of these methods, reference can be made similarly to Kokai Giho No. 2001-1745 page 25, Japan Institute of Invention and Innovation. In the case where dissolution is effected at high temperatures, the temperature is higher than the boiling point of the organic solvent used in most cases. In this case, dissolution is effected under pressure.

The aforementioned plasticizer and particulate material and optionally other additives such as retardation adjustor and ultraviolet absorber are then incorporated in the aforementioned dope.

(Method of Adding Particulate Material)

In the case where the particulate material is added to the cellulose acylate solution, it is important that the aforementioned coarse particles are not present therein and stable dispersion can be made to prevent agglomeration or precipitation. When these requirements can be satisfied, the desired cellulose acylate solution can be obtained without limiting the method. A method is preferably employed which comprises preparing a dispersion of the particulate material separately of the aforementioned dope solution, and then adding the dispersion to the dope which is then dispersed.

The additives other than the particulate material may be added at or after the step of mixing the cellulose acylate with the solvent to prepare a mixture. The additives may be added shortly before the casting of the dope. For this mixing method, a screw type kneader provided on line is used. The additives may be added as they are. Alternatively, the additives are preferably added in the form of solution in a solvent or binder (preferably cellulose acylate). In some cases, the additives are preferably added in the form of dispersion as a stable solution.

(Film Forming Step)

A method of producing a film from the dope in the invention will be described hereinafter. As the method/apparatus for the production of cellulose acylate film there may be used a known solution casting film-forming method/apparatus called drum or band method for the production of cellulose acylate film.

Referring to a step of forming film, the dope (cellulose acylate solution) prepared in the dissolution machine (kiln) is temporarily stored in a storage kiln where it is then defoamed for final adjustment. It is important that the dope thus adjusted is subjected to precision filtration to remove agglomerates and foreign matters therefrom. In some detail, as the filter to be used herein there is preferably used one having as small pore diameter as possible so far as the dope components are not removed. For filtration, a filter having an absolute filtration precision of from 0.1 µm to 100 µm, preferably from 0.1 µm to 25 µm, is preferably used. The thickness of the filter is preferably from 0.1 mm to 10 mm, more preferably from 0.2 mm to 2 mm. In this case, the filtration pressure is preferably 15 kgf/cm$^2$ or less, more preferably 10 kgf/cm$^2$, even more preferably 2 kgf/cm$^2$ or less.

The precision filtration is preferably carried out with some filters having different pore diameters through each of which the dope is filtered in such a manner that the pore diameter decreases sequentially.

The type of the filter material for precision filtration is not specifically limited so far as it has the aforementioned properties but may be filament, felt or mesh. The material of the filter through which the dispersion is precision-filtered is not specifically limited so far as it has the aforementioned properties and has no adverse effects on the coating solution but may be stainless steel, polyethylene, polypropylene or nylon.

The dope thus prepared is fed from the dope discharge outlet to a pressure die through, e.g., a pressure type metering gear pump capable of feeding at constant rate with a high precision according to the rotary speed, and then uniformly casted over a metallic support in the endlessly running casting zone through the slit of the pressure die. When the metallic support is rotated almost one turn, the half-dried dope (also referred to as "web") is peeled off the metallic support on the peeling point. At the subsequent drying step, the web thus obtained is then conveyed by a tenter while being clamped by a clip at its both edges to keep the width constant. Subsequently, the web is conveyed over a group of rolls in the drying device to finish drying. The web thus dried is then wound by a winding machine to a predetermined length. The combination of tenter and group of rolls depends on the purpose.

The metallic support to be used at the casting step preferably has an arithmetic average surface roughness (Ra) of 0.015 μm or less, more preferably from 0.001 μm to 0.01 μm, and a ten-point average surface roughness (Rz) of 0.05 μm or less, more preferably from 0.001 μm to 0.02 μm. Even more preferably, (Ra)/(Rz) ratio is 0.15 or more. By thus keeping the surface roughness of the metallic support within the predetermined range, the web can be easily peeled of the metallic support and the surface conditions of the film thus formed can be kept within the predetermined range of the invention.

As the various production steps (classified as casting (including co-casting), drying, peeling, stretching, etc.) there are preferably used steps described in detail in Kokai Giho No. 2001-1745, pp. 25-30, Japan Institute of Invention and Innovation. At the casting step, one dope may be casted to a single layer. Alternatively, two or more dopes having different polymers dissolved therein may be co-casted by at least any of simultaneous and successive methods.

At the step of casting the cellulose acylate solution, the solution temperature is preferably from −10° C. to 57° C. At the step of casting the cellulose acylate solution, the step temperature is preferably kept at a range of from −10° C. to 57° C. The metallic support over which the cellulose acylate solution is casted preferably has a surface temperature of from −20° C. to 40° C.

In order to effect the step of forming the dope having the aforementioned formulation into a film without causing the agglomeration or maldistribution of the compounds thus incorporated, the drying step is particularly important.

General examples of the method of drying the dope on the support include a method which comprises blowing hot air against the front side of the support (drum or belt), i.e., surface of the web on the support, and a liquid heat transfer method which comprises bringing a temperature-controlled liquid into contact with the side of the belt or drum opposite the dope-casted side thereof to transfer heat to the drum or belt so that the surface temperature thereof is controlled. The back side liquid heat transfer method is preferred. The surface temperature of the support before casting may be arbitrary so far as it is not higher than the boiling point of the solvent incorporated in the dope. However, in order to accelerate drying or allow the dope to lose its fluidity on the support, the surface temperature of the support before casting is preferably predetermined to be from 1° C. to 10° C. lower than the boiling point of the solvent having the lowest boiling point among the solvents used.

The temperature at which the cellulose acylate thus belt-like-casted is dried at the drying step to form a film is preferably from 5° C. to 250° C., particularly from 20° C. to 180° C. In order to remove the residual solvents, it is preferably practiced to dry the dope at a temperature of from 30° C. to 160° C. while blowing hot air having successively varied temperatures to vaporize the residual solvents. For the details of the aforementioned method, reference can be made to JP-B-5-17844. In accordance with this method, the time between casting and peeling can be reduced. The drying temperature, drying air flow rate and drying time differ with the solvent used and thus may be properly predetermined depending on the kind and combination of the solvents used.

The amount of residual solvents in the finished product is preferably 2% by weight or less, more preferably 0.4% by weight or less to exhibit a good dimensional stability. In the invention, a release agent can be used to reduce the peeling time and lower the resistance to peeling so that a cellulose acylate film free from deterioration in surface conditions (e.g., crosswise unevenness during peeling, graininess attributed to gel-like graininess left unpeeled).

In some detail, taking into account the maintenance of good productivity and the inhibition of generation of wind unevenness, the average drying speed between casting and peeling of dope is preferably from more than 300 wt-%/min to not more than 1,000 wt-%, more preferably from more than 400 wt-%/min to not more than 900 wt-%, even more preferably from more than 500 wt-%/min to not more than 800 wt-%.

The term "average drying speed" as used herein is meant to indicate the value obtained by dividing the change of the content of solvent in the dope casted by time.

The average drying speed can be adjusted by properly adjusting the temperature and flow rate of drying air, the concentration of the solvent gas, the surface temperature of the casting support, the temperature, wet thickness and solvent formulation of the dope casted, etc.

(Peeling Step)

This is a step at which the web from which the solvent has been evaporated on the metallic support is peeled at the peeling position. The web thus peeled is then transferred to the subsequent step. When the amount of residual solvents in the web at the peeling time (represented by the following formula) is too high, the web can be difficultly peeled off the metallic support. On the contrary, when web is peeled off the metallic support after being thoroughly dried on the metallic support, the web can be partly broken during the peeling procedure. As a method of raising the film forming speed (made possible because the web is peeled while the residual amount of solvents is as high as possible) there may be used a gel casting method. Examples of the gel casting method employable herein include a method which comprises adding a poor solvent for cellulose ester during doping, casting the dope, and then gelating the dope thus casted, and a method which comprises gelating the dope while lowering the temperature of the metallic support. By gelating the dope on the metallic support so that the strength of the film during peeling can be raised, peeling can be accelerated to raise the film forming speed. The amount of residual solvents after peeling can be determined by the degree of conditions of drying of the web on the metallic support, the length of the metallic support, etc.

It is preferred that the web be peeled while the amount of residual solvents in the web at the peeling position is from 5% to 400% by weight, more preferably from 10% to 350% by weight. In the case where the web is peeled while the residual amount of solvents is higher, when the web is too soft, the film loses its planarity during peeling. Further, cramp or longitudinal streak can easily occur due to peel tension.

In the invention, the residual amount of solvents after peeling can be represented by the following formula.

$$\text{Residual amount of solvents (wt-\%)} = \{(M-N)/N\} \times 100$$

wherein M represents the weight of a web at arbitrary time; and N represents the weight of the web having an initial weight of M which has been dried at 110° C. for 3 hours.

The time required to peel the web off the metallic support is preferably from not smaller than 1 second to not greater than 120 seconds, more preferably from 2 seconds to not greater than 100 seconds, particularly from 3 seconds to not greater than 90 seconds. The less the peeling time is, the higher is the productivity, but the less easily can be handled the web.

During the drying step at which the web thus which has been peeled off the metallic support is dried, the resulting evaporation of solvents causes the film to shrink crosswise. The higher the drying temperature is, the more shrinks the film. The web is preferably dried while being inhibited in shrinkage as much as possible to form a film having a good planarity. In this respect, a method which comprises drying the web with its both crosswise edges retained by a clip during the whole or part of the drying step (tenter process) as disclosed in JP-A-62-46625 is preferably used.

In the invention, the casting speed is preferably from 10 to 200 m/min.

(Drying and Stretching Step)

The web thus peeled is normally then transferred to a drying apparatus where the web is conveyed alternately through zigzag-aligned rolls, a tenter apparatus where the web is conveyed with its both edges clipped by a clip or combination thereof so that it is dried. Referring to the drying means, it is normally practiced to blow hot air against the both sides of the web. However, the web may be irradiated with microwave instead of being blown with hot air. When the web is dried too suddenly, the resulting film can be provided with impaired planarity. The web is normally dried at a temperature of from 40° C. to 250° C., preferably from 40° C. to 180° C. throughout the entity. The drying temperature, drying air flow rate and drying time differ with the solvents used. Accordingly, the drying conditions may be properly predetermined depending on the kind and combination of the solvents used.

Eventually, the web is preferably dried such that the amount of residual solvents in the finished cellulose acylate film is from 0.01% to 1.5% by weight, more preferably from 0.01% to 1.0% by weight.

The aforementioned casting and drying conditions are basically predetermined depending on the casting method, casting speed, peeling method, image quality, etc. However, the amount of plasticizer in the surface can be changed by changing the conditions so far as they can be tolerated. In some detail, the reduction of the amount of plasticizer in the surface can be accomplished by accelerating drying of the web on the metallic support during casting, peeling the web off the metallic support as fast as possible or subjecting the web to heat treatment at a temperature of from 100° C. to 160° C. after the reduction of the amount of residual solvents in the film to 5% by weight or less a disclosed in JP-A-8-57879. Further, the web is dried lower on the side thereof opposite the metallic support and thus has a greater surface plasticizer content than on the side therein in contact with the metallic support. Thus, the web can be worked on the side thereof opposite the metallic support. However, the side of the web opposite the metallic support can cause deterioration of image quality due to the planarity of the film because it doesn't come in contact with the metallic support. Particularly preferred among the aforementioned methods of changing the surface plasticizer content is the method involving heat treatment at a temperature of from 100° C. to 160° C. because it allows the reduction of surface plasticizer content while maintaining the entire plasticizer content. The heat treatment temperature is more preferably from not lower than 120° C. to not higher than 150° C. The heat treatment time is preferably from not smaller than 30 seconds to not greater than 1,200 seconds, more preferably from not smaller than 60 seconds to not greater than 900 seconds, particularly from not smaller than 120 seconds to not greater than 600 seconds.

(Stretching Step)

The aforementioned cellulose acylate film is preferably stretched by a factor of from 0.5% to 300% at least during or after monoaxial casting.

At the casting step, the cellulose acylate film is preferably stretched monoaxially only in one direction such as casting direction (longitudinal direction) or biaxially in two directions, i.e., casting direction and other direction (crosswise direction).

The cellulose acylate film thus prepared may be stretched to adjust the mechanical strength and even the optical properties (retardation value) thereof properly. During the stretching step, the draw ratio is preferably from 3% to 100%.

When either or both of the following stretching methods (1) and (2) are employed, the planarity, strength, optical properties, etc. of the film can be predetermined to fall within the above defined range.

(1) The cellulose acylate film is stretched crosswise by a factor of from 3% to 40%, more preferably from 7% to 38%, even more preferably from 15% to 35%. Subsequently, the cellulose acylate film is treated at a temperature of from 20° C. to 160° C. while being longitudinally expanded by a factor of from not smaller than 0.4% to not greater than 5%, more preferably from not smaller than 0.7% to not greater than 4%, even more preferably from not smaller than 1% to not greater than 3.5%.

(2) The cellulose acylate film is stretched while being given a temperature difference between one side thereof and the other. During casting, the temperature of the surface of the cellulose acylate film in contact with the substrate (band or drum) is predetermined from 2° C. to 20° C., preferably from 3° C. to 15° C., more preferably from 4° C. to 12° C. higher than that of the side thereof opposite the substrate.

In this manner, the uneven distribution of additives (plasticizer, ultrafinely divided particles, ultraviolet absorber, etc.) which have been incorporated in the film at the stretching step can be eliminated. The resulting film has uniform optical properties and enhanced mechanical properties.

Further, the dopes of other functional layers (e.g., adhesive layer, dye layer, anti-static layer, anti-halation layer, UV-absorbing layer, polarizing layer) may be casted at the same time.

As mentioned above, in the invention, the aforementioned support is preferably a cellulose acylate film which is produced by a processing comprising a solution preparing step of dissolving a cellulose acylate in a substantially nonchlorine-based solvent to prepare a cellulose acylate solution, a film forming step of preparing a cellulose acylate film from the cellulose acylate solution and a stretching the cellulose acylate film.

In order to predetermine the variation of the thickness of the cellulose acylate film to fall within ±3%, the following methods are effectively used:

(1) To adjust the concentration and viscosity of the solution (dope) of the cellulose acylate in an organic solvent to be casted.

(2) To adjust the temperature of the surface of the coat to be dried and the flow rate and direction of drying air to be used at the drying step.

[Properties (Surface Shape) of Cellulose Acylate Film]

In the optical film of the invention, the cellulose acylate film used as support preferably has a predetermined surface shape. The surface shape of the cellulose acylate film will be further described hereinafter.

The surface of the aforementioned cellulose acylate film on the side thereof on which the anti-reflection layer is provided has an arithmetical average surface roughness (Ra) of from 0.0005 μm to 0.1 μm, preferably from 0.0002 μm to 0.05 μm, particularly from 0.001 μm to 0.02 μm, a ten-point average surface roughness (Rz) of from 0.001 μm to 0.3 μm, preferably from 0.005 μm to 0.1 μm, particularly from 0.002 μm to 0.05 μm, and a maximum height (Ry) of 0.5 μm or less, preferably 0.3 μm or less, particularly 0.1 μm or less, according to JIS B0601-1994.

When these properties fall within the above defined range, an optical functional layer having uniform coat surface conditions free from unevenness in coating and a good adhesion between support and coat layer can be provided to advantage.

Further, in the fine surface roughness, the ratio (Ra/Rz) of arithmetical average roughness (Ra) to ten-point average roughness (Rz) is preferably 0.1 or more, more preferably 0.15 or more, particularly 0.2 or more and the average gap (Sm) of film surface roughness according to JIS B0601-1994 is preferably 2 μm or less, more preferably from 1 μm to 0.1 μm, particularly from 0.1 μm to 0.001 μm. The relationship between Ra and Rz indicates the uniformity in the surface roughness.

The shape of surface roughness can be evaluated under transmission electron microscope (TEM), atomic power microscope (AFM) or the like.

Further, the number of optical defects having a visual size of 100 μm in the aforementioned cellulose acylate film is preferably 1 or less per m² from the standpoint of elimination of visual defects and enhancement of yield.

This optical defect can be observed with the slow axis of the film disposed parallel to the absorption axis of the polarizer under crossed Nicols using a polarization microscope. Defects which are observed as bright point are area-approximated by circle. Those having a diameter of 100 μm or more are then counted. Bright points having a diameter of 100 μm or more can be easily observed by human eye.

In other words, the aforementioned cellulose acylate film preferably has an arithmetical average surface roughness (Ra) of from 0.0005 μm to 0.1 μm, a ten-point average roughness (Rz) of from 0.001 μm to 0.3 μm and a surface roughness average gap (Sm) of 2 μm or less according to JIS B0601-1994. The number of optical defects having a visual size of 100 μm or more per m² is preferably 2 or less, particularly 1 or less.

[Optical Properties of Film]

The aforementioned cellulose acylate film preferably exhibits a light transmission of 90% or more and a haze of 1% or less, more preferably 92% or more and from 0% to 0.5%, respectively.

The measurement of haze can be carried out according to JIS K-7105 using a haze meter (e.g., MODEL 1001DO haze meter, produced by NIPPON DENSHOKU C., LTD., Type HR-100 haze meter, produced by MURAKAMI COLOR RESEARCH LABORATORY CO., Ltd.).

[Dynamic Properties of Film]

(Tear Strength)

The aforementioned cellulose acylate film preferably exhibits a tear strength of 2 g or more, more preferably from 5 g to 25 g, even more preferably from 6 g to 25 g according to the tear strength testing method specified in JIS K7182-2: 1998 because the strength thereof can be sufficiently maintained even when the thickness thereof falls within the above defined range. The tear strength of the cellulose acylate film is preferably 8 g or more, more preferably from 8 g to 15 g in 60 μm equivalence.

In some detail, a specimen having a size of from 50 mm×64 mm is moisture-conditioned at 25° C. and 65% RH for 2 hours, and then subjected to measurement using a low load tear strength testing machine.

(Scratch Strength)

The scratch strength of the film is preferably 2 g or more, more preferably 5 g or more, particularly 10 g or more. When the scratch strength of the film falls within this range, the scratch resistance and handleability of the film can be kept without any problems.

For the measurement of scratch strength, a sapphire needle having a conical top angle of 90° and a forward end radius of 0.25 m is used to scratch the surface of the support. The load (g) under which the scratch mark can be visually recognized is then determined to evaluate scratch strength.

[Residual Amount of Solvent in Film]

The curling of the support to be used in the invention can be inhibited by predetermining the residual amount of solvents in the support to a range of from 0% to 1.5%, preferably from 0% to 1.0%.

This is presumably because the reduction of the residual amount of solvents during the film formation involving the aforementioned solvent casting method causes the reduction of free volume that exerts a major effect of inhibiting curling.

In some detail, the cellulose acylate film is preferably dried in such a manner that the residual amount of solvents in the cellulose acylate film reaches a range of from 0.01% to 1.5% by weight, more preferably from 0.01% to 1.0% by weight.

[Moisture Permeability and Water Content of Film]

The moisture permeability of the cellulose acylate film to be used in the invention is preferably predetermined within the above defined range as determined according to the method defined in JIS Z0208 (25° C.; 90% RH). In this arrangement, the maladhesion of the anti-reflection layer can be eliminated. At the same time, when incorporated in a liquid crystal display device as a protective film for optical compensation film or polarizing plate, the aforementioned cellulose acylate film causes no change of tint or no drop of viewing angle.

For the details of the method of measuring moisture permeability employable herein, reference can be made to "Kobunshi no Bussei II (Physical Properties of Polymers II)", Institute of Polymer Experiment (4), Kyouritsu Shuppan, pp. 285-294; Measurement of transmission of water vapor (weight process, thermometer process, vapor pressure process, adsorption process).

The water content of the cellulose acylate film is preferably from 0.3 g/m² to 12 g/m², more preferably from 0.5 g/m² to 5 g/m² at 30° C. and 85% RH regardless of the thickness thereof to prevent the impairment of the adhesion thereof to a water-soluble polymer such as polyvinyl alcohol. When the water content of the cellulose acylate film exceeds 12 g/m², the dependence of retardation on moisture change rises to disadvantage.

The cellulose acylate film of the invention may be subjected to surface treatment at least one side thereof. Examples of the surface treatment to be effected herein include vacuum glow discharge treatment, atmospheric plasma discharge treatment, ultraviolet irradiation treatment, corona treatment, flame treatment, acid treatment, and alkali treatment.

<Coating Solution>

The coating solution to be spread over the cellulose acylate film in the invention will be described hereinafter.

In the invention, a coating solution containing an organic solvent is spread directly over the cellulose acylate film. The coating solution containing an organic solvent normally contains components for forming a layer such as optical functional layer and physical functional layer. The term "spread directly over the support" as used herein is meant to indicate that the coating solution is spread over the support with no layers provided interposed therebetween. Accordingly, the cellulose acylate film may be subjected to various surface treatments. Preferably, however, the organic solvent is spread directly over an untreated cellulose acylate film.

Referring to the coating solutions for forming optical functional layer or physical functional layer, the kind of the solvent to be used is selected from the standpoint of the solubility and stability of the components to be incorporated in the coating solution, the dispersion stability of particulate components, etc. From these standpoints of view, ketones, esters, hydrocarbons, halogenated hydrocarbons, etc. are suitable. The organic solvent to be used in the coating solution needs to be used carefully in the spreading taking into account safety on human body and ecosystem, explosion-proof safety, greenhouse effect developed by environmental release, ozone layer destruction, etc. From these standpoints of view, ketone-based and ester-based solvents are suitable and used most commonly.

However, ketone-based and ester-based solvents can dissolve and penetrate the cellulose acylate film of the invention and partially dissolve or swell the transparent support. Therefore, when spread, these solvents may dissolve or penetrate the cellulose acylate film or transparent support to cause the change of spreadability and dryability and the change of penetrating power with drying conditions, resulting in unevenness in coating and drying.

JP-A-2002-169001 discloses a method which comprises mixing the coating solution with a nondissolving solvent besides the solvent capable of dissolving cellulose acylate to adjust the dissolving power and penetrating power. This proposal claims that the change of optical properties by the penetration of the components of the coating solution can be inhibited and the adhesion can be improved by penetration. On the other hand, the inventors made studies of improvement of surface conditions of the coat layer obtained by spreading an organic solvent over a cellulose acylate film. As a result, it was found with respect to the coating solution of the invention that the content of plasticizer in the surface of the cellulose acylate film has a great effect on the surface conditions of the coat layer. It was also found that the content of plasticizer can be properly adjusted taking into account the power of penetration of the solvent seed used into the cellulose acylate film to be used as a substrate.

Specific examples of ketone-based and ester-based solvents to be used in the invention include low boiling solvents having a boiling point of 100° C. or less such as ketones, e.g., acetone (56.1° C.), 2-butanone (=methyl ethyl ketone: MEK, 79.6° C.) and esters, e.g., ethyl formate (54.2° C.), methyl acetate (57.8° C.), ethyl acetate (77.1° C.), isopropyl acetate (89° C.).

Examples of high boiling solvents having a boiling point of 100° C. or more include butyl acetate (126° C.), isobutyl acetate (118° C.), cyclohexanone (155.7° C.), 2-methyl-4-pentanone (=methyl isobutyl ketone: MIBK, 115.9° C.), 2-octanone (173° C.), and diacetone alcohol (168° C.). Preferred among these high boiling solvents include acetone, methyl ethyl ketone, methyl acetate, ethyl acetate, cyclohexanone, methyl isobutyl ketone. However, the organic solvents of the invention are not limited to the aforementioned examples.

It is also preferred that the aforementioned ketone-based or ester-based solvent be mixed with a solvent having little penetration power on cellulose acylate. As such a solvent there may be selected the aforementioned ketone or ester-based solvent having little penetration power or any solvent such as alcohol, amide, ether, ether ester, aliphatic hydrocarbon, aromatic hydrocarbon and halogenated hydrocarbon. Alternatively, the aforementioned ketone-based or ester-based solvent may be used in admixture with a solvent other than organic solvent such as water and fluorine-based solvent. These solvents and their mixing proportion may be properly selected from the standpoint of solubility and reactivity of constituents to be incorporated in the coating solution, stability of particles to be incorporated, dryability at drying step, viscosity adjustment, etc.

Specific examples of the solvent besides the aforementioned ketone-based and ester-based solvents include low boiling solvents having a boiling point of 100° C. or less include hydrocarbons such as hexane (boiling point: 68.7° C.), heptane (98.4° C.), cyclohexane (80.7° C.) and benzene (80.1° C.), halogenated hydrocarbons such as dichloromethane (39.8° C.), chloroform (61.2° C.), carbon tetrachloride (76.8° C.), 1,2-dichloroethane (83.5° C.) and trichloroethylene (87.2° C.), ethers such as diethyl ether (34.6° C.), diisopropyl ether (68.5° C.), dipropyl ether (90.5° C.) and tetrahydrofurane (66° C.), alcohols such as methanol (64.5° C.), ethanol (78.3° C.), 2-propanol (82.4° C.), 1-propanol (97.2° C.), 2-butanol (99.5° C.), and t-butanol (82.5° C.) cyano compounds such as acetonitrile (81.6° C.) and propionitrile (97.4° C.), and carbon disulfide (46.2° C.).

Examples of the solvent having a boiling point of 100° C. or more include octane (125.7° C.), toluene (110.6° C.), xylene (138° C.), tetrachloroethylene (121.2° C.), chlorobenzene (131.7° C.), dioxane (101.3° C.), dibutyl ether (142.4° C.), 1-butanol (117.7° C.), iso-butanol (107.9° C.), propylene glycol monomethyl ether (120° C.), N,N-dimethylformamide (153° C.), N,N-dimethylacetamide (166° C.), and dimethyl sulfoxide (189° C.). However, the organic solvent of the invention is not limited to the aforementioned examples.

Referring to the aforementioned solvents, the kind and formulation of the solvent are preferably selected taking into account the power of penetration of solvent into cellulose acylate film. The penetrating power of various solvents can be judged by the curling of the film coated with the coating solutions containing these solvents or the depth of penetration of the spreading components. As a method of quantitatively examining the power of penetration of solvents into the film as substrate there may be used a method which comprises mixing the solvent with a dye or the like, dipping the cellulose acylate film as substrate in the solvent for a predetermined period of time, withdrawing the cellulose acylate film from the solvent, drying the cellulose acylate film, and then examining the depth of penetration of the dye as viewed on section of the film. In some detail, a Type TD-80U commercially available cellulose triacetate film was dipped in a solvent containing a dye for 2 seconds, and then dried at 45° C. for 5 minutes. As a result, MIBK, MEK, cyclohexanone, acetone, ethyl acetate, toluene and methanol exhibited a penetration power of 0%, 50%, 10%, 100%, 1%, 0% and 1%, respectively. The solvent that can penetrate into the cellulose acylate film is a solvent having a penetration power of about 2% or more as determined according to the aforementioned method. Those having a penetration power of less than 2% can be regarded as solvents that cannot penetrate into the cellulose acylate film. Specific examples of the solvent that can penetrate into the cellulose triacetate film by way of example include ketones such as acetone, MEK, cyclohexanone and diacetone alcohol, and esters such as methyl acetate. Examples of the nonpenetrating solvents include ketones such as MIBK and 2-octanone, esters such as ethyl acetate, hydrocarbon-based solvents such as hexane, cyclohexane, benzene, toluene and xylene, and alcohols such as methanol, ethanol, propanol ad butanol. However, these penetrating/nonpenetrating solvents each act differently with the formulation of the cellulose acylate as substrate, the kind of the plasticizer, etc.

Among the aforementioned solvents, the ketone-based or ester-based solvents of the invention are preferably used in admixture with nonpenetrating solvents. The ketone-based or ester-based solvents of the invention are more preferably penetrating solvents. It is particularly preferred that both the penetrating and nonpenetrating solvents be a ketone-based or ester-based solvent. Particularly preferred from the aforementioned standpoints of view are solvent mixtures such as MEK/MIBK mixture and MIBK/cyclohexanone mixture. The mixing proportion of these solvents can be properly adjusted taking into account dryability, solubility of coating solution components, power of penetration into substrate, etc.

Further, several kinds of solvents having different properties may be used in admixture to adjust the dryability, viscosity, surface tension and other properties of the solvents. The incorporation of a high boiling solvent is particularly preferred to render the components of the coating solution more soluble and stable in dispersion and inhibit the worsening of drying unevenness due to sudden drying of the coating solution and the rise of the water content in the coating solution.

<Spreading of Functional Layer Coating Solution>

The coat layers provided by the spreading of the coating solutions containing organic solvents in the optical film of the invention will be described hereinafter. The coat layers of the invention act as optical functional layer, physical functional layer or the like. Examples of the optical functional layer include anti-glare layer, light-diffusing layer, low refractive layer, high refractive layer, and optical compensation layer. Examples of the physical functional layer include hard coat layer. Of course, one coat layer may act both as optical functional layer and physical functional layer like anti-glare hard coat layer.

In the invention, the coating solutions for anti-glare (hard coat) layer, light-diffusing layer, hard coat layer, etc. are preferably spread directly over the cellulose acylate film.

An embodiment of implementation of the invention will be described hereinafter with reference to the basic configuration of the anti-reflection film as a preferred embodiment of the optical functional film of the invention in connection with the attached drawings.

The diagrammatic sectional view of FIG. 1(a) depicts an example of the anti-reflection film of the invention. An anti-reflection film 1 comprises a transparent support 2 and three functional layers (hard coat layer 3, anti-glare hard coat layer 4, low refractive layer 5) provided therein in this order. The anti-glare hard coat layer 4 comprises a particulate mat 6 dispersed therein. The refractive index of the material other than the particulate mat 6 in the anti-glare hard coat layer 4 is preferably from 1.50 to 2.00. The refractive index of the low refractive layer 5 is preferably from 1.35 to 1.49. In the invention, the functional layer may be a hard coat layer having or free of anti-glare properties. The functional layer may also be a light-diffusing layer. The functional layer may be a single layer or may composed of a plurality of layers, e.g., 2 to 4 layers. The low refractive layer which is a functional layer is provided as an outermost layer.

The low refractive layer preferably satisfies the following relationship (VI) from the standpoint of reduction of reflectance.

$$(m/4) \times 0.7 < n_1 d_1 < (m/4) \times 1.3 \quad (VI)$$

wherein m represents a positive odd number; $n_1$ represents the refractive index of the low refractive layer; $d_1$ represents the thickness (nm) of the low refractive layer; and $\lambda$ represent a wavelength of from 500 nm to 550 nm.

When the aforementioned relationship (VI) is satisfied, it means that there is m (positive odd number which is normally 1) that satisfies the relationship (VI) within the above defined wavelength range.

Figure 1B:
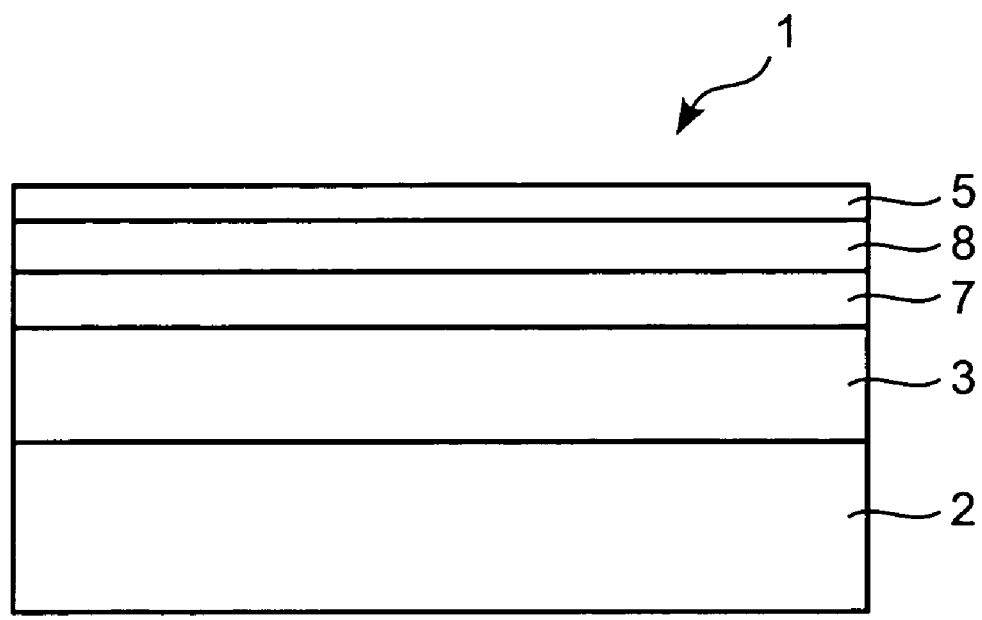
FIG. 1B is a diagrammatic sectional view illustrating the layer configuration of an anti-reflection film having excellent anti-reflection properties.

The diagrammatic sectional view of FIG. 1(b) depicts another example of the anti-reflection film of the invention. An anti-reflection film 1 comprises a transparent support 2, various functional layers (hard coat layer 3, middle refractive layer 7, high refractive layer 8), and low refractive layer (outermost layer) 5 provided therein in this order. The transparent support 2, the middle refractive layer 7, the high refractive layer 8 and the low refractive layer 5 have a refractive index satisfying the following relationship.

Refractive index of high refractive layer>refractive index of middle refractive layer>refractive index of transparent support>refractive index of low refractive layer Referring to the layer configuration as shown in FIG. 1(b), the middle refractive layer, the high refractive layer and the low refractive layer satisfy the following relationships (VII), (VIII) and (IX), respectively, to prepare an anti-reflection film having better anti-reflection properties as disclosed in JP-A-59-50401.

$$(h\lambda/4) \times 0.7 < n_1 d_1 < (h\lambda/4) \times 1.3 \quad (VII)$$

In the relationship (VII), h represents a positive integer (normally 1, 2 or 3), $n_1$ represents the refractive index of the middle refractive layer, $d_1$ represents the thickness (nm) of the middle refractive layer, and $\lambda$ represents the wavelength (nm) of visible light of from 380 nm to 680 nm.

$$(i\lambda/4) \times 0.7 < n_2 d_2 < (i\lambda/4) \times 1.3 \quad (VIII)$$

In the relationship (VIII), i represents a positive integer (normally 1, 2 or 3), $n_2$ represents the refractive index of the high refractive layer, $d_2$ represents the thickness (nm) of the high refractive layer, and $\lambda$ represents the wavelength (nm) of visible light of from 380 nm to 680 nm.

$$(j\lambda/4) \times 0.7 < n_3 d_3 < (j\lambda/4) \times 1.3 \quad (IX)$$

In the relationship (IX), j represents a positive odd number (normally 1), $n_3$ represents the refractive index of the low refractive layer, $d_3$ represents the thickness (nm) of the low refractive layer, and $\lambda$ represents the wavelength (nm) of visible light of from 380 nm to 680 nm.

In the layer configuration as shown in FIG. 1(b), it is particularly preferred that the middle refractive layer, the high refractive layer and the low refractive layer satisfy the following relationships (X), (XI) and (XII), respectively, in which $\lambda$ is 500 nm, h is 1, i is 2 and j is 1.

$$(h\lambda/4) \times 0.80 < n_1 d_1 < (h\lambda/4) \times 1.00 \quad (X)$$

$$(i\lambda/4) \times 0.75 < n_2 d_2 < (i\lambda/4) \times 0.95 \quad (XI)$$

$$(j\lambda/4) \times 0.95 < n_3 d_3 < (j\lambda/4) \times 1.05 \quad (XII)$$

The terms "high refractive layer, middle refractive layer, low refractive layer" as used herein are meant to indicate the relative difference in refractive index between layers. In FIG. 1(b), the high refractive layer is shown as a light interference layer. In this arrangement, an anti-reflection film having extremely excellent anti-reflection properties can be prepared.

The various functional layers of the optical film of the invention will be further described hereinafter.

[Anti-glare Hard Coat Layer]

The anti-glare hard coat layer of the invention will be described hereinafter.

The anti-glare hard coat layer is mainly composed of a binder for providing hard coat properties, a particulate mat for providing anti-glare properties, an inorganic filler for enhancing refractive index and strength and preventing crosslink shrinkage, etc.

As the binder there is preferably used a polymer having a saturated hydrocarbon chain or polyether chain, more preferably saturated hydrocarbon chain, as a main chain. The binder polymer preferably has a crosslinked structure.

As the binder polymer having a saturated hydrocarbon chain as a main chain there is preferably used a polymer of ethylenically unsaturated monomers (binder precursor). As the binder polymer having a saturated hydrocarbon chain as a main chain and a crosslinked structure there is preferably used a (co)polymer of monomers each having two or more ethylenically unsaturated groups.

In order to provide a higher refractive index, the structure of the monomer preferably contains an aromatic ring or at least one atom selected from the group consisting of halogen atom except fluorine, sulfur atom, phosphorus atom and nitrogen atom.

Examples of the aforementioned binder include polyfunctional monomers and polyfunctional oligomers having radical-polymerizable or cationically-polymerizable group.

Examples of the radical-polymerizable functional group include ethylenically unsaturated groups such as (meth)acryloyl group, vinyloxy group, styryl group and allyl group. Particularly preferred among these ethylenically unsaturated groups is (meth)acryloyl group. A polyfunctional monomer containing two or more radical polymerizable groups per molecule is preferably included.

The radical polymerizable polyfunctional monomer is preferably selected from the group consisting of compounds each having at least two terminal ethylenically unsaturated bonds. Preferably, a compound having from 2 to 6 terminal ethylenically unsaturated bonds per molecule is used. Such a compound group is well known in the art of polymer material. In the invention, these compounds may be used without limitation. These compounds may be used in any chemical form such as monomer, prepolymer (i.e., dimer, trimer, oligomer), mixture thereof and copolymer thereof.

Preferred examples of these binder components include resins having an acrylate-based functional group such as relatively low molecular polyester resin, polyether resin, acrylic resin, epoxy resin, urethane resin, alkyd resin, spiroacetal resin, polybutadiene resin, polythiol polyene resin, and oligomer or prepolymer of (meth)acrylate of polyfunctional compound such as polyvalent alcohol (hereinafter, acrylate and methacrylate will be together referred to as "(meth)acrylate"). Specific examples of the polyfunctional monomer include trimethyolpropane tri(meth)acrylate, EO-modified trimethylolpropane tri (meth)acrylate, ditrimethylolpropane tetra(meth) acrylate, hexanediol (meth)acrylate, tripropylene glycol di(meth)acrylate, diethylene glycol di(meth) acrylate, pentaerythritol tri(meth)acrylate, dipentaerythritol hexa(meth)acrylate, mixture of dipentaerythritol hexa(meth)acrylate and penta (meth)acrylate, 1,6-hexanediol di(meth)acrylate, and neopentyl glycol di(meth)acrylate. These polyfunctional monomers are preferably mixed with monofunctional monomers such as ethyl (meth)acrylate, ethylhexyl (meth)acrylate, styrene, vinyl toluene and N-vionylpyrrolidone.

Examples of the polymerizable ester compound of aliphatic polyvalent alcohol compound with unsaturated carboxylic acid (monoester or polyester) include compounds disclosed in JP-A-2001-139663, paragraphs [0026]-[0027]. Further, vinyl methacrylates, allyl methacrylates, allyl acrylates, aliphatic alcohol-based esters disclosed in JP-B-46-27926, JP-B-51-47334, and JP-A-57-196231, compounds having an aromatic skeleton disclosed in JP-A-2-226149, and compounds having an amino group disclosed in JP-A-1-165613 are preferably used. Moreover, vinyl urethane compounds having two or more polymerizable vinyl groups per molecule (JP-B-48-41708), urethane acrylates (JP-B-2-16765), urethane compounds having an ethylene oxide skeleton (JP-B-62-39418), polyester acrylates (JP-B-52-30490), and photosetting monomers and oligomers disclosed in "Journal of The Adhesion Society of Japan", vol. 20 (7), pp. 300-308, 1984 may be used.

As these binders there may be used products commercially available from Nippon Kayaku Corporation, OSAKA ORGANIC CHEMICAL INDUSTRY LTD., DAINIPPON INK AND CHEMICALS, INCORPORATED, TOAGOSEI CO., LTD., Mitsubishi Chemical Corporation, etc.

These active radiation-curing resins may be used in combination of two or more thereof. Particularly preferred among these active radiation-curing resins are pentaerythritol tri (meth)acrylate, pentaerythritol tetra(meth)acrylate, dipentaerythritol hexa(meth) acrylate, mixture of dipentaerythritol hexa(meth)acrylate and dipentaerythritol penta(meth) acrylate, trimethylolpropane tri(meth)acrylate, EO-modified trimethylol propane tri(meth)acrylate, and ditrimethylolpropane tetra(meth)acrylate.

Specific examples of the high refractive monomer include bis(4-methacryloylthiophenyl)sulfide, vinyl naphthalene, vinyl phenyl sulfide, and 4-methacryloxy phenyl-4'-methoxyphenylthioether. These monomers may be used in combination of two or more thereof.

The polymerization of the monomers having ethylenically unsaturated groups can be carried out by irradiation with ionizing radiation or heating in the presence of a photoradical polymerization initiator or heat radical polymerization initiator.

Accordingly, the anti-reflection film can be formed by preparing a coating solution containing monomers having ethylenically unsaturated groups, a photoradical polymerization initiator, a heat radical polymerization initiator, a particulate mat and an inorganic filler, spreading the coating solution over a transparent support, and then subjecting the coat to polymerization reaction by irradiation with ionizing radiation or heating so that it is cured.

Examples of the photoradical polymerization initiator employable herein include acetophenones, benzoins, benzophenones, phosphine oxides, ketals, anthraquinones, thioxanthones, azo compounds, peroxides, 2,3-alkyldione compounds, disulfide compounds, fluoroamine compounds, and aromatic sulfoniums. Examples of the acetophenones include 2,2-ethoxyacetophenone, p-methylacetophenone, 1-hydroxydimethylphenylketone, 1-hydroxycyclohexylpheyl ketone, 2-methyl-4-methylthio-2-morpholino propiophenone, and 2-benzyl-2-dimethylamino-1-(4-morpholinophenyl)-butanone. Examples of the benzoins include benzoinbenzenesulfonic acid ester, benzointoluenesulfonic acid ester, benzoin methyl ether, benzoin ethyl ether, and benzoin isopropyl ether. Examples of the benzophenones include benzophenone, 2,4-chlorobenzophenone, 4,4-dichlorobenzophenone, and p-chlorobenzophenone. Examples of the phosphine oxides include 2,4,6-trimethylbenzoyl diphenyl phosphine oxide.

Various examples of photoradical polymerization initiators are disclosed also in Kazuhiro Takahashi, "Saishin UV Kouka Gijutsu (Modern UV Curing Technique)", page 159, Technical Information Institute Co., Ltd., 1991. These examples are useful in the invention.

Preferred examples of commercially available photoradical polymerization initiators include "Irgacure (651, 184, 907)" (produced by Ciba Specialty Chemicals Inc.).

As disclosed in JP-A-6-41468, two photopolymerization initiators are preferably used in combination.

The photopolymerization initiator is preferably used in an amount of from 0.1 to 15 parts by weight, more preferably from 1 to 10 parts by weight based on 100 parts by weight of polyfunctional monomers.

In addition to the photopolymerization initiator, a photosensitizer may be used. Specific examples of the photosensitizer include n-butylamine, triethylamine, tri-n-butylphosphine, Michler's ketone, and thioxanthone.

Examples of the heat radical polymerization initiator employable herein include organic or inorganic peroxides, organic azo compounds, and diazo compounds.

Specific examples of the organic peroxides include benzoyl peroxide, halogen benzoyl peroxide, lauroyl peroxide, acetyl peroxide, dibutyl peroxide, cumene hydroperoxide, and butyl hydroperoxide. Specific examples of the inorganic peroxides include hydrogen peroxide, ammonium persulfate, and potassium persulfate. Specific examples of the azo compounds include 2-azo-bis-isobutylonitrile, 2-azo-bis-propionitrile, and 2-azo-bis-cyclohexanedinitrile. Specific examples of the diazo compounds include diazoaminobenzene, and p-nitrobenzene diazonium.

The polymer having a polyether as a main chain is preferably an ring-opening polymerization product of polyfunctional epoxy compound. The ring-opening polymerization of polyfunctional epoxy compound can be carried out by irradiation with ionizing radiation or heating in the presence of a photo-acid generator or heat-acid generator.

Accordingly, the anti-reflection film can be formed by preparing a coating solution containing a polyfunctional epoxy compound, a photo-acid generator, a heat-acid generator, a particulate mat and an inorganic filler, spreading the coating solution over a transparent support, and then subjecting the coat to polymerization reaction by irradiation with ionizing radiation or heating so that it is cured.

Instead of or in addition to the monomers having two or more ethylenically unsaturated groups, monomers having crosslinkable functional groups may be used to introduce crosslinkable functional groups into a polymer. The reaction of these crosslinkable functional groups makes it possible to introduce a crosslinked structure into the binder polymer.

Examples of the crosslinkable functional groups include isocyanato groups, epoxy groups, aziridine groups, oxazoline groups, aldehyde groups, carbonyl groups, hydrazine groups, carboxyl groups, methylol groups, and active methylene groups. Further, vinylsulfonic acid, acid anhydride, cyanoacrylate derivative, melamine, etherified methylol, ester, urethane and metal alkoxide such as tetramethoxysilane may be used as a monomer by which a crosslinked structure is introduced. A functional group which exhibits crosslinkability as a result of decomposition reaction such as blocked isocyanate group may be used. In other words, the crosslinkable functional group to be used in the invention may be not immediately reactive but may be reactive as a result of decomposition reaction. These binder polymers having a crosslinkable functional group may form a crosslinked structure when heated after being spread.

The binder for anti-glare hard coat layer is added in an amount of from 20% to 95% by weight based on the solid content in the coating composition for the anti-glare hard coat layer.

For the purpose of providing anti-glare properties, the anti-glare hard coat layer comprises a particulate mat having a greater size than the particulate filler and an average particle diameter of from 1 µm to 10 µm, preferably from 1.5 µm to 7.0 µm such as inorganic particulate compound and inorganic resin.

Specific examples of the aforementioned particulate mat include inorganic particulate compounds such as particulate silica and particulate $TiO_2$, and inorganic particulate resins such as particulate acryl, particulate crosslinked acryl, particulate polystyrene, particulate crosslinked styrene, particulate melamine resin and particulate benzoguanamine resin. Preferred among these particulate mat materials are particulate crosslinked styrene, particulate crosslinked acryl, and particulate silica.

The particulate mat may be in the form of sphere or in amorphous form.

Two or more particulate mats having different particle diameters may be used in combination. A particulate mat material having a greater particle diameter may be used to provide anti-glare properties while a particulate mat material having a smaller particle diameter may be used to provide other optical properties. For example, in the case where the anti-reflection film is stuck to a display having a precision of 133 ppi or more, it is required that there occur no glittering, which is one of defects in optical properties. Glittering is attributed to the presence of roughness (contributing to anti-glare properties) on the surface of the film that causes the expansion or shrinkage of pixels leading to the loss of uniformity in brightness. Glittering can be drastically eliminated by the additional use of particulate mat having a greater particle diameter than that of the particulate mat that provides anti-glare properties and a refractive index different from that of the binder.

Further, the distribution of particle diameter of the aforementioned particulate mat is most preferably monodisperse. The particle diameter of the particles are preferably as close to each other as possible. For example, in the case where the particle having a particle diameter which is 20% or more of the average particle diameter greater is defined as coarse particle, the proportion of the coarse particles is preferably 1% or less, more preferably 0.1% or less, more preferably 0.01% or less based on the total number of particles. A particulate mat having such a particle diameter distribution can be obtained by classifying particles produced by an ordinary synthesis reaction. By increasing the number of times of classification or raising the degree of classification, a better distribution can be obtained.

The aforementioned particulate mat is preferably incorporated in the anti-glare hard coat layer thus formed in an amount of from 10 to 2,000 mg/m², more preferably from 100 to 1,400 mg/m².

For the measurement of particle size distribution of particulate mat, a coulter counter method is employed. The distribution thus measured is then converted to distribution of number of particles.

The anti-glare hard coat layer preferably comprises an inorganic filler composed of oxide of at least one of metals such as titanium, zirconium, aluminum, indium, zinc, tin and antimony having an average particle diameter of 0.2 µm or less, preferably 0.1 µm or less, even more preferably 0.06 µm or less incorporated therein in addition to the aforementioned particulate mat to enhance the refractive index thereof. On the contrary, in order to increase the difference in refractive index from the particulate mat, the hard coat layer comprising a high refractive particulate mat incorporated therein preferably comprises a silicon oxide incorporated therein for keeping the refractive index thereof low. The preferred particle diameter of the silicon oxide is the same as that of the aforementioned inorganic filler.

Specific examples of the inorganic filler to be incorporated in the hard coat layer include $TiO_2$, $ZrO_2$, $Al_2O_3$, $In_2O_3$, ZnO, $SnO_2$, $Sb_2O_3$, ITO, and $SiO_2$. Particularly preferred among these inorganic fillers are $TiO_2$ and $ZrO_2$ from the standpoint of enhancement of refractive index. These inorganic fillers are preferably subjected to silane coupling treatment or titanium coupling treatment on the surface thereof. A surface treatment having a functional group reactive with a binder seed on the surface of filler is preferably used.

The added amount of these inorganic fillers is preferably from 10% to 90%, more preferably from 20% to 80%, particularly from 30% to 75% based on the total weight of the hard coat layer.

The inorganic filler has a sufficiently smaller particle diameter than the wavelength of light and thus is not scattered. Thus, a dispersion of the filler in a binder polymer behaves as an optically uniform material.

The bulk refractive index of the mixture of the binder and the inorganic filler of the anti-glare hard coat layer of the invention is preferably from 1.48 to 2.00, more preferably from 1.50 to 1.80. In order to predetermine the refractive index within the above defined range, the kind and proportion of the binder and the inorganic filler may be properly predetermined. The method of selecting these factors can easily be previously known experimentally.

The thickness of the anti-glare hard coat layer is preferably from 1 μm to 10 μm, more preferably from 1.2 μm to 8 μm.

(Organosilane Sol)

The coating solution constituting at least one of the functional layers constituting the anti-reflection film of the invention preferably contains at least one component of organosilane compounds, hydrolyzates thereof and partial condensates thereof, i.e., so-called sol component (hereinafter occasionally abbreviated in this way) from the standpoint of scratch resistance. This sol component acts as a binder for the layer formed by spreading the aforementioned coating solution, drying the coat layer, and then subjecting the coat layer to heating so that the coat layer is condensed to form a cured material. In the case where the cured material has a polymerizable unsaturated bond, when irradiated with active light rays, a binder having a three-dimensional structure is formed.

The organosilane compound is preferably one represented by the following general formula 4.

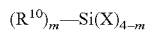  Formula 4

In the general formula 4, $R^{10}$ represents a substituted or unsubstituted alkyl or aryl group. The alkyl group is preferably an alkyl group having from 1 to 30, more preferably from 1 to 16, particularly from 1 to 6 carbon atoms. Specific examples of the alkyl group include methyl, ethyl, propyl, isopropyl, hexyl, decyl, and hexadecyl. Examples of the aryl group include phenyl, and naphthyl. Preferred among these aryl groups is phenyl. X represents a hydroxyl group or hydrolyzable group. Preferred examples of the hydrolyzable group include alkoxy groups (preferably an alkoxy group having from 1 to 5 carbon atoms such as methoxy and ethoxy), halogen atoms (e.g., Cl, Br, I), and groups represented by $R^2COO$ (in which $R^2$ is preferably a hydrogen atom or $C_1$-$C_5$ alkyl group such as $CH_3COO$ and $C_2H_5COO$). Preferred among these hydrolyzable groups is alkoxy group, particularly methoxy or ethoxy.

The suffix m represents an integer of from 1 to 3, preferably from 1 or 2, particularly 1.

In the formula 4, the plurality of $R^{10}$'s and X's, if any, may be the same or different.

The substituents on $R^{10}$ are not specifically limited. Examples of these substituents include halogen atoms (e.g., fluorine, chlorine, bromine), hydroxyl groups, mercapto groups, carboxyl groups, epoxy groups, alkyl groups (e.g., methyl, ethyl, i-propyl, propyl, t-butyl), aryl groups (e.g., phenyl, naphthyl), aromatic heterocyclic groups (e.g., furyl, pyrazolyl, pyridyl), alkoxy groups (e.g., methoxy, ethoxy, i-propoxy, hexyloxy), aryloxy groups (e.g., phenoxy), alkylthio groups (e.g., methylthio, ethylthio), arylthio groups (e.g., phenylthio), alkenyl groups (e.g., vinyl, 1-propenyl), acyloxy groups (e.g., acetoxy, acryloyloxy, methacryloyloxy), alkoxycarbonyl groups (e.g., methoxycarbonyl, ethoxycarbonyl), aryloxycarbonyl groups (e.g., phenoxycarbonyl), carbamoyl groups (e.g., carbamoyl, N-methylcarbamoyl, N,N-dimethylcarbamoyl, N-methyl-N-octylcarbamoyl), and acylamino groups (e.g., acetylamino, benzoylamino, acrylamino, methacrylamino). These substituents may be further substituted.

In the formula 4, at least one of the plurality of $R^{10}$'s, if any, is preferably a substituted or unsubstituted alkyl or aryl group, particularly an organosilane compound having a vinyl-polymerizable substituent represented by the following general formula 1.

General Formula 1

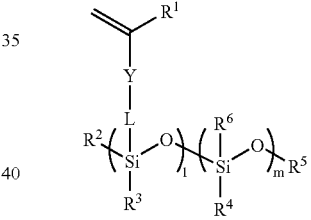

In the above-described general formula 1, R represents a hydrogen atom, a methyl group, a methoxy group, an alkoxycarbonyl group, a cyano group, a fluorine atom, or a chlorine atom. The alkoxycarbonyl group includes a methoxycarbonyl group, an ethoxycarbonyl group, and the like. The hydrogen atom, the methyl group, the methoxy group, the methoxycarbonyl group, the cyano group, the fluorine atom, and the chlorine atom are preferred, the hydrogen atom, the methyl group, the methoxycarbonyl group, the fluorine atom, and the chlorine atom are further preferred, and the hydrogen atom and the methyl group are particularly preferred.

Y represents a single bond, *—COO—**, *—CONH—**, or *—O—**, and the single bond, *—COO—**, and *—CONH—** are preferred, the single bond and *—COO—** are further preferred, and *—COO—** is particularly preferred. * represents the position bonding to =C($R^1$)— and ** the position bonding to L.

In general formula 1, L represents a divalent connecting chain. Specific examples thereof include a substituted or unsubstituted alkylene group, a substituted or unsubstituted arylene group, a substituted or unsubstituted alkylene group having a connecting group (e.g. ether, ester, and amide) therein, and a substituted or unsubstituted arylene group having a connecting group therein, the substituted or unsubstituted alkylene group, the substituted or unsubstituted arylene group, and the alkylene group having a connecting group therein are preferred, the unsubstituted alkylene group, the unsubstituted arylene group, and the alkylene group having a ether or ester-connecting group therein are further preferred, and the unsubstituted alkylene group and the alkylene group having a ether or ester-connecting group therein are particularly preferred. The substituent groups include a halogen atoms a hydroxyl group, a mercapto group, a carboxyl group, an epoxy group, an alkyl group, an aryl group, and the like, and these substituent groups may further be substituted.

In general formula 1, l represents a number meeting the expression l=100−m and m represents a number of 0 to 50. m is preferably from 0 to 40, and particularly preferably from 0 to 30.

$R^2$ to $R^4$ are preferably a halogen atom, a hydroxyl group, an unsubstituted alkoxy group, or an unsubstituted alkyl group, respectively. $R^2$ to $R^4$ are more preferably a chlorine atom, the hydroxyl group, or unsubstituted alkoxy groups having one to six carbon atoms, furthermore preferably the hydroxyl group or alkoxy groups having one to three carbon atoms, and particularly preferably the hydroxyl group or methoxy group.

$R^5$ represents a hydrogen atom or an unsubstituted alkyl group. $R^5$ is preferably the hydrogen atom or alkyl groups having one to three carbon atoms, and particularly preferably the hydrogen atom or methyl group.

In general formula 1, $R^6$ represents substituted or unsubstituted alkyl groups and substituted or unsubstituted aryl groups. The alkyl groups are preferably those having one to 30 carbon atoms, more preferably one to 16 carbon atoms, and particularly preferably those having one to six carbon atoms. Examples of the alkyl groups include a methyl group, an ethyl group, a propyl group, an isopropyl group, a hexyl group, a decyl group, a hexadecyl group, and the like. The aryl groups include a phenyl group, a naphthyl group, and the like, and preferably the phenyl group. The substituted groups contained in $R^6$ are not particularly limited, but include a halogen atom (fluorine, chlorine, bromine, etc.), a hydroxyl group, a mercapto group, a carboxyl group, an epoxy group, an alkyl group (methyl, ethyl, i-propyl, propyl, t-butyl, etc.), an aryl group (phenyl, naphthyl, etc.), an aromatic heterocyclic group (furyl, pyrazolyl, pyridyl, etc.), an alkoxy group (methoxy, ethoxy, i-propoxy, hexyloxy, etc.), an aryloxy group (phenoxy, etc.), an alkylthio group (methylthio, ethylthio, etc.), an arylthio group (phenylthio, etc.), an alkenyl group (vinyl, 1-propenyl, etc.), an acyloxy group (acetoxy, acryloyloxy, methyacryloyloxy, etc.), an alkoxycarbonyl group (methoxycarbonyl, ethoxycarbonyl, etc.), an aryloxycarbonyl group (phenoxycarbonyl, etc.), a carbamoyl group (carbamoyl, N-methylcarbamoyl, N,N-dimethylcarbamoyl, N-methyl-N-octylcarbamoyl, etc.), an acylamine group (acetylamino, benzoylamino, acrylamino, methacrylamino, etc.), and the like, and these substituted groups may further be substituted. Polymerizable functional groups other than a vinyl polymerizable group, for example, an epoxy group and an isocyanate group also are preferred as substituent groups. As the substituent groups of $R^6$, a hydroxyl group and an unsubstituted alkyl group are more preferred, the hydroxyl group or alkyl groups having one to three carbon atoms are further preferred, and the hydroxyl group and a methyl group are particularly preferred.

Two or more kinds of compounds of general formula 1 can be simultaneously used. Particularly the compounds of general formula 1 are prepared from two kinds of silane compounds as starting materials. Examples of the compounds of general formula 4 and the starting materials for the compounds represented by general formula 1 are shown below, but are not limited to these.

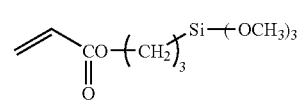

M-1

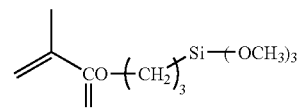

M-2

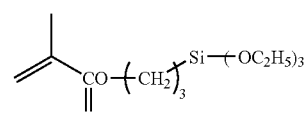

M-3

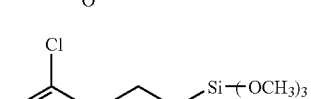

M-4

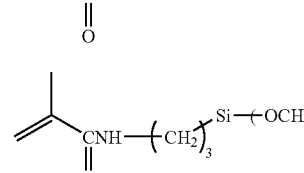

M-5

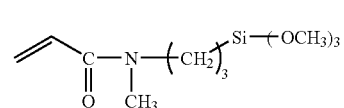

M-6

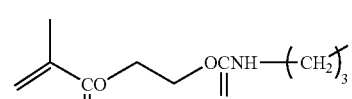

M-7

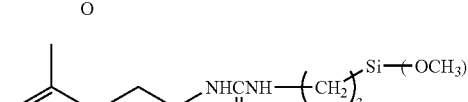

M-8

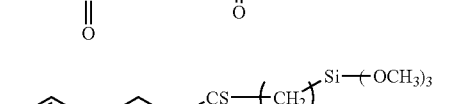

M-9

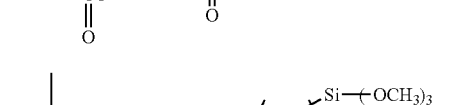

M-10

M-11

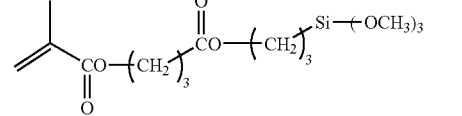

M-12

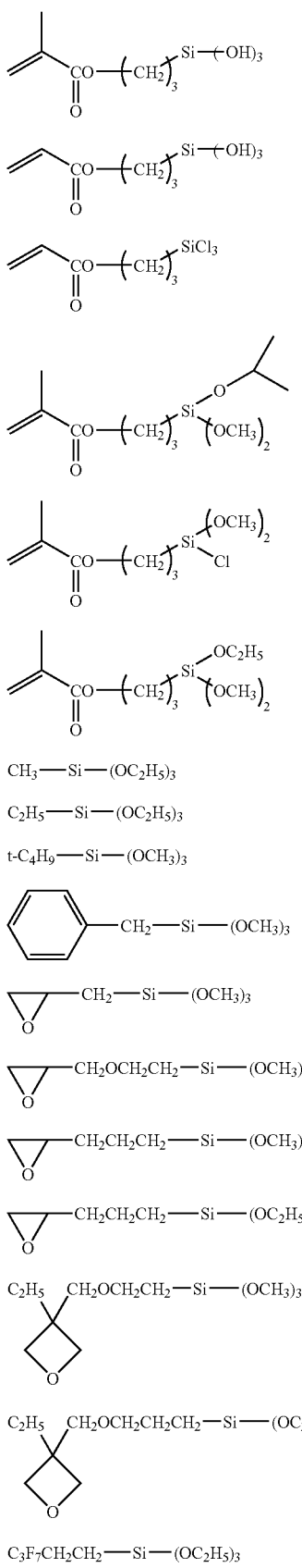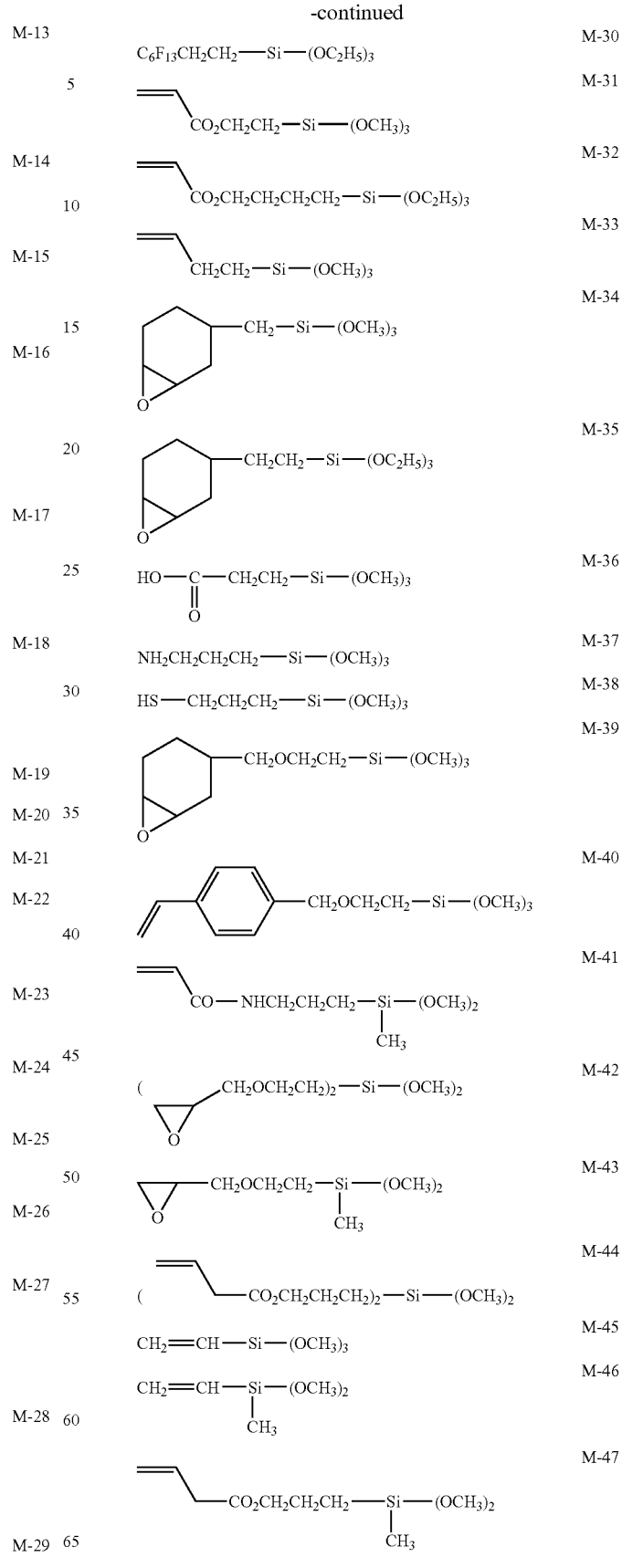

-continued

M-48: CH$_3$—Si(OCH$_3$)$_3$

M-49: C$_2$H$_5$—Si(OCH$_3$)$_3$

M-50: t-C$_4$H$_9$—Si(OCH$_3$)$_3$

Of these, (M-1), (M-2), and (M-25) are particularly preferred as organosilanes having polymerizable groups.

In order to exert the effect of the invention, the content of the organosilane containing the vinyl-polymerizable group in hydrolysates of organosilanes and/or their partial condensates is preferably from 30 to 100 mass %, more preferably from 50 to 100 mass %, and further preferably from 70 to 95 mass %. The content of the organosilanes containing the vinyl-polymerizable group is preferably 30 mass % or more since it become difficult to cause generation of solid, turbidity in liquid, deterioration in pot life, and it become easy to control a molecular weight (increase in molecular weight) and acquire improvement of performance (e.g. resistance to flawing in antireflection coating) when the polymerization treatment is carried out. In the synthesis of the compounds represented by general formula 1, it is preferred that one compound is selected from (M-1) and (M-2) as organosilanes containing the above-described vinyl-polymerizable groups and (M-19) to (M-21) and (M-48) as organosilanes containing no the vinyl-polymerizable groups, respectively, to use in combination with the above-described amounts.

At least any of the hydrolyzates and partial condensates of organosilane of the invention preferably exhibits an inhibited volatility to stabilize the properties of the coat. In some detail, the volatility of the product at 105° C. per hour is preferably 5% by weight or less, 3% by weight or less, particularly 1% by weight or less.

The hydrolysates and partial condensates of organosilane compounds used in the invention are described in detail.

The hydrolytic reaction of the organosilanes and the successive condensation reaction in general are carried out in the presence of a catalyst. Examples of the catalyst include inorganic acids such as hydrochloric acid, sulfuric acid, and nitric acid, organic acids such as oxalic acid, acetic acid, butyric acid, maleic acid, citric acid, formic acid, methanesulfonic acid, and toluenesulfonic acid, inorganic bases such as sodium hydroxide, potassium hydroxide, and ammonia, organic bases such as triethylamine and pyridine, metal alkoxides such as triisopropoxyaluminum, tetrabutoxyzirconium, tetrabuyl titanate, and dibutyltin dilaurate, metal chelate compounds having metals such as Zr, Ti, or Al as central metals, and fluorine-containing compounds such as KF and NH$_4$F.

These catalysts can be used singly or as a mixture thereof.

The organosilane content in at least any of hydrolyzates and partial condensates of organosilane of the invention containing the vinyl-polymerizable group is preferably from 30% to 100% by weight, more preferably from 50% to 100% by weight, particularly from 70% to 100% by weight. When the content of the organosilane containing the vinyl-polymerizable group falls below 30% by weight, many troubles occur. For example, a solid matter is produced. The liquid becomes turbid. The pot life of the liquid is deteriorated. The molecular weight can be difficultly controlled (molecular weight rises). Further, since the content of the polymerizable groups is small, the properties of the product produced by polymerization (e.g., scratch resistance of anti-reflection layer) can be difficultly obtained.

Preferred among these inorganic acids are those having an acid dissociation constant (pKa value (25° C.)) of 4.5 or less in water. More desirable among these organic acids are hydrochloric acid, sulfuric acid and organic acid having an acid dissociation constant of 3.0 or less in water. Particularly preferred among these organic acids are hydrochloric acid, sulfuric acid and organic acid having an acid dissociation constant of 2.5 or less in water. Even more desirable among these organic acids are those having an acid dissociation constant of 2.5 or less in water. In some detail, methanesulfonic acid, oxalic acid, phthalic acid and malonic acid are more desirable, particularly oxalic acid.

The hydrolyzation/condensation reaction of organosilane may be effected in a solvent or in the presence of solvent. In order to make uniform mixing, an organic solvent is preferably used. Preferred examples of the organic solvent employable herein include alcohols, aromatic hydrocarbons, ethers, ketones, and esters.

The solvent to be used herein is preferably capable of dissolving the organosilane and the catalyst therein. The organic solvent is preferably used as a coating solution or a part thereof from the standpoint of process. An organic solvent which doesn't impair solubility or dispersibility when mixed with other materials such as fluorine-containing polymer.

Preferred examples of the alcohols to be used as organic solvent include monovalent alcohols and divalent alcohols. Preferred among these monovalent alcohols is $C_1$-$C_8$ saturated aliphatic alcohol.

Specific examples of these alcohols include methanol, ethanol, n-propyl alcohol, i-propyl alcohol, n-butyl alcohol, sec-butyl alcohol, tert-butyl alcohol, ethylene glycol, diethylene glycol, triethylene glycol, ethylene glycol monobutyl ether, and ethylene glycol monoethyl ether acetate.

Specific examples of the aromatic hydrocarbons include benzene, toluene, and xylene. Specific examples of the ethers include tetrahydrofurane, and dioxane. Specific examples of the ketones include acetone, methyl ethyl ketone, methyl isobutyl ketone, and diisobutyl ketone. Specific examples of the esters include ethyl acetate, propyl acetate, butyl acetate, and propylene carbonate.

These organic solvents may be used singly or in admixture of two or more thereof. The solid content concentration during the reaction is not specifically limited but is normally from 1% to 100%, more preferably from 1% to 90%, particularly preferably from 20% to 70%.

The hydrolyzation/condensation reaction of the organosilane is effected at a temperature of from 25° C. to 100° C. with water added in an amount of from 0.05 to 2 mols, preferably from 0.1 to 1 mols per mol of hydrolyzable group in the organosilane in the presence or absence of the aforementioned solvent in the presence of a catalyst.

The weight-average molecular weight of the organosilane hydrolyzate containing a vinyl-polymerizable group and partial condensate thereof, excluding components having a molecular weight of less than 300, is preferably from 450 to 20,000, more preferably from 500 to 10,000, even more preferably from 550 to 5,000, still more preferably from 600 to 3,000.

The proportion of the components having a molecular weight of more than 20,000 among the components having a molecular weight of 300 or more in the organosilane hydrolyzate and partial condensate thereof is preferably 20% by weight or less, more preferably 10% by weight or less, even more preferably 5% by weight or less.

The proportion of the components having a molecular weight of from 1,000 to 20,000 among the components having a molecular weight of 300 or more in the organosilane hydrolyzate and partial condensate thereof is preferably 20% by weight or more. When this value is 20% by weight or more, the cured layer obtained by curing the curable composition containing such an organosilane hydrolyzate and partial condensate thereof is excellent in transparency and adhesion to the substrate.

For the measurement of weight-average molecular weight and molecular weight, a GPC analyzer comprising a Type TSKgel GMHxL, TSKgel G4000HxL or TSKgel G2000HxL column (produced by TOSOH CORPORATION) is used. With THF as a solvent, detection is made using a differential refractometry. The results are then converted in polystyrene equivalence. The content is represented by the percent area of the peak falling within the above defined range supposing that the area of the peak corresponding to the components having a molecular weight of 300 or more is 100%.

The dispersibility (weight-average molecular weight/number-average molecular weight) is preferably from 1.1 to 3.0, more preferably from 1.1 to 2.5, even more preferably from 1.1 to 2.0, particularly from 1.1 to 1.5.

When the organosilane hydrolyzate and partial condensate thereof are subjected to $^{29}$Si-NMR analysis, it can be confirmed that X in the general formula 4 is condensed in —OSi form.

Supposing that the case where three Si bonds are condensed in —OSi form is defined to be T3, the case where two Si bonds are condensed in —OSi form is defined to be T2, the case where one Si bond is condensed in —OSi form is defined to be T1 and the case where Si is not condensed is defined to be T0, the percent condensation α is represented by the numerical formula (XIII):

$$\alpha = (T3 \times 3 + T2 \times 2 + T1 \times 1)/3/(T3 + T2 + T1 + T0) \quad (XIII)$$

The percent condensation is preferably from 0.2 to 0.95, more preferably from 0.3 to 0.93, particularly from 0.4 to 0.9.

When the percent condensation falls below 0.1, hydrolyzation or condensation cannot proceed sufficiently, causing the rise of the content of monomer components and hence insufficient curing. On the contrary, when the percent condensation exceeds 0.95, hydrolyzation or condensation proceeds too much, causing the consumption of hydrolyzable groups and hence the deterioration of mutual interaction of binder polymer, resin substrate, inorganic particulate material, etc. Even when this product is used, the desired effect can be difficultly obtained.

In the invention, the hydrolyzation reaction is preferably effected with stirring at a temperature of from 25° C. to 100° C. in the presence of at least a metal chelate compound having an alcohol represented by the general formula $R^3OH$ (in which $R^3$ represents a $C_1$-$C_{10}$ alkyl group) and a compound represented by the general formula $R^4COCH_2COR^5$ (in which $R^4$ represents a $C_1$-$C_{10}$ alkyl group and $R^5$ represents a $C_1$-$C_{10}$ alkyl group or $C_1$-$C_{10}$ alkoxy group) as a ligand and a metal selected from the group consisting of zirconium, titanium and aluminum as a central metal.

Or when used as a catalyst, the fluorine-containing compounds possesses the faculty of promoting hydrolysis and condensation exhaustively and accordingly, the polymerization degree can be determined by selecting the amount of water added, which can preferably set up the arbitrary molecular weight. That is, in order to prepare organosilane hydrolysates/partial condensates having average polymerization degree M, (M-1) mole of water can be used to M mole of a hydrolytic organosilane As the metal chelate compound there may be preferably used one having an alcohol represented by the general formula $R^3OH$ (in which $R^3$ represents a $C_1$-$C_{10}$ alkyl group) and a compound represented by the general formula $R^4COCH_2COR^5$ (in which $R^4$ represents a $C_1$-$C_{10}$ alkyl group and $R^5$ represents a $C_1$-$C_{10}$ alkyl group or $C_1$-$C_{10}$ alkoxy group) as a ligand and a metal selected from the group consisting of zirconium, titanium and aluminum as a central metal without any limitation. Two or more metal chelate compounds may be used in combination if they fall within this category. The metal chelate compound to be used in the invention is preferably selected from the group consisting of compounds represented by the following general formulae:

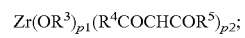

$Zr(OR^3)_{p1}(R^4COCHCOR^5)_{p2}$;

$Ti(OR^3)_{q1}(R^4COCHCOR^5)_{q2}$; and

$Al(OR^3)_{r1}(R^4COCHCOR^5)_{r2}$

The metal chelate compound of the invention acts to accelerate the condensation reaction of the hydrolyzate and partial condensate of organosilane compound.

$R^3$ and $R^4$ in the metal chelate compound may be the same or different and each represent a $C_1$-$C_{10}$ alkyl group such as ethyl, n-propyl, i-propyl, n-butyl, s-butyl, t-butyl and n-pentyl or phenyl. $R^5$ represents the same $C_1$-$C_{10}$ alkyl group as defined above or $C_1$-$C_{10}$ alkoxy group such as methoxy, ethoxy, n-propoxy, i-propoxy, n-butoxy, sec-butoxy and t-butoxy. The suffixes p1, p2, q1, q2, r1 and r2 in these general formulae each represent an integer determined to satisfy the equations p1+p2=4, q1+q2=4 and r1+r2=3.

Specific examples of these metal chelate compounds include zirconium chelate compounds such as tri-n-butoxy ethyl acetoacetate zirconium, di-n-butoxybis(ethyl acetoacetate)zirconium, n-butoxytris(ethyl aceto acetate)zirconium, tetrakis(n-propylacetoacetate) zirconium, tetrakis(acetylacetoacetate)zirconium and tetrakis(ethylacetoacetate)zirconium, titanium compounds such as diisopropoxy bis(ethylacetoacetate) titanium, diisopropoxy bis(acetylacetate)titanium and diisopropoxy bis(acetylacetone)titanium, and aluminum chelate compounds such as diisopropoxyethyl acetoacetate aluminum, diisopropoxyacetylacetonate aluminum, isopropoxy bis(ethylacetoacetate)aluminum, isoproposy bis(acetylacetonate)aluminum, tris(ethyl acetoacetate)aluminum, tris (acetylacetonate)aluminum and monoacetyl acetonate bis (ethylacetoacetate) aluminum.

Preferred among these metal chelate compounds are tri-n-butoxyethyl acetoacetate zirconium, diisopropoxy bis(acetylacetonate)titanium, diisopropoxy ethyl acetoacetate aluminum and tris(ethylacetoacetate) aluminum. These metal chelate compounds may be used singly or in combination of two or more thereof. Alternatively, these metal chelate compounds may be used in the form of partial hydrolyzate.

The metal chelate compounds of the invention are preferably used in an amount of from 0.01 to 50% by weight, more preferably from 0.1 to 50% by weight, even more preferably from 0.5 to 10% by weight based on the weight of the aforementioned organosilane. When the metal chelate compounds are used in the above defined amount, the condensation reaction of the organosilane compound proceeds rapidly, making it possible to provide a coat layer having a good durability and provide the composition containing the hydrolyzate and partial condensate of the organosilane compound and the metal chelate compound with a good storage stability.

The coating solution for functional layers to be incorporated in the optical film of the invention preferably comprises at least any of β-diketone compounds and β-ketoester compounds incorporated therein in addition to the aforementioned composition comprising a sol component and a metal chelate compound. This will be further described hereinafter.

In the invention, at least any of β-diketone and β-ketoester compounds represented by the general formula $R^4COCH_2COR^5$ is used. These compounds each act as a stability improver for the composition to be used in the invention. In other words, it is thought that the coordination of these compounds to the metal atoms in the aforementioned metal chelate compound (at least any of zirconium, titanium and aluminum compounds) makes it possible to prevent these metal chelate compounds from accelerating the condensation reaction of the sol component of organosilane compound and hence enhance the storage stability of the resulting composition. $R^4$ and $R^5$ constituting the β-diketone compound and β-ketoester compound are as defined in the aforementioned metal chelate compound.

Specific examples of the β-diketone compound and β-ketoester compound include acetyl acetone, methyl acetoacetate, ethyl acetoacetate, n-propyl acetoacetate, i-propyl acetoacetate, n-butyl acetoacetate, sec-butyl acetoacetate, t-butyl acetoacetate, 2,4-hexane-dione, 2,4-heptane-dione, 3,5-heptane-dione, 2,4-octane-dione, 2,4-nonane-dione, and 5-methyl-hexane-dione. Preferred among these compounds are ethyl acetoacetate and acetyl acetone. Particularly preferred among these compounds is acetyl acetone. These β-diketone compounds and/or β-ketoester compounds may be used singly or in combination of two or more thereof. In the invention, the β-diketone compound and β-ketoester compound are preferably used in an amount of 2 mols or more, more preferably from 3 to 20 mols per mol of metal chelate compound. When the amount of these compounds falls below 2 mols, the resulting composition can exhibit a deteriorated storage stability to disadvantage.

It is preferred that the contents of the hydrolysates and partial condensates in the above-described organosilane compounds are low for an antireflection layer of comparatively thin film and high for a hard coat layer or glare-protective layer of thick film. In view of development of effect, refraction index, and figure and surface of the film, the content is preferably from 0.1 to 50 mass %, more preferably from 0.5 to 30 mass %, and most preferably from 1 to 15 mass % of the total solid content of inclusive layer (added layer).

In the invention, a composition comprising at least any of the aforementioned hydrolyzate and partial condensate of organosilane compound and a metal chelate compound is firstly prepared. To the composition is then added at least any of a β-diketone compound and a β-ketoester compound. The solution is then incorporated in the coating solution of at least one of hard coat layer and low refractive layer. The coating solution is then spread.

(Surface Active Agent)

The coating solution of the invention preferably comprises any or both of fluorine-based and silicone-based components having surface activity incorporated therein for improving spreadability, uniformalizing drying and providing adaptability to high speed coating. These surface active components are occasionally incorporated to adjust the wettability, stainproofness, dustproofness and chargeability of the surface.

Preferred examples of the silicone-based compound include those containing a plurality of dimethyl silyloxy units as repeating units and having substituents at the end of chain and in side chains thereof. The compound chain containing dimethyl silyloxy as repeating unit may contain structural units other than dimethyl silyloxy. The substituents may be the same or different. It is preferred that there be a plurality of substituents. Preferred examples of the substituents include groups containing acryloyl group, methacryloyl group, vinyl group, aryl group, cinnamoyl group, epoxy group, oxetanyl group, hydroxyl group, fluoroalkyl group, polyoxyalkylene group, carboxyl group, amino group, etc.

The molecular weight of the silicone-based compound is not specifically limited but is preferably 100,000 or less, particularly 50,000 or less, most preferably from 3,000 to 30,000. The content of silicon atoms in the silicone-based compound, too, is not specifically limited but is preferably 18.0% by weight or more, particularly from 25.0 to 37.8% by weight, most preferably from 30.0 to 37.0% by weight.

Preferred examples of the silicone-based compound include those disclosed in JP-A-2004-42278, paragraph [0068], but the invention is not limited thereto.

As the additives there are preferably used compounds having a fluoroalkyl group. The fluoroalkyl group preferably has from 1 to 20 carbon atoms, more preferably from 1 to 10 carbon atoms, and may have a straight-chain structure [e.g., $-CF_2CH_3$, $-CH_2(CF_2)_4H$, $-CH_2(CF_2)_8CF_3$, $-CH_2CH_2(CF_2)_4H$], a branched structure [e.g., $-CH(CF_3)_2$, $-CH_2CF(CF_3)_2$, $-CH(CH_3)CF_2CF_3$, $-CH(CH_3)(CF_2)_5CF_2H$] or an alicyclic structure (preferably 5-membered or 6-membered ring such as perfluorocyclohexyl group, perfluorocyclopentyl group or alkyl group substituted thereby). The fluoroalkyl group may have an ether bond (e.g., $-CH_2OCH_2CF_2CF_3$, $-CH_2CH_2OCH_2C_4F_8H$, $-CH_2CH_2OCH_2CH_2C_8F_{17}$, $-CH_2CH_2OCF_2CF_2OCF_2CF_2H$). A plurality of the fluoroalkyl groups may be incorporated in the same molecule.

The fluorine-based compound may be used in the form of polymer or oligomer with a fluorine-free compound. The fluorine-based compound may be used without any limitation on the molecular weight. The content of fluorine atoms in the fluorine-based compound is not specifically limited but is preferably 20% by weight or more, particularly from 30 to 70% by weight, most preferably from 40 to 70% by weight. Preferred examples of the fluorine-based compound include R-2020, M-2020, R3833 and M-3833 (produced by DAIKIN INDUSTRIES, Ltd.), and Megafac F-171, Megafac F-172, Megafac F-179A, F-780-F, and Diffenser MCF-300 (produced by DAINIPPON INK AND CHEMICALS, INCORPORATED). However, the invention is not limited to these products.

Among the aforementioned additives, the fluoroalkyl group-containing copolymer is preferably incorporated in the coating composition in particular. The fluoroalkyl group-containing copolymer can be added in a smaller amount to eliminate surface defects such as unevenness in coating, drying and point defect of optical film to advantage.

Further, the structure of the following fluoroalkyl group-containing copolymer is preferably selected to allow the copolymer unevenly distributed on the surface of the functional layer to be extracted with the solvent in the upper layer coating solution during the spreading of the upper layer coating solution (e.g., low refractive layer) so that it is not present on the surface of the functional layer (interface of functional layer) during the formation of the anti-reflection layer of the invention. The adjustment of the added amount of the fluoroaliphatic group-containing copolymer, too, is effective for the improvement of the aforementioned effects.

Referring further to the aforementioned method, a fluoroaliphatic group-containing copolymer containing a fluoroaliphatic group-containing monomer polymerizing unit in an amount of 10% by weight is added to the coating solution so that the fluoroaliphatic group-containing copolymer is segregated (that is, maldistributed) on the surface. In order to obtain a desired adhesion to the upper layer, the solvent in the coating solution constituting the upper layer is spread over the functional layer containing the aforementioned fluoroaliphatic group-containing copolymer, and then dried. In this manner, the surface free energy of the functional layer changes by 1 mN/m or more, particularly 3 mN/m or more.

The fluoroaliphatic group-containing copolymer (hereinafter occasionally abbreviated as "fluorine-based polymer") is preferably a copolymer containing a fluoroalkyl group having a perfluoroalkyl group having 4 or more carbon atoms or $CF_2H$-group having 4 or more carbon atoms in its side chains.

Particularly preferred examples of the fluoroaliphatic group-containing copolymer include acrylic resins and methacrylic resins containing a repeating unit (polymerizing unit) corresponding to the following monomer (i) and a repeating unit (polymerizing unit) corresponding to the following monomer (ii), and copolymers thereof with vinyl-based monomers copolymerizable therewith. As these monomers there may be used those disclosed in "Polymer Handbook", 2nd ed., J. Brandrup, Wiley Interscience (1975) Chapter 2, pp. 1 to 483.

Examples of these compounds include those having one addition-polymerizable unsaturated bond selected from the group consisting of acrylic acid, methacrylic acid, acrylic acid esters, methacrylic acid esters, acrylamides, methacrylamides, allyl compounds, vinylethers and vinylesters.

(1) Fluoroaliphatic group-containing copolymer represented by the following general formula 6

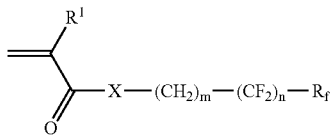

Formula 6

In the general formula 6, $R^1$ represents a hydrogen atom, halogen atom or methyl group, preferably hydrogen atom or methyl group. X represents an oxygen atom, sulfur atom or —$N(R^{12})$—, preferably oxygen atom or —$N(R^{12})$—, more preferably oxygen atom. $R^{12}$ represents a hydrogen atom or a $C_1$-$C_8$ alkyl group which may have substituents, preferably hydrogen atom or $C_1$-$C_4$ alkyl group, more preferably hydrogen atom or methyl group. $R_f$ represents —$CF_3$ or —$CF_2H$.

In the general formula 6, m represents an integer of from 1 to 6, preferably from 1 to 3, more preferably 1.

In the general formula 6, n represents an integer of from 1 to 17, preferably from 4 to 11, more preferably from 6 or 7. $R_f$ is preferably —$CF_2H$.

Two or more polymerizing units derived from the fluoroaliphatic group-containing monomer represented by the general formula 6 may be incorporated in the fluorine-based polymer as constituents.

(ii) Monomer represented by the following general formula 7 copolymerizable with (i)

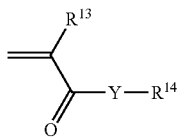

Formula 7

In the general formula 7, $R^{13}$ represents a hydrogen atom, halogen atom or methyl group, preferably hydrogen atom or methyl group. Y represents an oxygen atom, sulfur atom or —$N(R^{15})$—, preferably oxygen atom or —$N(R^{15})$—, more preferably oxygen atom. $R^{15}$ represents a hydrogen atom or a $C_1$-$C_8$ alkyl group, preferably hydrogen atom or $C_1$-$C_4$ alkyl group, more preferably hydrogen atom or methyl group.

$R^{14}$ represents a $C_1$-$C_{60}$ straight-chain, branched or cyclic alkyl group which may have substituents or an aromatic group which may have substituents (e.g., phenyl or naphthyl). The alkyl group may contain a poly(alkyleneoxy) group. Preferred examples of the alkyl group include $C_1$-$C_{12}$ straight-chain, branched or cyclic alkyl groups, alkylene groups containing $C_5$-$C_{40}$ poly(alkyleneoxy) group, and $C_6$-$C_{18}$ aromatic groups, extremely preferably $C_1$-$C_8$ straight-chain, branched or cyclic alkyl groups and alkylene groups containing $C_5$-$C_{30}$ poly(alkyleneoxy) group. The poly(alkyleneoxy) group will be further described hereinafter.

The poly(alkyleneoxy) group can be represented by (OR)x. R represents a $C_2$-$C_4$ alkylene group, preferably —$CH_2CH_2$—, —$CH_2CH_2CH_2$—, —$CH(CH_3)CH_2$— or —$CH(CH_3)CH(CH_3)$—. The suffix x represents a number of from 2 to 30, preferably from 2 to 20, more preferably from 4 to 15.

The oxyalkylene units in the aforementioned poly (oxyalkylene) group may be same as in the poly (oxypropylene) group. Alternatively, two or more different oxyalkylenes may be irregularly distributed. They may be straight-chain or branched oxypropylene or oxyethylene units. Alternatively, they may be present in the form of block of straight-chain or branched oxypropylene or oxyethylene units.

These poly(oxyalkylene) chains may include those connected via one or more chain bonds (e.g., —CONH-Ph-NHCO—, —S—: Ph represents a phenylene group). In the case where the chain bond has a valency of 3 or more, it provides a means of obtaining a branched chain oxyalkylene unit. In order to use this polymer in the invention, it is preferred that the molecular weight of the poly(oxyalkylene) group be from 250 to 3,000.

The poly(oxyalkylene) acrylate and methacrylate can be produced by reacting a commercially available hydroxypoly (oxyalkylene) material such as "Pluronic" (produced by ASAHI DENKA Co., Ltd.), Adekapolyether (produced by ASAHI DENKA Co., Ltd.), "Carbowax" (produced by Glico Products Co., Ltd.), "Toriton" (produced by Rohm and Haas Co., Ltd.) and P.E.G (produced by DAI-ICHI KOGYO SEIYAKU CO., LTD.) with acrylic acid, methacrylic acid, acryl chloride, methacryl chloride or acrylic anhydride by a known method. Alternatively, a poly(oxyalkylene)diacrylate produced by a known method may be used.

The amount of the fluoroaliphatic group-containing monomer represented by the general formula 6 to be used in the production of the fluorine-based polymer to be used in the invention is 10% by weight or more, preferably 50% by weight or more, more preferably from 70% to 100% by weight, even more preferably from 80% to 100% by weight based on the total amount of the monomers of the fluorine-based polymer.

The weight-average molecular weight of the fluorine-based polymer to be used in the invention is preferably from 3,000 to 100,000, more preferably from 6,000 to 80,000, even more preferably from 8,000 to 60,000.

For the measurement of weight-average molecular weight and molecular weight, a GPC analyzer comprising a Type TSKgel GMHxL, TSKgel G4000HxL or TSKgel G2000HxL column (produced by TOSOH CORPORATION) is used. With THF as a solvent, detection is made using a differential refractometry. The results are then converted in polystyrene equivalence. The molecular weight is represented by the percent area of the peak corresponding to the components having a molecular weight of 300 or more.

The added amount of the fluorine-based polymer to be used in the invention is from 0.001% to 5% by weight, preferably from 0.005% to 3% by weight, more preferably from 0.01% to 1% by weight based on the weight of the coating solution from the standpoint of development of effect of the polymer, drying and inhibition of surface defects.

Specific examples of the structure of the fluorine-based polymer of the invention will be given below, but the invention is not limited thereto. The figure in these formulae each indicate the molar ratio of the various monomer components. Mw indicates the weight-average molecular weight of the compound.

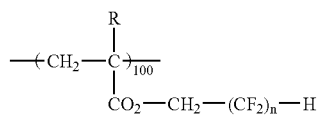

| | R | n | Mw |
|---|---|---|---|
| FP-1 | H | 4 | 8000 |
| FP-2 | H | 4 | 16000 |
| FP-3 | H | 4 | 33000 |
| FP-4 | $CH_3$ | 4 | 12000 |
| FP-5 | $CH_3$ | 4 | 28000 |
| FP-6 | H | 6 | 8000 |
| FP-7 | H | 6 | 14000 |
| FP-8 | H | 6 | 29000 |
| FP-9 | $CH_3$ | 6 | 10000 |
| FP-10 | $CH_3$ | 6 | 21000 |
| FP-11 | H | 8 | 4000 |
| FP-12 | H | 8 | 16000 |
| FP-13 | H | 8 | 31000 |
| FP-14 | $CH_3$ | 8 | 3000 |
| FP-15 | $CH_3$ | 8 | 10000 |
| FP-16 | $CH_3$ | 8 | 27000 |
| FP-17 | H | 10 | 5000 |
| FP-18 | H | 10 | 11000 |
| FP-19 | $CH_3$ | 10 | 4500 |
| FP-20 | $CH_3$ | 10 | 12000 |
| FP-21 | H | 12 | 5000 |
| FP-22 | H | 12 | 10000 |
| FP-23 | $CH_3$ | 12 | 5500 |
| FP-24 | $CH_3$ | 12 | 12000 |

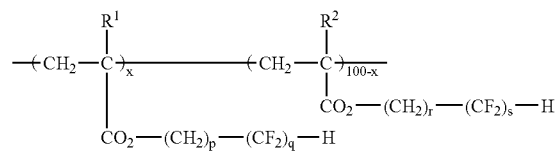

| | x | $R^1$ | p | q | $R^2$ | r | s | Mw |
|---|---|---|---|---|---|---|---|---|
| FP-25 | 50 | H | 1 | 4 | $CH_3$ | 1 | 4 | 10000 |
| FP-26 | 40 | H | 1 | 4 | H | 1 | 6 | 140000 |
| FP-27 | 60 | H | 1 | 4 | $CH_3$ | 1 | 6 | 21000 |
| FP-28 | 10 | H | 1 | 4 | H | 1 | 8 | 11000 |
| FP-29 | 40 | H | 1 | 4 | H | 1 | 8 | 16000 |
| FP-30 | 20 | H | 1 | 4 | $CH_3$ | 1 | 8 | 8000 |
| FP-31 | 10 | $CH_3$ | 1 | 4 | $CH_3$ | 1 | 8 | 7000 |
| FP-32 | 50 | H | 1 | 6 | $CH_3$ | 1 | 6 | 12000 |
| FP-33 | 50 | H | 1 | 6 | $CH_3$ | 1 | 6 | 22000 |
| FP-34 | 30 | H | 1 | 6 | $CH_3$ | 1 | 6 | 5000 |
| FP-35 | 40 | $CH_3$ | 1 | 6 | H | 3 | 6 | 3000 |
| FP-36 | 10 | H | 1 | 6 | H | 1 | 8 | 7000 |
| FP-37 | 30 | H | 1 | 6 | H | 1 | 8 | 17000 |
| FP-38 | 50 | H | 1 | 6 | H | 1 | 8 | 16000 |
| FP-39 | 50 | $CH_3$ | 1 | 6 | H | 3 | 8 | 19000 |
| FP-40 | 50 | H | 1 | 8 | $CH_3$ | 1 | 8 | 5000 |
| FP-41 | 80 | H | 1 | 8 | $CH_3$ | 1 | 8 | 10000 |
| FP-42 | 50 | $CH_3$ | 1 | 8 | H | 3 | 8 | 14000 |
| FP-43 | 90 | H | 1 | 8 | $CH_3$ | 3 | 8 | 9000 |
| FP-44 | 70 | H | 1 | 8 | H | 1 | 10 | 7000 |
| FP-45 | 90 | H | 1 | 8 | H | 3 | 10 | 12000 |
| FP-46 | 50 | H | 1 | 8 | H | 1 | 12 | 10000 |
| FP-47 | 70 | H | 1 | 8 | $CH_3$ | 3 | 12 | 8000 |

-continued

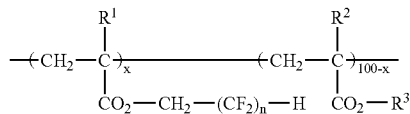

| | x | R¹ | n | R² | R³ | Mw |
|---|---|---|---|---|---|---|
| FP-48 | 80 | H | 4 | CH₃ | CH₃ | 11000 |
| FP-49 | 90 | H | 4 | H | C₄H₉(n) | 7000 |
| FP-50 | 95 | H | 4 | H | C₆H₁₃(n) | 5000 |
| FP-51 | 90 | CH₃ | 4 | H | CH₂CH(C₂H₅)C₄H₉(n) | 15000 |
| FP-52 | 70 | H | 6 | CH₃ | C₂H₅ | 18000 |
| FP-53 | 90 | H | 6 | CH₃ | ⌬H | 12000 |
| FP-54 | 80 | H | 6 | H | C₄H₉(sec) | 9000 |
| FP-55 | 90 | H | 6 | H | C₁₂H₂₅(n) | 21000 |
| FP-56 | 60 | CH₃ | 6 | H | CH₃ | 15000 |
| FP-57 | 60 | H | 8 | H | CH₃ | 10000 |
| FP-58 | 70 | H | 8 | H | C₂H₅ | 24000 |
| FP-59 | 70 | H | 8 | H | C₄H₉(n) | 5000 |
| FP-60 | 50 | H | 8 | H | C₄H₉(n) | 16000 |
| FP-61 | 80 | H | 8 | CH₃ | C₄H₉(iso) | 13000 |
| FP-62 | 80 | H | 8 | CH₃ | C₄H₉(t) | 9000 |
| FP-63 | 60 | H | 8 | H | ⌬H | 7000 |
| FP-64 | 80 | H | 8 | H | CH₂CH(C₂H₅)C₄H₉(n) | 8000 |
| FP-65 | 90 | H | 8 | H | C₁₂H₂₅(n) | 6000 |
| FP-66 | 80 | CH₃ | 8 | CH₃ | C₄H₉(sec) | 18000 |
| FP-67 | 70 | CH₃ | 8 | CH₃ | CH₃ | 22000 |
| FP-68 | 70 | H | 10 | CH₃ | H | 17000 |
| FP-69 | 90 | H | 10 | H | H | 9000 |
| FP-70 | 95 | H | 4 | CH₃ | —(CH₂CH₂O)₂—H | 18000 |
| FP-71 | 80 | H | 4 | H | —(CH₂CH₂O)₂—CH₃ | 16000 |
| FP-72 | 80 | H | 4 | H | —(C₃H₆O)₇—H | 24000 |
| FP-73 | 70 | CH₃ | 4 | H | —(C₃H₆O)₁₃—H | 18000 |
| FP-74 | 90 | H | 6 | H | —(CH₂CH₂O)₂—H | 21000 |
| FP-75 | 90 | H | 6 | CH₃ | —(CH₂CH₂O)₈—H | 9000 |
| FP-76 | 80 | H | 6 | H | —(CH₂CH₂O)₂—C₄H₉(n) | 12000 |
| FP-77 | 80 | H | 6 | H | —(C₃H₆O)₇—H | 34000 |
| FP-78 | 75 | F | 6 | H | —(C₃H₆O)₁₃—H | 11000 |
| FP-79 | 85 | CH₃ | 6 | CH₃ | —(C₃H₆O)₂₀—H | 18000 |
| FP-80 | 95 | CH₃ | 6 | CH₃ | —CH₂CH₂OH | 27000 |
| FP-81 | 80 | H | 8 | CH₃ | —(CH₂CH₂O)₈—H | 12000 |
| FP-82 | 95 | H | 8 | H | —(CH₂CH₂O)₉—CH₃ | 20000 |
| FP-83 | 90 | H | 8 | H | —(C₃H₆O)₇—H | 8000 |
| FP-84 | 95 | H | 8 | H | —(C₃H₆O)₂₀—H | 15000 |
| FP-85 | 90 | F | 8 | H | —(C₃H₆O)₁₃—H | 12000 |
| FP-86 | 80 | H | 8 | CH₃ | —(CH₂CH₂O)₂—H | 20000 |
| FP-87 | 95 | CH₃ | 8 | H | —(CH₂CH₂O)₉—CH₃ | 17000 |
| FP-88 | 90 | CH₃ | 8 | H | —(C₃H₆O)₇—H | 34000 |
| FP-89 | 80 | H | 10 | H | —(CH₂CH₂O)₃—H | 19000 |
| FP-90 | 90 | H | 10 | H | —(C₃H₆O)₇—H | 8000 |
| FP-91 | 80 | H | 12 | H | —(CH₂CH₂O)₇—CH₃ | 7000 |
| FP-92 | 95 | CH₃ | 12 | H | —(C₃H₆O)₇—H | 10000 |

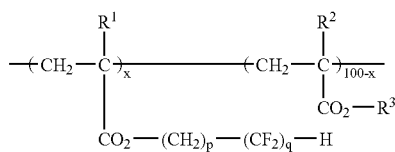

| | x | R¹ | p | q | R² | R³ | Mw |
|---|---|---|---|---|---|---|---|
| FP-93 | 80 | H | 2 | 4 | H | C₄H₉(n) | 18000 |
| FP-94 | 90 | H | 2 | 4 | H | —(CH₂CH₂O)₉—CH₃ | 16000 |
| FP-95 | 90 | CH₃ | 2 | 4 | F | C₆H₁₃(n) | 24000 |
| FP-96 | 80 | CH₃ | 1 | 6 | F | C₄H₉(n) | 18000 |
| FP-97 | 95 | H | 2 | 6 | H | —(C₃H₆O)₇—H | 21000 |
| FP-98 | 90 | CH₃ | 3 | 6 | H | —CH₂CH₂OH | 9000 |
| FP-99 | 75 | H | 1 | 8 | F | CH₃ | 12000 |
| FP-100 | 80 | H | 2 | 8 | H | CH₂CH(C₂H₅)C₄H₉(n) | 34000 |
| FP-101 | 90 | CH₃ | 2 | 8 | H | —(C₃H₆O)₇—H | 11000 |

-continued

| | | | | | | | |
|---|---|---|---|---|---|---|---|
| FP-102 | 80 | H | 3 | 8 | $CH_3$ | $CH_3$ | 18000 |
| FP-103 | 90 | H | 1 | 10 | F | $C_4H_9(n)$ | 27000 |
| FP-104 | 95 | H | 2 | 10 | H | $—(CH_2CH_2O)_9—CH_3$ | 12000 |
| FP-105 | 85 | $CH_3$ | 2 | 10 | $CH_3$ | $C_4H_9(n)$ | 20000 |
| FP-106 | 80 | H | 1 | 12 | H | $C_6H_{13}(n)$ | 8000 |
| FP-107 | 90 | H | 1 | 12 | H | $—(CH_3H_6O)_{13}—H$ | 15000 |
| FP-108 | 60 | $CH_3$ | 3 | 12 | $CH_3$ | $C_2H_5$ | 12000 |
| FP-109 | 60 | H | 1 | 16 | H | $CH_2CH(C_2H_5)C_4H_9(n)$ | 20000 |
| FP-110 | 80 | $CH_3$ | 1 | 16 | H | $—(CH_2CH_2O)_2—C_4H_9(n)$ | 17000 |
| FP-111 | 90 | H | 1 | 18 | H | $—CH_2CH_2OH$ | 34000 |
| FP-112 | 60 | H | 3 | 18 | $CH_3$ | $CH_3$ | 19000 |

FP-113 Mw 39,000: $-(CH_2-HF)_{80}-C(O)-S-(CH_2)_3-(CF_2)_6H$ / $-(CH_2-CH)_{20}-C(O)-O-(C_3H_6O)_7CH_3$

FP-114 Mw 45,000: $-(CH_2-HF)_{90}-C(O)-S-(CH_2)_3-(CF_2)_6H$ / $-(CH_2-CH)_{10}-C(O)-O-(C_3H_6O)_{13}H$

FP-115 Mw 46,000: $-(CH_2-HF)_{75}-C(O)-S-(CH_2)_3-(CF_2)_8H$ / $-(CH_2-CH)_{25}-C(O)-O-(C_2H_4O)_4(C_3H_6O)_7H$

FP-116 Mw 28,000: $-(CH_2-HF)_{80}-C(O)-S-(CH_2)_3-(CF_2)_8H$ / $-(CH_2-CH)_{20}-C(O)-O-(C_3H_6O)_7CH_3$

FP-117 Mw 56,000: $-(CH_2-HF)_{90}-C(O)-NH-(CH_2)_2-(CF_2)_4H$ / $-(CH_2-CH)_{10}-C(O)-O-(C_2H_4O)_4(C_3H_6O)_7H$

FP-118 Mw 32,000: $-(CH_2-C(CH_3))_{85}-C(O)-NH-(CH_2)_2-(CF_2)_4H$ / $-(CH_2-CH)_{15}-C(O)-O-(C_2H_4O)_2H$

FP-119 Mw 29,000: $-(CH_2-CH)_{70}-C(O)-NH-(CH_2)_2-(CF_2)_6H$ / $-(CH_2-CH)_{30}-C(O)-O-(C_2H_4O)_4(C_3H_6O)_7H$

FP-120 Mw 45,000: $-(CH_2-C(CH_3))_{80}-C(O)-NH-(CH_2)_2-(CF_2)_6H$ / $-(CH_2-CH)_{20}-C(O)-O-(C_2H_4O)_4CH_3$

FP-121 Mw 30,000: $-(CH_2-CH)_{95}-C(O)-NH-(CH_2)_2-(CF_2)_8H$ / $-(CH_2-CH)_5-C(O)-O-(C_3H_3O)_{20}H$

FP-122 Mw 32,000: $-(CH_2-CH)_{90}-C(O)-NH-(CH_2)_2-(CF_2)_8H$ / $-(CH_2-CH)_{10}-C(O)-O-(C_3H_3O)_{20}H$

FP-123 Mw 48,000: $-(CH_2-C(CH_3))_{75}-C(O)-NH-(CH_2)_3-(CF_2)_8H$ / $-(CH_2-CH)_{25}-C(O)-O-cyclohexyl$

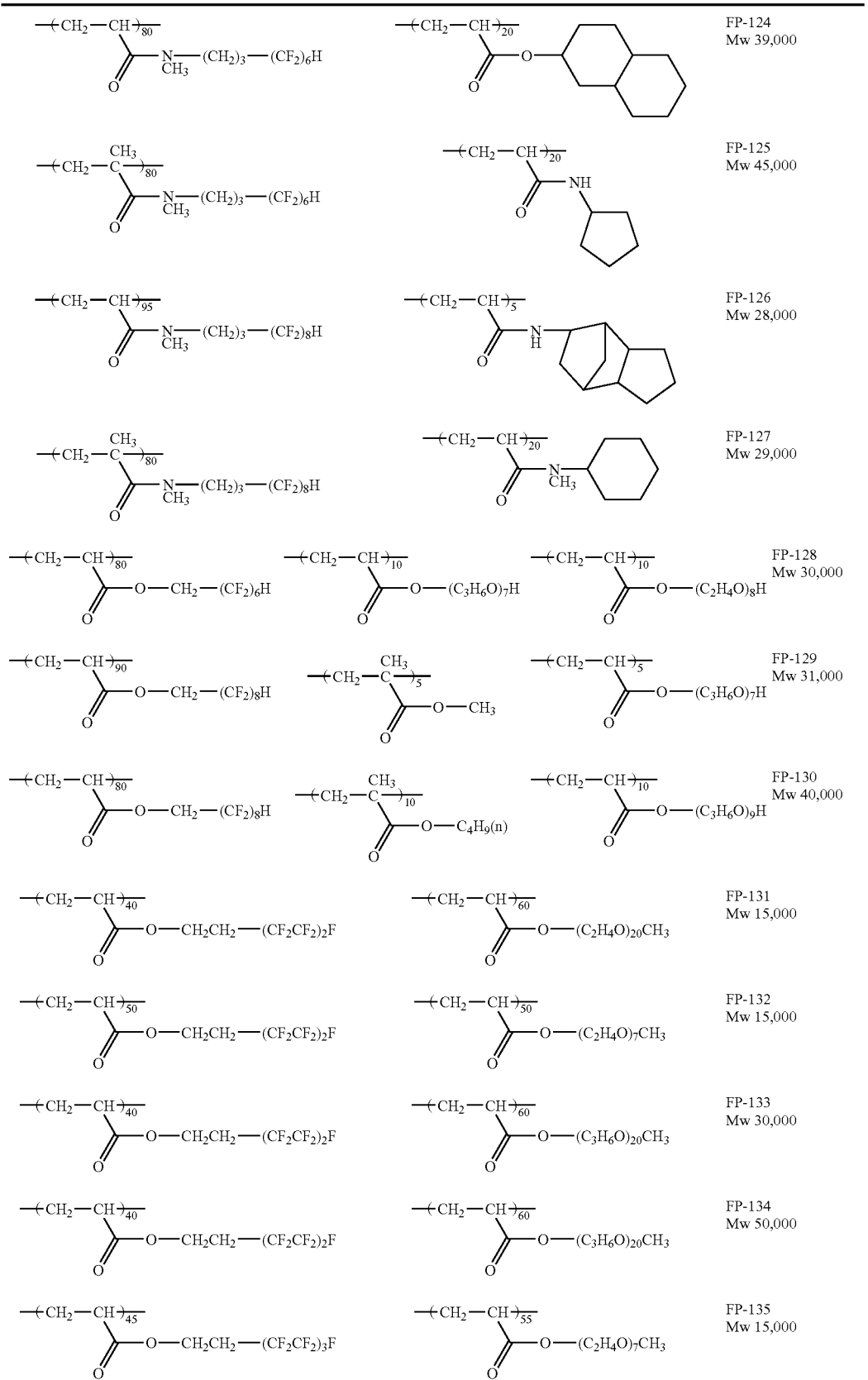

-continued

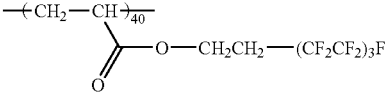 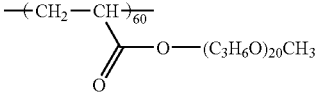 FP-136 Mw 7,000

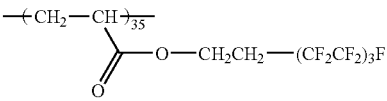 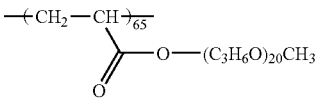 FP-137 Mw 20,000

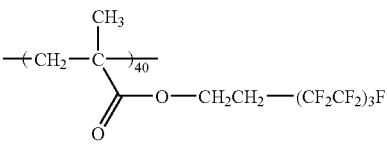 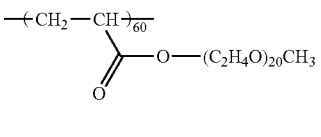 FP-138 Mw 15,000

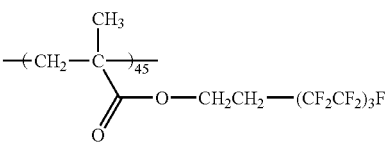 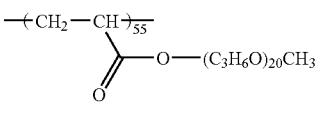 FP-139 Mw 40,000

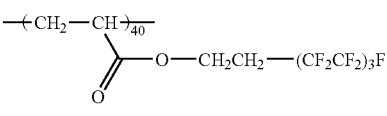 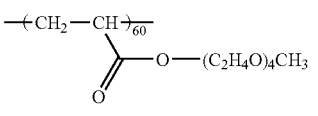 FP-140 Mw 15,000

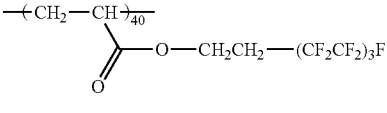 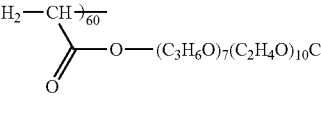 FP-141 Mw 20,000

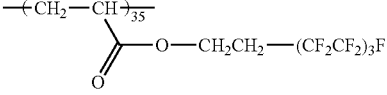 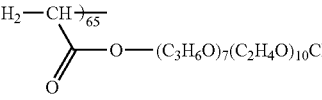 FP-142 Mw 25,000

The anti-glare hard coat layer of the invention may further comprise additives incorporated therein for the purpose of adjusting antistatic properties, electrical conductivity, hardness, etc.

The aforementioned anti-glare hard coat layer of the invention preferably has a thickness of from not smaller than 0.5 μm to not greater than 20 μm, more preferably from not smaller than 0.7 μm to not greater than 15 μm, particularly from not smaller than 1 μm to not greater than 10 μm to have desired physical strength and anti-glare properties. The spreading thickness of the anti-glare hard coat layer solution is predetermined depending on the concentration, viscosity and dryability of the coating solution but is preferably from 1 cc to 40 cc, more preferably from 2 cc to 30 cc, particularly from 5 cc to 25 cc per m². The improvement effect developed by the selection of cellulose acylate film of the invention and solvent formulation can be exerted even in a small spread range but is remarkably exerted in a great spread range, more preferably in a spread of from 10 cc to 25 cc.

[Light-diffusion Layer]

The purpose of the light-diffusing layer is to enhance the viewing angle (particularly downward viewing angle) of liquid crystal display device, making it possible to inhibit contrast drop, reversal of black and white or hue change even if the viewing angle in the observing direction changes.

The inventors confirmed that the distribution of intensity of scattered light rays measured by goniophotometer is related to the effect of improving viewing angle. In other words, the more the light rays emitted by the backlight are diffused by the internal scattering effect of light-transmitting particles contained in the light-diffusing film disposed on the surface of the polarizing plate on the viewing side, the better are the viewing angle properties. However, when the light rays are diffused too much, the resulting back scattering occurs more, causing troubles such as reduction of front brightness and excessive scattering leading to deterioration of image sharpness. Accordingly, it is necessary that the distribution of intensity of scattered light be controlled within a predetermined range. Therefore, extensive studies were made. As a result, it was found that the desired viewability can be accomplished preferably by predetermining the intensity of scattered light at 30°, which is related particularly to the effect of improving viewing angle, to a range of from 0.01% to 0.2%, more preferably from 0.02% to 0.15%, particularly from 0.03% to 0.1% of the intensity of light at an output angle of 0° of scattered light profile.

For the measurement of scattered light profile, a Type GP-5 automatic varied-angle goniophotometer (produced by MURAKAMI COLOR RESEARCH LABORATORY CO., Ltd.) was used on the light-scattering film prepared.

The light-diffusing layer of the invention is formed by a binder, an inorganic filler and a light-transmitting particulate material. As the binder and the inorganic filler there may be used the same materials as used in the anti-glare hard coat layer. As the light-transmitting particulate material there may be used the same particulate mat as mentioned above.

The binder for the light-diffusing layer is incorporated in an amount of from 5% to 80% by weight based on the solid content of the coating composition of the light-diffusing layer.

It is also preferred that the light-diffusing layer of the invention have hard coat properties. The light-diffusing layer may be formed by the same binder, initiator, particulate material and other additives as described with reference to the anti-glare hard coat layer.

[High Refractive Layer]

The anti-reflection film of the invention preferably comprises a high refractive layer incorporated therein to have better anti-reflection properties.

(Inorganic Particulate Material Mainly Composed of Titanium Dioxide)

The high refractive layer of the invention comprises an inorganic particulate material mainly composed of titanium dioxide containing at least one element selected from the group consisting of cobalt, aluminum and zirconium incorporated therein. The term "mainly composed" as used herein is meant to indicate that the component is incorporated in the highest proportion (% by weight) in the components constituting the particle.

The refractive index of the high refractive layer of the invention is from 1.55 to 2.40. This layer is called high refractive layer or middle refractive layer but is occasionally generically termed high refractive layer.

The refractive index of the inorganic particulate material mainly composed of titanium dioxide of the invention is preferably from 1.90 to 2.80, more preferably from 2.10 to 2.80, most preferably from 2.20 to 2.80.

The weight-average particle diameter of the primary particles constituting the inorganic particulate material mainly composed of titanium dioxide is preferably from 1 to 200 nm, more preferably from 1 nm to 150 nm, even more preferably from 1 nm to 100 nm, particularly from 1 nm to 80 nm.

For the measurement of the particle diameter of the inorganic particulate material, a light diffusion method or electrophotography may be used. The specific surface area of the inorganic particulate material is preferably from 10 to 400 $m^2/g$, more preferably from 20 to 200 $m^2/g$, most preferably from 30 to 150 $m^2/g$.

Referring to the crystal structure of the inorganic particulate material mainly composed of titanium dioxide, the inorganic particulate material is mainly composed of rutile structure, rutile/anatase mixed crystal, anatase or amorphous structure, particularly rutile structure. The term "mainly composed" as used herein is meant to indicate that the component is incorporated in the highest proportion (% by weight) in the components constituting the particle.

By incorporating at least one element selected from the group consisting of Co, Al and Zr in the inorganic particulate material mainly composed of titanium dioxide, the photocatalytic activity of titanium dioxide can be inhibited, making it possible to improve the weathering resistance of the high refractive layer of the invention.

A particularly preferred element is Co. Two or more elements are preferably used in combination.

The content of Co, Al or Zr is preferably from 0.05% to 30% by weight, more preferably from 0.1% to 10% by weight, even more preferably from 0.2% to 7% by weight, particularly from 0.3% to 5% by weight, most preferably from 0.5% to 3% by weight based on Ti.

Co, Al and Zr may be present either in the interior or on the surface of the inorganic particulate material mainly composed of titanium dioxide, preferably in the interior of the inorganic particulate material mainly composed of titanium dioxide, most preferably both in the interior and on the surface of the inorganic particulate material mainly composed of titanium dioxide.

The presence (e.g., doping) of Co, Al and Zr in the interior of the inorganic particulate material mainly composed of titanium dioxide can be carried out by various methods. Examples of these methods include those disclosed in Kou Aoki, "Ion Implantation Methods", vol. 18, No. 5, pp. 262-268 1998, Yasushi Aoki, JP-A-11-263620, JP-T-11-512336, European Patent Application Disclosure No. 0335773, and JP-A-5-330825.

At the step of forming the inorganic particulate material mainly composed of titanium dioxide, a method is particularly preferably used which comprises introducing Co, Al and Zr (as disclosed in JP-T-11-512336, European Patent Application Disclosure No. 0335773, and JP-A-5-330825).

Co, Al and Zr are preferably present in the form of oxide.

The inorganic particulate material mainly composed of titanium dioxide preferably further comprises other elements incorporated therein depending on the purpose. The other elements may be incorporated as impurities. Examples of the other elements include Sn, Sb, Cu, Fe, Mn, Pb, Cd, As, Cr, Hg, Zn, Mg, Si, P and S.

The inorganic particulate material mainly composed of titanium dioxide may be subjected to surface treatment. The surface treatment is carried out using an inorganic compound or organic compound. Examples of the inorganic compound to be used in the surface treatment include inorganic compounds containing cobalt (e.g., $CoO_2$, $Co_2O_3$, $Co_3O_4$), inorganic compounds containing aluminium ($Al_2O_3$, $Al(OH)_3$) inorganic compounds containing aluminum ($ZrO_2$, $Zr(OH)_4$), inorganic compounds containing silicon ($SiO_2$) and inorganic compounds containing iron (e.g., $Fe_2O_3$).

Particularly preferred among these inorganic compounds are inorganic compounds containing cobalt, inorganic compounds containing aluminum and inorganic compounds containing zirconium, most preferably inorganic compounds containing cobalt, $Al(OH)_3$ and $Zr(OH)_4$.

Examples of the organic compound to be used in the surface treatment include polyols, alkanolamines, stearic acids, silane coupling agents, and titanate coupling agents. Most desirable among these organic compounds are silane coupling agents.

Examples of the titanate coupling agent employable herein include metal alkoxides such as tetramethoxy titanium, tetraethoxy titanium and tetraisopropoxy titanium, and PRENACT (e.g., KR-TTS, KR-46B, KR-55, KR-41B, produced by AJINOMOTO CO., LTD.).

Preferred examples of the organic compound to be used in the surface treatment include polyols, alkanolaines, and organic compounds having anionic group. Particularly preferred among these organic compounds are organic compounds having carboxyl group, sulfonic acid group or phosphoric acid group.

Stearic acid, lauric acid, oleic acid, linoleic acid, linolenic acid, etc. are preferably used.

The organic compound to be used in the surface treatment preferably further has a crosslinking or polymerizable functional group. Examples of the crosslinking or polymerizable functional group include ethylenically unsaturated groups capable of causing addition reaction/polymerization reaction in the presence of radical seed (e.g., (meth)acrylic group, allyl group, styryl group, vinyloxy group), cation-polymerizable groups (e.g., epoxy group, oxatanyl group, vinyloxy group), and polycondensation reactive groups (e.g., hydrolyzable silyl group, N-methylol group). Preferred among these crosslinking or polymerizable functional groups are ethylenically unsaturated groups.

Two or more of these surface treatment agents may be used in combination. It is particularly preferred that an inorganic compound containing aluminum and an inorganic compound containing zirconium be used in combination.

The inorganic particulate material mainly composed of titanium dioxide of the invention may have a core/shell structure developed by surface treatment as described in JP-A-2001-166104.

The inorganic particulate material mainly composed of titanium dioxide to be incorporated in the high refractive layer is preferably in granular form, spherical form, cubic form, spindle form or amorphous form, particularly amorphous form or spindle form.

(Dispersant)

For the dispersion of the inorganic particulate material mainly composed of titanium dioxide to be incorporated in the high refractive layer of the invention, a dispersant may be used.

For the dispersion of the inorganic particulate material mainly composed of titanium dioxide, a dispersant having an anionic group is particularly preferred.

As the anionic group there is effectively used a group having an acidic proton such as carboxyl group, sulfonic acid group (and sulfo group), phosphoric acid group (and phosphono group) and sulfonamide group or salt thereof. Particularly preferred among these anionic groups are carboxyl group, sulfonic acid group, phosphoric acid group, and salt thereof. Even more desirable among these anionic groups are carboxyl group and phosphoric acid group. One or more anionic groups may be incorporated in one molecule of dispersant.

For the purpose of further improving the dispersibility of the inorganic particulate material, a plurality of anionic groups may be incorporated therein. The number of anionic groups to be incorporated in the dispersant is preferably 2 or more, more preferably 5 or more, particularly 10 or more on the average. A plurality of anionic groups may be incorporated in one molecule of dispersant.

The dispersant preferably further comprises a crosslinking or polymerizable functional group incorporated therein. Examples of the crosslinking or polymerizable functional group include ethylenically unsaturated groups capable of causing addition reaction/polymerization reaction in the presence of radial seed (e.g., (meth)acrylic group, allyl group, styryl group, vinyloxy group), cation-polymerizable groups (e.g., epoxy group, oxatanyl group, vinyloxy group), and polycondensation reactive groups (e.g., hydrolyzable silyl group, N-methylol group). Preferred among these crosslinking or polymerizable functional groups are ethylenically unsaturated groups.

The dispersant which is preferably used in the dispersion of the inorganic particulate material mainly composed of titanium dioxide to be incorporated in the high refractive layer of the invention is a dispersant having an anionic group and a crosslinking or polymerizable functional group and having an anionic group and a crosslinking or polymerizable functional group in its side chains.

The weight-average molecular weight (Mw) of the dispersant having an anionic group and a crosslinking or polymerizable functional group and having an anionic group and a crosslinking or polymerizable functional group in its side chains is not specifically limited but is preferably 1,000 or more. The weight-average molecular weight (Mw) of the dispersant is more preferably from 2,000 to 1,000,000, even more preferably from 5,000 to 200,000, particularly from 10,000 to 100,000.

As the anionic group there is effectively used a group having an acidic proton such as carboxyl group, sulfonic acid group (sulfo group), phosphoric acid group (phosphono group) and sulfonamide group or salt thereof. Particularly preferred among these anionic groups are carboxyl group, sulfonic acid group, phosphoric acid group, and salt thereof. Even more desirable among these anionic groups are carboxyl group and phosphoric acid group. The number of anionic groups to be incorporated per molecule of dispersant is preferably 2 or more, more preferably 5 or more, particularly 10 or more on the average. A plurality of anionic groups may be incorporated in one molecule of dispersant.

The dispersant having an anionic group and a crosslinking or polymerizable functional group and having an anionic group and a crosslinking or polymerizable functional group in its side chains has the aforementioned anionic group in its side chains or at the ends thereof.

The dispersant which is particularly preferred is a dispersant having an anionic group in its side chains. In the dispersant having an anionic group in its side chains, the proportion of the anionic group-containing repeating units is from $10^{-4}$ to 100 mol-%, preferably from 1 to 50 mol-%, particularly from 5 to 20 mol-% based on the total repeating units.

Examples of the crosslinking or polymerizable functional group include ethylenically unsaturated groups capable of causing addition reaction/polymerization reaction in the presence of radical seed (e.g., (meth)acrylic group, allyl group, styryl group, vinyloxy group), cation-polymerizable groups (e.g., epoxy group, oxatanyl group, vinyloxy group), and polycondensation reactive groups (e.g., hydrolyzable silyl group, N-methylol group). Preferred among these crosslinking or polymerizable functional groups are ethylenically unsaturated groups.

The number of crosslinking or polymerizable functional groups to be incorporated per molecule of dispersant is preferably 2 or more, more preferably 5 or more, particularly 10 or more on the average. A plurality of crosslinking or polymerizable functional groups may be incorporated per molecule of dispersant.

Examples of the repeating units having ethylenically unsaturated groups in its side chains in the dispersant which is preferably used in the invention include poly-1,2-butadiene and poly-1,2-isoprene repeating units and (meth)acrylic acid ester or amide repeating units to which specific residues (R in —COOR or —CONHR) are connected. Examples of the aforementioned specific residues (R group) include —$(CH_2)_n$—$CR_{21}$=$CR_{22}R_{23}$, —$(CH_2O)_n$—$CH_2CR_{21}$=$CR_{22}R_{23}$, —$(CH_2CH_2O)_n$—$CH_2CR_{21}$=$CR_{22}R_{23}$, —$(CH_2)_n$—NH—CO—O—$CH_2CR_{21}$=$CR_{22}R_{23}$, —$(CH_2)_n$—O—CO—$CR_{21}$=$CR_{22}R_{23}$, and —$(CH_2CH_2O)_2$—X (in which $R_{21}$ to $R_{23}$ each represent a hydrogen atom, halogen atom, carbon atom or $C_1$-$C_{20}$ alkyl, aryl, alkoxy or aryloxy group, with the proviso that $R_{21}$, and $R_{22}$ or $R_{23}$ may be connected to each other to form a cycle n represents an integer of from 1 to 10; and X represents a dicyclopentadienyl residue). Specific examples of R in the ester residue include —$CH_2CH$=$CH_2$ (corresponding to allyl (meth)acrylate disclosed in JP-A-64-17047), —$CH_2CH_2O$—$CH_2CH$=$CH_2$, —$CH_2CH_2OCOCH$=$CH_2$, —$CH_2CH_2OCOC(CH_3)$=$CH_2$, —$CH_2C(CH_3)$=$CH_2$, —$CH_2CH$=$CH$—$C_6H_5$, —$CH_2CH_2OCOCHCH$=$CH$—$C_6H_5$, —$CH_2CH_2$—NH-COO—$CH_2CH$=$CH_2$, and —$CH_2CH_2O$—X (in which X is a dicyclopentadienyl residue). Specific examples of R in the amide residue include —CH$_2$CH=CH$_2$, —CH$_2$CH$_2$—Y (in which Y is a 1-cyclohexenyl residue), —CH$_2$CH$_2$—OCO—CH=CH$_2$, and —CH$_2$CH$_2$—OCO—C(CH$_3$)=CH$_2$.

In the dispersant having ethylenically unsaturated groups, free radicals (polymerization initiating radical or growing radical during the polymerization of polymerizable compound) are added to the unsaturated groups to cause addition polymerization of molecules directly or via polymerization chain of polymerizable compound. As a result, a crosslink is formed between molecules to cause curing. Alternatively, atoms (or hydrogen atom on the carbon atom adjacent to unsaturated bond group) are pulled from the molecule with free radicals to produce polymer radicals which are then bonded to each other to form a crosslink between molecules that causes curing.

The units contained in the crosslinking or polymerizable functional group may constitute all repeating units other than anionic group-containing repeating units. Preferably, the proportion of these units is from 5 to 50 mol-%, particularly from 5 to 30 mol-% based on the total crosslinking or polymerizable functional groups.

The dispersant which is preferably used in the invention may be a copolymer with proper monomers other than the monomers having a crosslinking or polymerizable functional group and an anionic group. The copolymerizing components are not specifically limited but may be selected from various standpoints of view such as dispersion stability, compatibility with other monomer components and strength of film thus formed. Preferred examples of the copolymerizing components employable herein include methyl (meth)acrylate, n-butyl (meth)acrylate, t-butyl (meth)acrylate, cyclohexyl (meth)acrylate, and styrene.

The form of the dispersant which is preferably used in the invention is not specifically limited but is preferably a block copolymer or random copolymer, particularly random copolymer from the standpoint of cost and ease of synthesis.

As the dispersant which is preferably used in the invention there may be used any of compounds of the general formulae [ka-1] to [ka-6] in JP-A-2004-29705. The dispersant for the invention is not limited to these compounds.

The amount of the dispersant to be used is preferably from 1% to 50% by weight, more preferably from 5% to 30% by weight, most preferably from 5% to 20% by weight based on the inorganic particulate material. Two or more dispersants may be used in combination.

(High Refractive Layer and Method for the Formation Thereof)

The inorganic particulate material mainly composed of titanium dioxide to be incorporated in the high refractive layer is used in the form of dispersion to form the high refractive layer.

The inorganic particulate material is dispersed in a dispersion medium in the presence of the aforementioned dispersant.

As the dispersion medium there is preferably used a liquid having a boiling point of from 60° C. to 170° C. Examples of the dispersing medium employable herein include water, alcohols (e.g., methanol, ethanol, isopropanol, butanol, benzyl alcohol), ketones (e.g., acetone, methyl ethyl ketone, methyl isobutyl ketone, cyclohexanone), esters (e.g., methyl acetate, ethyl acetate, propyl acetate, butyl acetate, methyl formate, ethyl formate, propyl formate, butyl formate), aliphatic hydrocarbons (e.g., hexane, cyclohexanone), halogenated hydrocarbons (e.g., methylene chloride, chloroform, carbon tetrachloride), aromatic hydrocarbons (e.g., benzene, toluene, xylene), amides (e.g., dimethyl formamide, dimethyl acetamide, n-methyl pyrrolidone), ethers (e.g., diethyl ether, dioxane, tetrahydrofurane), and ether alcohols (e.g., 1-methoxy-2-propanol). Toluen, xylene, methyl ethyl ketone, methyl isobutyl ketone, cyclohexanone and butanol are preferred.

Preferred among these dispersing media are methyl ethyl ketone, methyl isobutylene ketone, cyclohexanone, and toluene.

For the dispersion of the inorganic particulate material, a dispersing machine is used. Examples of the dispersing machine employable herein include sand grinder mill (e.g., bead mill with pin), high speed impellor mill, pebble mill, roller mill, attritor, and colloid mill. Particularly preferred among these dispersing machines are sand grinder mill and high speed impellor mill. Further, pre-dispersion may be effected. Examples of the dispersing machine to be used in pre-dispersion include ball mill, three-roll mill, kneader, and extruder.

The inorganic particulate material is preferably present divided as finely as possible in the dispersing medium. The weight-average particle diameter of the inorganic particulate material is from 1 nm to 200 nm, preferably from 5 nm to 150 nm, more preferably from 10 nm to 100 nm, particularly from 10 nm to 80 nm.

By dividing the inorganic particulate material to a size of 200 nm or less, the resulting high refractive layer cannot be impaired in its transparency.

The high refractive layer to be used in the invention is preferably formed by adding optionally a binder precursor required for the formation of matrix (same as binder precursor for the aforementioned anti-glare hard coat layer), a photopolymerization initiator, etc. to the aforementioned dispersion of inorganic particulate material in a dispersing medium to obtain a high refractive layer coating composition, spreading the high refractive layer coating solution over a transparent support, and then subjecting the ionizing radiation-curing compound (e.g., polyfunctional monomer or polyfunctional oligomer) to crosslinking reaction or polymerization reaction.

Further, the binder in the high refractive layer is preferably subjected to crosslinking reaction or polymerization reaction with the dispersant at the same time or after the spreading of the coating solution.

The anionic group in the dispersant is taken in the binder in the high refractive layer thus prepared as a result of the crosslinking or polymerization reaction of the aforementioned preferred dispersant with the ionizing radiation-curing polyfunctional monomer or polyfunctional oligomer. Further, the anionic group in the binder in the high refractive layer acts to keep the inorganic particulate material dispersed. The crosslinked or polymer provides the binder with a capability of forming film to improve the physical strength, chemical resistance and weathering resistance of the high refractive layer containing an inorganic particulate material.

The polymerization reaction of the photopolymerizable polyfunctional monomer is preferably effected in the presence of a photopolymerization initiator. As the photopolymerization initiator there is preferably used a photoradical polymerization initiator or photocation polymerization initiator, particularly photoradical polymerization initiator.

As the photoradical polymerization initiator there may be the same compound as used in the anti-glare hard coat layer.

The binder to be used in the high refractive layer preferably further comprises a silanol group incorporated therein. When the binder further comprises a silanol group incorporated therein, the physical strength, chemical resistance and weathering resistance can be further improved.

The silanol group can be incorporated in the binder by adding a silane coupling agent represented by the general formula 4 having a crosslinking or polymerizable functional group, a partial hydrolyzate or a condensate thereof to the aforementioned high refractive layer-forming coating composition, spreading the coating composition over a transparent support, and then subjecting the aforementioned dispersant, polyfunctional monomer or polyfunctional oligomer, or polyfunctional monomer or oligomer or silane coupling agent represented by the general formula 4 having a crosslinking or polymerizable functional group to crosslinking reaction or polymerization reaction.

The binder in the high refractive layer preferably has an amino group or quaternary ammonium group.

The binder in the high refractive layer having an amino group or quaternary ammonium group can be formed by adding a monomer having a crosslinking or polymerizable functional group and a monomer having an amino group or quaternary ammonium group to the aforementioned high refractive layer-forming coating composition, spreading the coating composition over a transparent support, and then subjecting the aforementioned dispersant or polyfunctional monomer or oligomer to crosslinking reaction or polymerization reaction.

The monomer having an amino group or quaternary ammonium group acts as a dispersing aid for inorganic particulate material in the coating composition. After spreading, the monomer having an amino group or quaternary ammonium group undergoes crosslinking or polymerization reaction with the dispersant, polyfunctional monomer or polyfunctional oligomer to form a binder that keeps the inorganic particulate material well dispersed in the high refractive layer, making it possible to prepare a high refractive layer excellent in physical strength, chemical resistance and weathering resistance.

Preferred examples of the monomer having an amino group or quaternary ammonium group include N,N-dimethyl aminoethyl (meth)acrylate, N,N-dimethylaminopropyl (meth)acrylate, (meth)acrylic acid hydroxypropyl trimethylammonium chloride, and dimethyl allyl ammonium chloride.

The amount of the monomer having an amino group or quaternary ammonium group to be used is preferably from 1% to 40% by weight, more preferably from 3% to 30% by weight, particularly from 3% to 20% by weight based on the dispersant. By effecting crosslinking or polymerization reaction at the same with or after the spreading of the high refractive layer coating solution to form a binder, these monomers are allowed to act effectively before the spreading of the high refractive layer coating solution.

The crosslinked or polymerized binder has polymer main chains crosslinked or polymerized. Examples of these polymer main chains include polyolefins (saturated hydrocarbon), polyethers, polyureas, polyurethanes, polyesters, polyamines, polyamides, and melamine resins. Preferred among these polymer main chains are polyolefin main chains, polyether main chains, and polyurea main chains. More desirable among these polymer chain are polyolefin main chain and polyether main chain. Most desirable among these polymer main chains is polyolefin main chain.

The polyolefin main chain is composed of saturated hydrocarbon. The polyolefin main chain can be obtained, e.g., by the addition polymerization reaction of unsaturated polymerizable groups. The polyether main chain comprises repeating units bonded to each other via ether bond (—O—). The polyether main chain is obtained, e.g., by the ring-opening polymerization reaction of epoxy groups. The polyurea main chain comprises repeating units bonded to each other via urea bond (—NH—CO—NH—). The polyurea main chain is obtained, e.g., by the polycondensation reaction of isocyanate group with amino group. The polyurethane main chain comprises repeating units bonded to each other via urethane bond (—NH—CO—O—). The polyurethane main chain is obtained, e.g., by the polycondensation reaction of isocyanate group with hydroxyl group (including N-methylol group). The polyester main chain comprises repeating units bonded to each other via ester bond (—CO—O—). The polyester main chain is obtained, e.g., by the polycondensation reaction of carboxyl group (including acid halide) with hydroxyl group (including N-methylol group). The polyamine main chain comprises repeating units connected to each other via imino bond (—NH—). The polyamine main chain is obtained, e.g., by the ring-opening polymerization reaction of ethyleneimine groups. The polyamide main chain comprises repeating units connected to each other via amide bond (—NH—CO—). The polyamide main chain is obtained, e.g., by the reaction of isocyanate group with carboxyl group (including acid halide). The melamine resin main chain is obtained, e.g., by the polycondensation reaction of triazine group (e.g., melamine) with aldehyde (e.g., formaldehyde). In the melamine resin main, the main chain itself has a crosslinked or polymer structure.

The anionic group is preferably connected to the main chain as a binder side chain via connecting group.

The connecting group via which the anionic group and the binder main chain are connected to each other is preferably a divalent group selected from the group consisting of —CO—, —O—, alkylene group, arylene group and combination thereof. The crosslinked or polymer structure comprises two or more main chains connected chemically (preferably covalently) to each other. The crosslinked or polymer structure preferably comprises three or more main chains covalently connected to each other. The crosslinked or polymer structure is preferably composed of divalent or higher groups selected from the group consisting of —CO—, —O—, —S—, nitrogen atom, phosphorus atom, aliphatic residue, aromatic residue and combination thereof.

The binder is preferably a copolymer having a repeating unit having an anionic group and a repeating unit having a crosslinked or polymer structure. The proportion of the repeating unit having an anionic group in the copolymer is preferably from 2 to 96 mol-%, more preferably from 4 to 94 mol-%, most preferably from 6 to 92 mol-%. The repeating unit may have two or more anionic groups. The proportion of the repeating unit having a crosslinked or polymer structure in the copolymer is preferably from 4 to 98 mol-%, more preferably from 6 to 96 mol-%, most preferably from 8 to 94 mol-%.

The repeating units constituting the binder may have both an anionic group and a crosslinked or polymer structure. The binder may comprise other repeating units (repeating unit having neither anionic group nor crosslinked or polymer structure) incorporated therein.

Preferred examples of the other repeating units include those having silanol groups, amino groups and quaternary ammonium groups.

In the repeating unit having silanol group, the silanol group is connected to the main chain of the binder directly or via connecting group. The silanol group is preferably connected to the main chain of the binder as a side chain via connecting group. The connecting group via which the silanol group and the binder main chain are connected to each other is preferably a divalent group selected from the group consisting of —CO—, —O—, alkylene group, arylene group and combination thereof. In the case where the binder contains a repeating unit having a silanol group, the proportion of the repeating unit in the binder is preferably from 2 to 98 mol-%, more preferably from 4 to 96 mol-%, most preferably from 6 to 94 mol-%.

In the repeating unit having an amino group or quaternary ammonium group, the amino group or quaternary ammonium group is connected to the main chain of the binder directly or via connecting group. The amino group or quaternary ammonium group is preferably connected to the main chain of the binder as a side chain via connecting group. The amino group or quaternary ammonium group is preferably a secondary amino group, tertiary amino group or quaternary ammonium group, more preferably tertiary amino group or quaternary ammonium group. The group connected to the nitrogen atom in the secondary amino group, tertiary amino group or quaternary ammonium group is preferably an alkyl group, more preferably a $C_1$-$C_{12}$ alkyl group, even more preferably a $C_1$-$C_6$ alkyl group. The counter ion of quaternary ammonium group is preferably halide ion. The connecting group via which the amino group or quaternary ammonium group and the binder main chain are connected to each other is preferably a divalent group selected from the group consisting of —CO—, —NH—, —O—, alkylene group, arylene group and combination thereof. In the case where the binder contains an amino group or quaternary ammonium group, the proportion of the repeating unit in the binder is preferably from 0.1 to 32 mol-%, more preferably from 0.5 to 30 mol-%, most preferably from 1 to 28 mol-%.

The silanol group, amino group or quaternary ammonium group can exert the same effects as mentioned above also when they are incorporated in the repeating unit having an anionic group or the repeating unit having a crosslinked or polymer structure.

The crosslinked or polymerized binder is preferably prepared by subjecting the high refractive layer-forming coating composition spread over the transparent support to crosslinking or polymerization reaction at the same time as or after spreading.

The binder for the high refractive layer is incorporated in an amount of from 5% to 80% by weight based on the solid content of the high refractive layer coating composition.

The inorganic particulate material acts to control the refractive index of the high refractive layer and inhibit the curing shrinkage of the high refractive layer.

The inorganic particulate material is preferably dispersed in the high refractive layer as much finely as possible. The weight-average particle diameter of the inorganic particulate material is from 1 nm to 200 nm. The weight-average particle diameter of the inorganic particulate material in the high refractive layer is preferably from 5 nm to 150 nm, more preferably from 10 nm to 100 nm, most preferably from 10 nm to 80 nm.

By dividing the inorganic particulate material to a size of 200 nm or less, the resulting high refractive layer cannot be impaired in its transparency.

The content of the inorganic particulate material in the high refractive layer is preferably from 10% to 90% by weight, more preferably from 15% to 80% by weight, particularly from 15% to 75% by weight based on the weight of the high refractive layer. Two or more inorganic particulate materials may be incorporated in combination in the high refractive layer.

In the case where a low refractive layer is provided on the high refractive layer, the refractive index of the high refractive layer is preferably higher than that of the transparent support.

The high refractive layer is preferably made of a binder obtained by the crosslinking or polymerization reaction of an ionizing radiation-curing compound containing an aromatic ring, an ionizing radiation-curing compound containing a halogen atom (e.g., Br, I, Cl) other than fluorine or an ionizing radiation-curing compound containing an atom such as S, N and P.

In order to prepare an anti-reflection film by forming a low refractive layer on the high refractive layer, the refractive index of the high refractive layer is preferably from 1.55 to 2.40, more preferably from 1.60 to 2.20, even more preferably from 1.65 to 2.10, most preferably from 1.80 to 2.00.

The high refractive layer may comprise a resin, a surface active agent, an antistatic agent, a coupling agent, a thickening agent, a coloration inhibitor, a coloring agent (pigment, dye), an anti-foaming agent, a leveling agent, a fire retardant, an ultraviolet absorber, an infrared absorber, an adhesion provider, a polymerization inhibitor, an oxidation inhibitor, a surface modifier, an electrically-conductive particulate metal, etc. incorporated therein besides the aforementioned components (e.g., inorganic particulate material, polymerization initiator, photosensitizer).

The thickness of the high refractive layer can be properly designed depending on the purpose. In the case where the high refractive layer is used as an optical interference layer described later, the thickness of the high refractive layer is preferably from 30 nm to 200 nm, more preferably from 50 nm to 170 nm, particularly from 60 nm to 150 nm.

The strength of the high refractive layer is preferably H or more, more preferably 2H or more, most preferably 3H or more as determined by pencil hardness test according to JIS K-5400.

The abrasion of the high refractive layer from before test to after test is preferably as small as possible as determined by Taber test according to JIS K-5400.

The haze of the high refractive layer is preferably as low as possible if the high refractive layer is free of particulate material for providing anti-glare properties. The haze of the high refractive layer is preferably 5% or less, more preferably 3% or less, particularly 1% or less.

The high refractive layer is preferably formed on the transparent support directly or with other layers interposed therebetween.

In the invention, the crosslinking reaction or polymerization reaction of the ionizing radiation-curing compound is preferably effected in an atmosphere having an oxygen concentration of 10 vol-% or less. This applies not only during the formation of the high refractive layer but also during the formation of the anti-glare hard coat layer or light-diffusing layer.

The high refractive layer formed in an atmosphere having an oxygen concentration of 10 vol-% or less exhibits an enhanced physical strength, chemical resistance, weathering resistance and adhesion to the adjacent layers.

The high refractive layer is preferably formed by the crosslinking or polymerization reaction of the ionizing radiation-curing compound in an atmosphere having an oxygen concentration of 6 vol-% or less, more preferably 4 vol-% or less, particularly 2 vol-% or less, most preferably 1 vol-% or less.

The reduction of the oxygen concentration to 10 vol-% or less is preferably carried out by replacing the atmosphere (nitrogen concentration: about 79 vol-%; oxygen concentration: about 21 vol-%) by another gas, more preferably nitrogen gas (nitrogen purge).

[Hard Coat Layer]

As the hard coat layer there is preferably used a layer which is not anti-glare to provide the anti-reflection film with desired physical strength, i.e., so-called smooth hard coat layer. The hard coat layer is provided on the surface of the transparent support. It is particularly preferred that the smooth hard coat layer be disposed interposed between the transparent support and the anti-glare hard coat layer, between the transparent support and the light-diffusing layer or between the transparent support and the high refractive layer.

The hard coat layer is preferably formed by the crosslinking reaction or polymerization reaction of the ionizing radiation-curing compound. The hard coat layer can be formed, e.g., by subjecting a coating composition containing an ionizing radiation-curing polyfunctional monomer or oligomer spread over a transparent support to crosslinking reaction or polymerization reaction.

As the ionizing radiation-curing polyfunctional monomer or oligomer there is preferably used a photo-polymerizable or electron ray-polymerizable or radiation-polymerizable polyfunctional monomer or oligomer, particularly photopolymerizable polyfunctional monomer or oligomer.

Examples of the photopolymerizable functional group include unsaturated polymerizable functional groups such as (meth)acryloyl group, vinyl group, styryl group and allyl group, particularly (meth)acryloyl group. Specific examples of the ionizing radiation-curing polyfunctional monomers or oligomers include the same compounds as described with reference to the anti-glare hard coat layer.

Specific examples of the photopolymerizable polyfunctional monomers having a photopolymerizable functional group include those exemplified with reference to the high refractive layer. The polymerization of these monomers is preferably effected in the presence of a photopolymerization initiator or photosensitizer. The photopolymerization reaction is preferably effected by irradiating with ultraviolet rays after the spreading and drying of the hard coat layer coating solution.

The binder for hard coat layer is added in an amount of from 30% to 95% by weight based on the solid content of the hard coat layer coating composition.

The hard coat layer preferably comprises an inorganic particulate material having a primary average particle diameter of 200 nm or less incorporated therein. The term "average particle diameter" as used herein is meant to indicate weight-average particle diameter. By predetermining the primary average particle diameter to be 200 nm or less, the resulting hard coat layer cannot be impaired in its transparency.

The inorganic particulate material acts to raise the hardness of the hard coat layer and inhibit the curing shrinkage of the coat layer. The inorganic particulate material is also added for the purpose of controlling the refractive index of the hard coat layer.

Examples of the inorganic particulate material other than those exemplified with reference to the high refractive layer include silicon dioxide, aluminum oxide, calcium carbonate, barium sulfate, talc, kaolin, calcium sulfate, titanium dioxide, zirconium oxide, tin oxide, ITO and zinc oxide in particulate form. Preferred among these inorganic particulate materials are silicon dioxide, titanium dioxide, zirconium oxide, aluminum oxide, tin oxide, ITO and zinc oxide.

The average diameter of primary particles in the inorganic particulate material is preferably from 5 nm to 200 nm, more preferably from 10 nm to 150 nm, even more preferably from 20 nm to 100 nm, particularly from 20 nm to 50 nm.

The inorganic particulate material is preferably dispersed in the hard coat layer as much finely as possible.

The particle size of the inorganic particulate material in the hard coat layer is preferably from 5 nm to 300 nm, more preferably from 10 nm to 200 nm, even more preferably from 20 nm to 150 nm, particularly from 20 nm to 80 nm as calculated in terms of average particle diameter.

The content of the inorganic particulate material in the hard coat layer is preferably from 10% to 90% by weight, more preferably from 15% to 80% by weight, particularly from 15% to 75% by weight based on the total weight of the hard coat layer.

The thickness of the hard coat layer can be properly designed depending on the purpose. The thickness of the hard coat layer is preferably from 0.2 μm to 10 μm, more preferably from 0.5 μm to 7 μm, particularly from 0.7 μm to 5 μm.

The strength of the hard coat layer is preferably H or more, more preferably 2H or more, most preferably 3H or more as determined by pencil hardness test according to JIS K-5400.

The abrasion of the hard coat layer from before test to after test is preferably as small as possible as determined by Taber test according to JIS K-5400. In the case where the hard coat layer is formed by the crosslinking reaction or polymerization reaction of the ionizing radiation-curing compound, the crosslinking reaction or polymerization reaction is preferably effected in an atmosphere having an oxygen concentration of 10 vol-% or less. The hard coat layer formed in an atmosphere having an oxygen concentration of 10 vol-% or less exhibits an enhanced physical strength and chemical resistance.

The crosslinking reaction or polymerization reaction of the ionizing radiation-curing compound is preferably effected in an atmosphere having an oxygen concentration of 6 vol-% or less, more preferably 4 vol-% or less, particularly 2 vol-% or less, most preferably 1 vol-% or less.

The reduction of the oxygen concentration to 10 vol-% or less is preferably carried out by replacing the atmosphere (nitrogen concentration: about 79 vol-%; oxygen concentration: about 21 vol-%) by another gas, more preferably nitrogen gas (nitrogen purge).

The hard coat layer is preferably formed by spreading the hard coat layer-forming coating composition over the surface of the transparent support.

[Low Refractive Layer]

The low refractive layer of the invention will be further described hereinafter.

The refractive index of the low refractive layer in the anti-reflection film of the invention is from 1.20 to 1.49, preferably from 1.30 to 1.44.

The materials constituting the low refractive layer of the invention will be described hereinafter.

The low refractive layer of the invention preferably comprises a fluorine-containing polymer incorporated therein as a low refractive binder. The fluorine-containing polymer is preferably one having a dynamic friction coefficient of from 0.03 to 0.15 and a contact angle of from 90° to 120° with respect to water which undergoes crosslinking when heated or irradiated with ionizing radiation. As previously mentioned, the low refractive layer of the invention may comprise an inorganic filler incorporated therein for enhancing the strength thereof.

Examples of the fluorine-containing polymer which is preferably used in the low refractive layer include hydrolyzates and dehydration condensates of perfluoroalkyl group-containing silane compounds (e.g., (heptadecafluoro-1,1,2,2-tetrahydrodecyl)triethoxy silane). Other examples of the fluorine-containing polymer include fluorine-containing copolymers comprising as constituents a fluorine-containing monomer unit and a constituent unit for providing crosslinking reactivity.

Specific examples of the fluorine-containing monomer include fluoroolefins (e.g., fluoroethylene, vinylidene fluoride, tetrafluoroethylene, perfluorooctylethylene, hexafluoropropylene, perfluoro-2,2-dimethyl-1,3-dioxol), partly or fully fluorinated alkyl ester derivatives of (meth)acrylic acid (e.g., Biscoat 6FM (produced by OSAKA ORGANIC CHEMICAL INDUSTRY LTD.), M-2020 (produced by DAIKIN INDUSTRIES, ltd.), and partly or fully fluorinated vinyl ether derivatives of (meth)acrylic acid. Preferred among these fluorine-containing monomer units are perfluoroolefins. Particularly preferred among these fluorine-containing monomer units is hexafluoropropylene from the standpoint of refractive index, solubility, transparency, availability, etc.

Examples of the constituent unit for providing crosslinking reactivity include constituent units obtained by the polymerization of monomers previously having self-crosslinkable functional group in molecule such as glycidyl (meth)acrylate and glycidyl vinyl ether, constituent units obtained by the polymerization of monomers having carboxyl group, hydroxyl group, amino group, sulfo group, etc. (e.g., (meth) acrylic acid, methylol (meth)acrylate, hydroxyalkyl (meth) acrylate, allyl acrylate, hydroxy ethyl vinyl ether, hydroxy butyl vinyl ether, maleic acid, crotonic acid), and constituent units obtained by incorporating crosslinking reactive groups such as (meth)acryloyl group into these constituent units by polymer reaction (e.g., method involving the action of acrylic acid chloride on hydroxyl group).

Besides the aforementioned fluorine-containing monomer units and the constituent units for providing crosslinking reactivity, monomers free of fluorine atom may be properly copolymerized from the standpoint of solubility in solvent and transparency of film. The monomer units which can be used in combination with the aforementioned monomer units are not specifically limited. Examples of the monomer units employable herein include olefins (e.g., ethylene, propylene, isoprene, vinyl chloride, vinylidene chloride), acrylic acid esters (e.g., methyl acrylate, ethyl acrylate, 2-ethylhexyl acrylate), methacrylic acid esters (e.g., methyl methacrylate, ethyl methacrylate, butyl methacrylate, ethylene glycol dimethacrylate), styrene derivatives (e.g., styrene, divinylbenzene, vinyl toluene, α-methylstyrene), vinyl ethers (e.g., methyl vinyl ether, ethyl vinyl ether, cyclohexyl vinyl ether), vinyl esters (e.g., vinyl acetate, vinyl propionate, vinyl cinnamate), acrylamides (e.g., N-tert-butyl acrylamide, N-cyclohexylacylamide), methacrylamides, and acrylonitrile derivatives.

The aforementioned polymer may be used properly in combination with a hardener as disclosed in JP-A-10-25388 and JP-A-10-147739.

A particularly useful fluorine-containing polymer to be used in the low refractive layer is a random copolymer of perfluoroolefin and vinyl ether or vinyl ester. The fluorine-containing polymer preferably contains a group which can undergo crosslinking reaction per se (e.g., radical reactive group such as (meth)acryloyl group, ring-opening polymerizable group such as epoxy group and oxetanyl group). These crosslinking reactive group-containing polymerizing units preferably account for from 5 to 70 mol-%, particularly from 30 to 60 mol-% of all the polymerizing units of the polymer.

A preferred embodiment of the copolymer to be incorporated in the low refractive layer is one represented by the general formula 2.

In the general formula 2, L represents a $C_1$-$C_{10}$ connecting group, preferably a $C_1$-$C_6$ connecting group, particularly $C_2$-$C_4$ connecting group. The connecting group may be straight-chain or may have a branched or cyclic structure. The connecting group may have hetero atoms selected from the group consisting of oxygen, nitrogen and sulfur.

Preferred examples of L include *—$(CH_2)_2$—O—**, *—$(CH_2)_2$—NH—**, *—$(CH_2)_4$—O—**, *—$(CH_2)_6$—O—**, *—$(CH_2)$—O—$(CH_2)_2$—O—**, *—CONH—$(CH_2)_3$—O—**, *—$CH_2CH(OH)CH_2$—O—**, and *—$CH_2CH_2OCONH(CH_2)_3$—O—** (in which * indicates the connecting site on the polymer main chain side and ** indicates the connecting site on the (meth)acryloyl group side). The suffix m represents 0 or 1.

In the general formula 2, X represents a hydrogen atom or methyl group, preferably hydrogen atom from the standpoint of curing reactivity.

In the general formula 2, the group A represents a repeating unit derived from arbitrary vinyl monomer. The repeating unit is not specifically limited so far as it is a constituent of a monomer copolymerizable with hexafluoropropylene. The repeating unit may be properly selected from the standpoint of adhesion to substrate, Tg of polymer (contributing to film hardness), solubility in solvent, transparency, slipperiness, dustproofness, stainproofness, etc. The repeating unit may be composed of a single or a plurality of vinyl monomers depending on the purpose.

Preferred examples of the aforementioned vinyl monomer include vinyl ethers such as methyl vinyl ether, ethyl vinyl ether, t-butyl vinyl ether, cyclohexyl vinyl ether, isopropyl vinyl ether, hydroxyethyl vinyl ether, hydroxybutyl vinyl ether, glycidyl vinyl ether and allyl vinyl ether, vinyl esters such as vinyl acetate, vinyl propionate and vinyl butyrate, (meth)acrylates such as methyl (meth)acrylate, ethyl (meth) acrylate, hydroxyethyl (meth)acrylate, glycidyl methacrylate, allyl (meth)acrylate and (meth)acryloyloxypropyl trimethoxysilane, styrene derivatives such as styrene and p-hydroxymethylstyrene, unsaturated carboxylic acids such as crotonic acid, maleic acid and itaconic acid, and derivatives thereof. More desirable among these vinyl monomers are vinyl ether derivatives and vinyl ester derivatives. Particularly preferred among these vinyl monomers are vinyl ether derivatives.

The suffixes x, y and z each represent the molar percentage of the respective constituent component and satisfy the relationships $30 \leq x \leq 60$, $5 \leq y \leq 70$ and $0 \leq z \leq 65$, preferably $35 \leq x \leq 55$, $30 \leq y \leq 60$ and $0 \leq z \leq 20$, particularly $40 \leq x \leq 55$, $40 \leq y \leq 55$ and $0 \leq z \leq 10$.

A particularly preferred embodiment of the copolymer to be incorporated in the low refractive layer is one represented by the general formula 8.

Formula 8

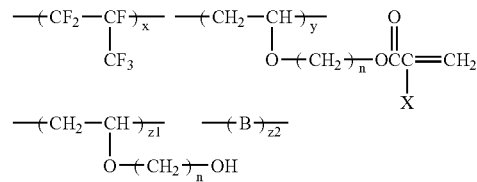

In the general formula 8, X, x and y and their preferred range are as defined in the general formula 2.

The suffix n represents an integer of from not smaller than 2 to not greater than 10, preferably from not smaller than 2 to not greater than 6, particularly from not smaller than 2 to not greater than 4.

The group B represents a repeating unit derived from arbitrary vinyl monomer. The repeating unit may be composed of a single composition or a plurality of compositions. Examples of the repeating unit include those listed above with reference to the group A in the general formula 2.

The suffixes z1 and z2 each represent the molar percentage of the respective repeating unit and satisfy the relationship $0 \leqq z1 \leqq 65$ and $0 \leqq z2 \leqq 65$, preferably $0 \leqq z1 \leqq 30$ and $0 \leqq z2 \leqq 10$, particularly $0 \leqq z1 \leqq 10$ and $0 \leqq z2 \leqq 5$.

The copolymer represented by the general formula 2 or 8 can be synthesized by introducing a (meth)acryloyl group into a copolymer containing a hexafluoropropylene component and a hydroxy alkyl vinyl ether component by any of the aforementioned methods.

Preferred examples of the copolymer which can be used in the invention will be given below, but the invention is not limited thereto.

| | x | y | m | L1 | X | Number-average molecular weight Mn (× 10⁴) |
|---|---|---|---|---|---|---|
| P-1 | 50 | 0 | 1 | *—CH₂CH₂O— | H | 3.1 |
| P-2 | 50 | 0 | 1 | *—CH₂CH₂O— | CH₃ | 4.0 |
| P-3 | 45 | 5 | 1 | *—CH₂CH₂O— | H | 2.8 |
| P-4 | 40 | 10 | 1 | *—CH₂CH₂O— | H | 3.8 |
| P-5 | 30 | 20 | 1 | *—CH₂CH₂O— | H | 5.0 |
| P-6 | 20 | 30 | 1 | *—CH₂CH₂O— | H | 4.0 |
| P-7 | 50 | 0 | 0 | — | H | 11.0 |
| P-8 | 50 | 0 | 1 | *—C₄H₈O— | H | 0.8 |
| P-9 | 50 | 0 | 1 | *—(CH₂)₂—O—(CH₂)₂—O— | H | 1.0 |
| P-10 | 50 | 0 | 1 |  | H | 7.0 |
| P-11 | 50 | 0 | 1 | *—CH₂CH₂NH— | H | 4.0 |
| P-12 | 50 | 0 | 1 | 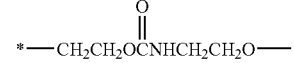 | H | 4.5 |
| P-13 | 50 | 0 | 1 |  | CH₃ | 4.5 |
| P-14 | 50 | 0 | 1 | 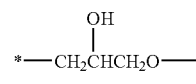 | CH₃ | 5.0 |
| P-15 | 50 | 0 | 1 | 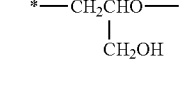 | H | 3.5 |
| P-16 | 50 | 0 | 1 | 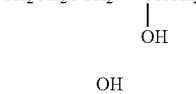 | H | 3.0 |
| P-17 | 50 | 0 | 1 | *—CH₂CH₂OCH₂—CHCH₂O—<br>                              OH | H | 3.0 |
| P-18 | 50 | 0 | 1 | 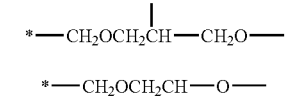 | CH₃ | 3.0 |
| P-19 | 50 | 0 | 1 |  | CH₃ | 3.0 |

-continued

| | | | | | | |
|---|---|---|---|---|---|---|
| P-20 | 40 | 10 | 1 | *—CH$_2$CH$_2$O— | CH$_3$ | 0.6 |

The symbol * indicates the polymer main chain side.

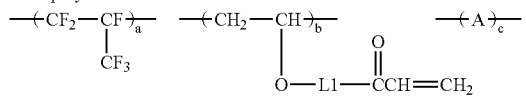

| | a | b | c | L1 | A | Number-average molecular weight Mn (× 10$^4$) |
|---|---|---|---|---|---|---|
| P-21 | 55 | 45 | 0 | *—CH$_2$CH$_2$O—** | — | 1.8 |
| P-22 | 45 | 55 | 0 | *—CH$_2$CH$_2$O—** | — | 0.8 |
| P-23 | 50 | 45 | 5 | *—CH$_2$CH$_2$OC(O)NHCH$_2$CH$_2$O—** | —CH$_2$—CH(OCH$_2$CH$_2$OH)— | 0.7 |
| P-24 | 50 | 45 | 5 | *—CH$_2$CH(OH)—CH$_2$O—** | —CH$_2$—CH(O-CH$_2$-epoxide)— | 4.0 |
| P-25 | 50 | 45 | 5 | *—CH$_2$CH(CH$_2$OH)O—** | —CH$_2$—CH(O-CH$_2$-epoxide)— | 4.0 |
| P-26 | 50 | 40 | 10 | *—CH$_2$CH$_2$O—** | —CH$_2$—CH(OCH$_2$CH$_3$)— | 4.0 |
| P-27 | 50 | 40 | 10 | *—CH$_2$CH$_2$O—** | —CH$_2$—CH(O-cyclohexyl)— | 4.0 |
| P-28 | 50 | 40 | 10 | *—CH$_2$CH$_2$O—** | —CH(CH$_3$)—CH(COOH)— | 5.0 |

The symbol * indicates the polymer main chain side, and the symbol ** indicates the acryloyl group side.

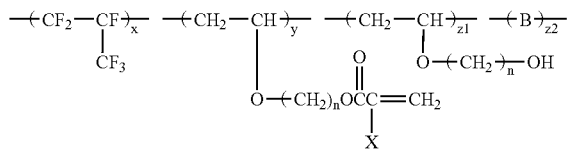

| | x | y | z1 | z2 | n | X | B | Number-average molecular weight Mn (× 10$^4$) |
|---|---|---|---|---|---|---|---|---|
| P-29 | 50 | 40 | 5 | 5 | 2 | H | —CH$_2$—CH(O—CH$_2$CH$_3$)— | 5.0 |
| P-30 | 50 | 35 | 5 | 10 | 2 | H | —CH$_2$—CH(O—C(CH$_3$)$_3$)— | 5.0 |
| P-31 | 40 | 40 | 10 | 10 | 4 | CH$_3$ | —CH$_2$—CH(O—cyclohexyl-H)— | 4.0 |

-continued $$-(CF_2-CF)_{50}- \quad -(Y)_a- \quad -(Z)_b-$$
$$\phantom{-(CF_2-}CF_3$$

| | a | b | Y | Z | Number average molecular weight Mn (× 10$^4$) |
|---|---|---|---|---|---|
| P-32 | 45 | 5 | —CH—CH— with CH$_3$ branch, CO$_2$CH$_2$CHCH$_2$OCC=CH$_2$ with OH and CH$_3$ | —CH—CH— with CH$_3$ branch, COOH | 4.0 |
| P-33 | 40 | 10 | —CH—CH— with CO$_2$H, CONHCH$_2$CH$_2$OCCH=CH$_2$ | —CH—CH— with O=C—O—C=O (anhydride) | 4.0 |

$$-(CH_2-CH)_x- \quad -(CH_2-CH)_y- \quad -(CH_2-CH)_z-$$
$$\phantom{-(}O=C\phantom{xxx}O=C\phantom{xxx}O=C$$
$$\phantom{-(}O-Rf\phantom{xx}O-L-CCH=CH_2\phantom{x}O-L-H$$

| | x | y | z | Rf | L | Number-average molecular weight Mn (× 10$^4$) |
|---|---|---|---|---|---|---|
| P-34 | 60 | 40 | 0 | —CH$_2$CH$_2$C$_8$F$_{17}$-n | *—CH$_2$CH$_2$O— | 11 |
| P-35 | 60 | 30 | 10 | —CH$_2$CH$_2$C$_4$F$_8$H-n | *—CH$_2$CH$_2$O— | 30 |
| P-36 | 40 | 60 | 0 | —CH$_2$CH$_2$C$_6$F$_{12}$H | *—CH$_2$CH$_2$CH$_2$CH$_2$O— | 4.0 |

The symbol * indicates the polymer main chain side.

$$-(CH_2-CH)_x- \quad -(CH_2-CH)_y- \quad -(CH_2-CH)_z-$$
$$\phantom{-(}O-Rf\phantom{xxx}O-(CH_2)_n-OCCH=CH_2\phantom{xx}O-(CH_2)_n-OH$$

| | x | y | z | n | Rf | Number-average molecular weight Mn (× 10$^4$) |
|---|---|---|---|---|---|---|
| P-37 | 50 | 50 | 0 | 2 | —CH$_2$C$_4$F$_8$H-n | 5.0 |
| P-38 | 40 | 55 | 5 | 2 | —CH$_2$C$_4$F$_8$H-n | 4.0 |
| P-39 | 30 | 70 | 0 | 4 | —CH$_2$C$_8$F$_{17}$-n | 10 |
| P-40 | 60 | 40 | 0 | 2 | —CH$_2$CH$_2$C$_8$F$_{16}$H-n | 5.0 |

The synthesis of the aforementioned copolymer to be used in the low refractive layer is carried out by a process which comprises synthesizing a precursor such as hydroxyl group-containing polymer by any polymerization method such as solution polymerization, precipitation polymerization, suspension polymerization, bulk polymerization and emulsion polymerization, and then subjecting the precursor to the aforementioned polymer reaction to introduce a (meth)acryloyl group into the precursor. The polymerization reaction can be effected in a known process such as batchwise process, half-continuous process and continuous process.

Examples of the method for the initiation of polymerization include a method involving the use of a radical polymerization initiator, and a method involving the irradiation with light rays or radiation. For the details of these polymerization methods and polymerization initiating methods, reference can be made to Teiji Tsuruta, "Kobunshi Gosei Hoho (Polymer Synthesis Methods)", revised edition, THE NIKKAN KOGYO SHINBUN LTD., 1971, and Takayuki Otsu and Masayoshi Kinoshita, "Kobunshi Gosei no Jikkenho (Experimental Methods of Polymer Synthesis)", Kagakudojin, 1972, pp. 124-154.

Particularly preferred among the aforementioned polymerization methods is solution polymerization using a radical polymerization initiator. Examples of the solvent to be used in solution polymerization include various organic solvents such as ethyl acetate, butyl acetate, acetone, methyl ethyl ketone, methyl isobutyl ketone, cyclohexanone, tetrahydrofurane, dioxane, N,N-dimethylformamide, N,N-dimethyl acetamide, benzene, toluene, acetonitrile, methylene chloride, chloroform, dichloroethane, methanol, ethanol, 1-propanol, 2-propanol, and 1-butanol. These organic solvents may be used singly or in combination of two or more thereof or in admixture with water.

The polymerization temperature needs to be predetermined in connection with the molecular weight of the polymer thus produced, the kind of the initiator, etc. and may be from not higher than 0° C. to not lower than 100° C. but is preferably from 50° C. to 100° C.

The reaction pressure can be properly predetermined but normally is preferably from 1 to 100 kg/cm$^2$, particularly from 1 to 30 kg/cm$^2$. The reaction time is from about 5 hours to 30 hours.

Preferred examples of the reprecipitating solvent for the polymer thus obtained include isopropanol, hexane, and methanol.

The fluorine-containing polymer for the low refractive layer is added in an amount of from 20% to 95% by weight based on the solid content of the low refractive layer coating composition.

(Inorganic Particulate Material)

The inorganic particulate material to be incorporated in the low refractive layer of the invention will be described hereinafter.

The content of the inorganic particulate material is preferably from 1 mg/m$^2$ to 100 1 mg/m$^2$, more preferably from 5 mg/m$^2$ to 80 mg/m$^2$, even more preferably from 10 mg/m$^2$ to 60 mg/m$^2$. When the content of the inorganic particulate material falls within the above defined range, the resulting low refractive layer exhibits an excellent scratch resistance and less fine surface roughness, making it possible to improve the appearance such as black tone and density and integrated reflectance of the display device.

The inorganic particulate material needs to be incorporated in the low refractive layer and thus has a low refractive index. Examples of the inorganic particulate material employable herein include particulate magnesium fluoride and particulate silica. Particularly preferred among these inorganic particulate materials is particulate silica from the standpoint of dispersion stability and cost. The average particle diameter of the particulate silica is preferably from not smaller than 30% to not greater than 150%, more preferably from not smaller than 35% to not greater than 80%, even more preferably from not smaller than 40% to not greater than 60% of the thickness of the low refractive layer. In some detail, when the thickness of the low refractive layer is 100 nm, the particle diameter of the particulate silica is preferably from not smaller than 30 nm to not greater than 150 nm, more preferably from not smaller than 35 nm to not greater than 80 nm, even more preferably from not smaller than 40 nm to not greater than 60 nm.

When the particle diameter of the particulate silica falls within the above defined range, the resulting low refractive layer exhibits a sufficiently improved scratch resistance and less fine surface roughness, making it possible to improve the appearance such as black tone and density and integrated reflectance of the display device.

The particulate silica may be crystalline or amorphous or may be monodisperse or agglomerated so far as the particle diameter thereof falls within the above defined range. The particulate silica is most preferably spherical but may be amorphous.

For the measurement of average particle diameter of the inorganic particulate material, a coulter counter is employed.

In order to further reduce the rise of the refractive index of the low refractive layer, a hollow particulate silica is preferably used. The refractive index of the hollow particulate silica is preferably from 1.17 to 1.40, more preferably from 1.17 to 1.35, even more preferably from 1.17 to 1.30. The refractive index used herein means the refractive index of the entire particulate material rather than the refractive index of only the shell silica constituting the hollow particulate silica. Supposing that the radius of the bore of the particle is a and the radius of the shell of the particle is b, the percent void x represented by the following numerical formula (XIV) is preferably from 10% to 60%, more preferably from 20% to 60%, most preferably from 30% to 60%.

$$x=(4\pi a^3/3)/(4\pi b^3/3)\times 100 \qquad (XIV)$$

As the refractive index of the hollow particulate silica decreases and the percentage void of the hollow particulate silica rises, the thickness of the shell decreases to lower the strength of the particle. Therefore, particulate materials having a refractive index as low as less than 1.17 cannot be used from the standpoint of scratch resistance.

For the measurement of the refractive index of these hollow particulate silica materials, an Abbe refractometer (produced by ATAGO CO., LTD.) was used.

The aforementioned particulate silica having a particle diameter falling within the above defined range (hereinafter referred to as "large particle size particulate silica") may be used in combination with at least one particulate silica having an average particle diameter of less than 25% of the thickness of the low refractive layer (hereinafter referred to as "small particle size particulate silica").

The small particle size particulate silica can be present in the gap between the large size silica particles and thus can act as a retainer for large particle diameter particulate silica.

In the case where the thickness of the low refractive layer is 100 nm, the average particle diameter of the small particle diameter particulate silica is preferably from not smaller than 1 nm to not greater than 20 nm, more preferably from not smaller than 5 nm to not greater than 15 nm, particularly from not smaller than 10 nm to not greater than 15 nm. The use of such a particulate silica is advantageous in material cost and effect of retainer.

The particulate silica may be subjected to physical surface treatment such as plasma discharge and corona discharge or chemical surface treatment with a surface active agent, coupling agent or the like to enhance the stability of dispersion in the dispersion or coating solution or the affinity for or the bonding properties with the binder component. As the coupling agent there is preferably used an alkoxy metal compound (e.g., titanium coupling agent, silane coupling agent). Particularly effective among these surface treatments is silane coupling treatment.

The aforementioned coupling agent is used as a surface treatment for the inorganic filler in the low refractive layer to effect surface treatment before the preparation of the layer coating solution. The coupling agent is preferably incorporated as additive in the low refractive layer during the preparation of the layer coating solution.

It is preferred that the particulate silica be previously dispersed in the medium to reduce the burden of surface treatment.

What has been described about particulate silica can be applied also to other inorganic particulate materials.

The low refractive layer of the invention preferably comprises at least any of the aforementioned hydrolyzate and partial condensate of organosilane compound incorporated therein to satisfy both the desired anti-reflection properties and scratch resistance. It is particularly preferred that the underlying hard coat layer, too, comprise a sol component incorporated therein.

The content of the aforementioned organosilane sol component, if the layer in which it is incorporated is a surface layer such as relatively thin low refractive layer, is preferably from 0.1% to 50% by weight, more preferably from 0.5% to 20% by weight, most preferably from 1% to 10% by weight based on the total solid content of the layer.

The amount of the organosilane sol component to be incorporated in the low refractive layer is preferably from 5% to 100% by weight, more preferably from 5% to 40% by weight, even more preferably from 8% to 35% by weight, particularly from 10% to 30% by weight based on the fluorine-containing polymer taking into account the development of effect, refractive index, shape of film, shape of film surface, etc.

The various layer-forming coating solutions may each further comprise a dispersion stabilizer incorporated therein for the purpose of inhibiting the agglomeration and precipitation of the inorganic filler. Examples of the dispersion stabilizer employable herein include polyvinyl alcohols, polyvinyl pyrrolidones, cellulose derivatives, polyamides, phosphoric acid esters, polyethers, surface active agents, silane coupling agents, and titanium coupling agents. The previously mentioned silane coupling agents are particularly desirable because they can provide a rigid cured film.

The low refractive layer-forming composition of the invention is normally in the form of liquid and preferably composed of the aforementioned copolymer. The low refractive layer-forming composition of the invention is prepared by dissolving the aforementioned copolymer and optionally various additives and a radical polymerization initiator in a proper solvent. The solid content concentration of the liquid low refractive layer-forming composition is properly predetermined depending on the purpose but is normally from about 0.01% to 60% by weight, preferably from 0.5% to 50% by weight, particularly from 1% to 20% by weight.

As previously mentioned, it is not necessarily advantageous from the standpoint of the hardness of the low refractive layer that the additives such as hardener be incorporated in the low refractive layer. From the standpoint of interfacial adhesion to the high refractive layer, however, a hardener such as polyfunctional (meth)acrylate compound, polyfunctional epoxy compound, polyisocyanate compound, aminoplast, polybasic acid and anhydride thereof or an inorganic particulate material such as silica may be incorporated in the low refractive layer in a small amount. The amount of these additives, if incorporated, is preferably from 0% to 30% by weight, more preferably from 0% to 20% by weight, particularly from 0% to 10% by weight based on the total solid content of the low refractive layer.

For the purpose of providing properties such as stainproofness, water resistance, chemical resistance and slipperiness, a known silicone-based or fluorine-based stainproof agent, lubricant or the like may be incorporated in the low refractive layer in a proper amount. The amount of these additives, if incorporated, is preferably from 0.01% to 20% by weight, more preferably from 0.05% to 10% by weight, particularly from 0.1% to 5% by weight based on the total solid content of the low refractive layer.

Preferred examples of the silicone-based compound employable herein include a compound containing a plurality of dimethylsilyloxy units as repeating units wherein there are contained substituents at least at the end of the compound chain or in its side chains. The compound chain containing dimethylsilyloxy as repeating unit may contain a structural unit other than dimethylsilyloxy. These substituents may be the same or different. There are preferably present a plurality of substituents. Preferred examples of the substituents include acryloyl groups, methacryloyl groups, vinyl groups, aryl groups, cinnamonyl groups, epoxy groups, oxetanyl groups, hydroxyl groups, fluoroalkyl groups, polyoxyalkylene groups, carboxyl groups, and amino groups. The molecular weight of the silicone-based compound is not specifically limited but is preferably 100,000 or less, particularly 50,000 or less, most preferably from 3,000 to 30,000. The content of silicon atom in the silicone-based compound is not specifically limited but is preferably 18.0% by weight or more, particularly preferably from 25.0% to 37.8% by weight, most preferably from 30.0% to 37.0% by weight. Preferred examples of the silicone-based compound include X-22-174DX, X-22-2426, X-22-164B, X-22-164C, X-22-170DX, X-22-176D, X-22-1821 (produced by Shin-Etsu Chemical Co., Ltd.), and FM-0725, FM-7725, DMS-U22, RMS-033, RMS-083, UMS-182 (produced by CHISSO CORPORATION).

As the fluorine-based compound there is preferably used a compound having a fluoroalkyl group. The fluoroalkyl group preferably has from 1 to 20 carbon atoms, more preferably from 1 to 10 carbon atoms, and may have a straight-chain structure [e.g., $-CF_2CF_3$, $-CH_2(CF_2)_4H$, $-CH_2(CF_2)_8CF_3$, $-CH_2CH_2(CF_2)_4H$], a branched structure [e.g., $-CH(CF_3)_2$, $-CH_2CF(CF_3)_2$, $-CH(CH_3)CF_2CF_3$, $-CH(CH_3)(CF_2)_5CF_2H$] or an alicyclic structure (preferably 5-membered or 6-membered ring such as perfluorocyclohexyl group, perfluorocyclopentyl group or alkyl group substituted thereby). The fluoroalkyl group may have an ether bond (e.g., $CH_2OCH_2CF_2CF_3$, $CH_2CH_2OCH_2C_4F_8H$, $CH_2CH_2OCH_2CH_2C_8F_{17}$, $CH_2CH_2OCF_2CF_2OCF_2CF_2H$). A plurality of the fluoroalkyl groups may be incorporated in the same molecule.

The fluorine-based compound preferably further contain substituents contributing to the formation of bond to the low refractive layer or the compatibility with the low refractive layer. These substituents may be the same or different. It is preferred that there be a plurality of these substituents. Preferred examples of these substituents include acryloyl group, methacryloyl group, vinyl group, aryl group, cinnamonyl group, epoxy group, oxetanyl group, hydroxyl group, polyoxyalkylene group, carboxyl group, and amino group. The fluorine-based compound may be used in the form of polymer or oligomer with a fluorine-free compound. The fluorine-based compound may be used without any limitation on the molecular weight. The content of fluorine atoms in the fluorine-based compound is not specifically limited but is preferably 20% by weight or more, particularly from 30 to 70% by weight, most preferably from 40 to 70% by weight. Preferred examples of the fluorine-based compound include R-2020, M-2020, R3833 and M-3833 (produced by DAIKIN INDUSTRIES, Ltd.), and Megafac F-171, Megafac F-172 and Megafac F-179A, Diffenser MCF-300 (produced by DAINIPPON INK AND CHEMICALS, INCORPORATED). However, the invention is not limited to these products.

For the purpose of providing properties such as dustproofing agent and antistatic properties, a dustproofing agent such as known cationic surface active agent and polyoxyalkylene-based compound, antistatic agent or the like may be properly added. Referring to these dustproofing agents and antistatic agents, the aforementioned silicone-based compound or fluorine-based compound may have its structural unit to act partly to perform such a performance. These additives, if any, are preferably added in an amount of from 0.01 to 20% by weight, more preferably from 0.05 to 10 by weight, particularly from 0.1 to 5% by weight based on the total solid content of the low refractive layer-forming composition. Preferred examples of these compounds include Megafac F-150 (produced by DAINIPPON INK AND CHEMICALS, INCORPORATED), and SH-3748 (produced by Toray Dow Coming Co., Ltd.). However, the invention is not limited to these products.

The various coating solutions of the invention are preferably subjected to filtration. For filtration, commonly known various filters may be used. Specific examples of the filter material include polypropylenes, polyesters, nylon, polytetrafluoroethylenes, polyvinylidene fluoride, polysulfones, glass fiber, and stainless steel mesh. For the treatment of organic solvent-based coating solutions, polypropylenes, polyesters, nylon and polytetrafluoroethylenes are preferred. These filters are normally commercially available in the form of cartridge type filter. Examples of the filter material employable herein include a sheet-like surface type filter material through which surface layer the material is filtered, and a depth type filter material having some thickness prepared, e.g., by heat-fusing a fiber-knit fabric, which allows filtration in thickness direction. The depth type filter, which has a greater surface area than the surface type filter, is preferred. Among the depth type filters, filters provided by various filter manufacturers as high precision filtration type are particularly preferred.

For the anti-glare hard coat layer, the light-diffusing layer, the hard coat layer, etc., a polypropylene filter is preferably used. For the low refractive layer, a polypropylene filter or tetrafluoroethylene filter is preferably used. The filtration pore diameter is normally represented by nominal filtration precision or absolute filtration precision. Those having a filtration pore diameter of from about 0.5 µm to 200 µm are known. Most of the coating solutions of the invention contain particles. Therefore, the optimum pore diameter can be selected depending on the passing properties of the particles.

[Method of Producing Optical Film]

The optical film of the invention can be formed by the following method, but the invention is not limited thereto.

Firstly, coating solutions containing components for the various layers are prepared. Subsequently, the coating solution for constituting the hard coat layer is spread over the transparent support using a coating method such as dip coating method, air knife coating method, curtain coating method, roller coating method, wire bar coating method, gravure coating method and extrusion coating method (see U.S. Pat. No. 2,681,294), and then heated and dried. Preferred among these coating methods is gravure coating method because the coating solutions for layers requiring small spread such as layers constituting anti-reflection layer can be spread to a very uniform thickness. Among the gravure coating methods, microgravure coating method is preferred because it provides a high thickness uniformity.

Alternatively, the die coating method may be effected to spread a small amount of coating solution to an extremely high uniformity in thickness. The die coating method involves previous measuring process and thus allows easy control over film thickness. Further, the die coating method causes less evaporation of solvent in the coating zone to advantage. Two or more coating solutions may be simultaneously spread. The simultaneous coating may be carried out using a method as disclosed in U.S. Pat. Nos. 2,761,791, 2,941,898, 3,508,947 and 3,526,528, and Yuji Harasaki, "Coating Engineering", page 253, Asakura Shoten, 1973. Thereafter, the coat layer is irradiated with light or heated so that the monomers for constituting the anti-glare hard coat layer are polymerized to cause curing. Thus, the hard coat layer is formed.

As necessary, the hard coat layer is composed of a plurality of layers. Before the spreading of the anti-glare hard coat layer coating solution, smooth hard coat layer spreading and curing can be effected in the same manner as mentioned above.

Subsequently, the coating solution for forming the low refractive layer is spread over the hard coat layer, and then irradiated with light or heated to form a low refractive layer in the same manner as mentioned above. Thus, the anti-reflection film of the invention can be obtained.

In accordance with the microgravure coating method to be used in the invention, a gravure roll having a diameter of from about 10 mm to 100 mm, preferably from about 20 mm to 50 mm, and having a gravure pattern stamped on the entire circumference thereof disposed under the support is rotated in the direction opposite the conveying direction of the support. At the same time, the extra coating solution is scraped off the surface of the gravure roll by means of a doctor blade. In this manner, a constant amount of the coating solution is transferred to the support to form a coat layer. In this arrangement, at least one layer among the hard coat layer and the low refractive layer containing a fluorine-containing polymer can be spread over one side of the transparent support which is being continuously unwound.

Referring to the conditions for the microgravure coating method, the number of lines in the gravure pattern stamped on the gravure roll is preferably from 50 to 800 per inch, more preferably from 100 to 300 per inch. The depth of the gravure pattern is preferably from 1 µm to 600 µm, more preferably from 5 µm to 200 µm. The rotary speed of the gravure roll is preferably from 3 rpm to 800 rpm, more preferably from 5 rpm to 200 rpm. The conveying speed of the support is preferably from 0.5 to 100 m/min, more preferably from 1 to 50 m/min.

The anti-reflection film of the invention thus formed exhibits a haze of from 3% to 70%, preferably from 4% to 60%, and an average reflectance of 3.0% or less, preferably 2.5% or less at a wavelength of from 450 nm to 650 nm.

When the haze and average reflectance of the anti-reflection film of the invention fall within the above defined range, the resulting display device can be provided with good anti-glare properties and anti-reflection properties without causing the deterioration of transmitted image.

In the case where the anti-reflection film is used in a liquid crystal display device, the anti-reflection film is disposed on the outermost surface of the display with an adhesive layer provided on one side thereof. In the case where the transparent support is a triacetyl cellulose, a triacetyl cellulose is used as a protective film for protecting the polarizing layer in the polarizing plate. Therefore, the anti-reflection film of the invention is preferably used as protective film as it is.

In order to dispose the anti-reflection film of the invention on the outermost surface of a display with a bonding-aid layer provided on one side thereof or use the anti-reflection film of the invention as a protective film for polarizing plate, it is preferred that the anti-reflection film of the invention be subjected to saponification with an outermost layer mainly composed of a fluorine-containing polymer formed thereon to make sufficient bonding. The saponification is carried out by any known method, e.g., dipping the anti-reflection film in an alkaline solution for a proper period of time. It is preferred that the anti-reflection film which has been dipped in the alkaline solution be thoroughly washed with water or dipped in a dilute acid to neutralize the alkaline component so that the alkaline component is not left in the film.

When the anti-reflection film is saponified, the transparent substrate is hydrophilicized on the side thereof opposite the outermost layer of the anti-reflection layer.

The hydrophilicized surface of the transparent substrate is effective for the improvement of the adhesion to the polarizing layer mainly composed of polyvinyl alcohol. Further, the hydrophilicized surface of the transparent substrate can little attract dust in the air. Therefore, dust can difficultly enter the gap between the polarizing layer and the anti-reflection film during bonding to the polarizing layer. Thus, the hydrophilicized surface of the transparent substrate is effective for the prevention of occurrence of point defects due to dust.

The saponification is preferably effected in such a manner that the contact angle of the surface of the transparent substrate on the side thereof opposite the outermost layer with respect to water is 40° or less, more preferably 30° or less, particularly 20° or less.

As a specific method of alkaline saponification there may be selected from the following two methods (1) and (2). The method (1) is advantageous in that it allows processing at the same step as general-purpose triacetyl cellulose film. However, the method (1) can be disadvantageous in that since the anti-reflection film can be saponified up to the anti-reflection layer, the surface of the anti-reflection layer is subjected to alkaline hydrolysis, causing the deterioration of the anti-reflection layer or stain with the saponifying solution, if left. In this case, the method (2) is better, although it requires a special process.

(1) The anti-reflection film which has been provided with an anti-reflection layer on the transparent substrate is dipped in an alkaline solution at least once to saponify the back side thereof.
(2) Before or after the formation of an anti-reflection film on the transparent substrate, an alkaline solution is spread over the anti-reflection film on the side thereof opposite the anti-reflection layer. The anti-reflection film is heated, and then washed with water and/or neutralized to saponify only the back side thereof.

[Use]

A polarizing plate is mainly composed of two sheets of protective film with a polarizing membrane provided interposed therebetween. The optical film of the invention, particularly anti-reflection film, is preferably used as at least one of the two sheets of protective film between which the polarizing membrane is disposed interposed. When the anti-reflection film of the invention acts also as a protective film, the production cost of the polarizing plate can be reduced. Further, when the anti-reflection film of the invention is used as an outermost surface layer, the reflection of external light, etc. can be prevented, making it possible to provide a polarizing plate excellent also in scratch resistance, stainproofness, etc.

As the polarizing layer there may be used a known polarizing layer or a polarizing layer cut out of a polarizing layer of continuous length having an absorption axis which is neither parallel to nor perpendicular to the longitudinal direction. The polarizing layer of continuous length having an absorption axis which is neither parallel to nor perpendicular to the longitudinal direction is prepared by the following method.

This is a polarizing layer stretched by tensing a continuously supplied polymer while being retained at the both ends thereof by a retainer. In some detail, the polarizing layer can be produced by a stretching method which comprises stretching the film by a factor of from 1.1 to 20.0 at least in the crosswise direction in such a manner that the difference in longitudinal progress speed of retainer between at both ends is 3% or less and the direction of progress of film is deflexed with the film retained at the both ends thereof such that the angle of the direction of progress of film at the outlet of the step of retaining both ends of the film with respect to the substantial direction of film stretching is from 20° to 70°. In particular, those obtained under the aforementioned conditions wherein the inclination angle is 45° are preferably used from the standpoint of productivity.

For the details of the method of stretching polymer film, reference can be made to JP-A-2002-86554, paragraphs [0020]-[0030].

It is also preferred that the film other than anti-reflection film among the two sheets of protective films for polarizer be an optical compensation film having an optical compensation layer containing an optically anisotropic layer. The optical compensation film (retardar film) can improve the viewing angle properties of the screen of liquid crystal display device.

As the optical compensation film there may be used one known as such. From the standpoint of enhancement of viewing angle, the optical compensation film disclosed in JP-A-2001-100042 is preferred.

When at least one sheet among the two sheets of protective films satisfies the following relationships (I) and (II), a high effect of improving display as viewed obliquely on the screen of a liquid crystal display device can be exerted to advantage. It is particularly preferred that the transparent support satisfy the following relationships (I) and (II).

$$0 \leq Re(630) \leq 10, \text{ and } |Rth(630)| \leq 25 \quad (I)$$

$$|Re(400)-Re(700)| \leq 10, \text{ and } |Rth(400)-Rth(700)| \leq 35 \quad (II)$$

The anti-reflection film of the invention can be applied to an image display device such as liquid crystal display device (LCD), plasma display panel (PDP), electroluminescence display (ELD) and cathode ray tube display device (CRT). The anti-reflection film of the invention has a transparent support and thus can be bonded to the image display surface of the image display device on the transparent support side thereof.

The anti-reflection film of the invention, if used as one of polarizing layer surface protective films, is preferably used in transmission type, reflection type or semi-transmission type liquid crystal display devices of mode such as twisted nematic (TN), supertwisted nematic (STN), vertical alignment (VA), in-plane switching (IPS) and optically compensated bend cell (OCB).

VA mode liquid crystal cells include (1) liquid crystal cell in VA mode in a narrow sense in which rod-shaped liquid crystal molecules are oriented substantially vertically when no voltage is applied but substantially horizontally when a voltage is applied (as disclosed in JP-A-2-176625). In addition to the VA mode liquid crystal cell (1), there have been provided (2) liquid crystal cell of VA mode which is multi-domained to expand the viewing angle (MVA mode) (as disclosed in SID97, Digest of Tech. Papers (preprint) 28 (1997), 845), (3) liquid crystal cell of mode in which rod-shaped molecules are oriented substantially vertically when no voltage is applied but oriented in twisted multidomained mode when a voltage is applied (n-ASM mode, CAP mode) (as disclosed in Preprints of Symposium on Japanese Liquid Crystal Society Nos. 58 to 59, 1988 and (4) liquid crystal cell of SURVALVAL mode (as reported in LCD International 98).

An OCB mode liquid crystal cell is a liquid crystal cell of bend alignment mode wherein rod-shaped liquid crystal molecules are oriented in substantially opposing directions (symmetrically) from the upper part to the lower part of the liquid crystal cell. A liquid crystal display device comprising a bend alignment mode liquid crystal cell comprises devices disclosed in U.S. Pat. Nos. 4,583,825 and 5,410,422 oriented symmetrically with each other from the upper part to the lower part of the liquid crystal cell. Therefore, the bend alignment mode liquid crystal cell has a self optical compensation capacity. Accordingly, this liquid crystal mode is also called OCB (optically compensated bend) liquid crystal mode. The bend alignment mode liquid crystal display device is advantageous in that it exhibits a high response.

Further, when measured at any of wavelength of 450 nm, 550 nm and 630 nm, the entire system comprising a bend alignment mode liquid crystal cell and a polarizing plate comprising an optically anisotropic layer preferably exhibits optical properties satisfying the following relationship (XV) to exert a high effect of improving display quality as viewed obliquely on the liquid crystal display screen. In particular, the polarizing plate comprising an optical film of the invention as a protective film preferably satisfies the following relationship (XV).

$$0.05<(\Delta n \times d)/(Re \times Rth)<2.0 \qquad (XV)$$

wherein Δn represents the intrinsic birefringence index of the rod-shaped liquid crystal molecule in the liquid crystal cell; d represents the thickness (nm) of the liquid crystal layer in the liquid crystal cell; Re represents the in-plane retardation value of the entire optically anisotropic layer; and Rth represents the thickness direction retardation value of the entire optically anisotropic layer.

In ECB mode liquid crystal cell, rod-shaped liquid crystal molecules are oriented substantially horizontal when no voltage is applied thereto. The ECB mode liquid crystal cell is used mostly as a color TFT liquid crystal display device. For details, reference can be made to many literatures, e.g., "EL, PDP, LCD Displays", Toray Research Center, 2001.

For TV or IPS mode liquid crystal display devices in particular, the use of an optical compensation sheet having a viewing angle expanding effect as one of two sheets of polarizing layer protective film opposite the anti-reflection film of the invention makes it possible to obtain a polarizing plate having both anti-reflection effect and viewing angle expanding effect by the thickness of only one sheet of polarizing plate as disclosed in JP-A-2001-100043.

EXAMPLE

The invention will be further described in the following examples, but the invention is not limited thereto.

Example 1

<Preparation of Support>

(1) Preparation of Cellulose Acylate Solution (a)

A cellulose acylate solution (a) having the following formulation was prepared.

[Composition]: Cellulose acylate solution (a) (unit: parts by weight)

| | |
|---|---|
| Cellulose acylate A (powder having a substitution degree of 2.84, a viscosity-average polymerization degree of 306, a water content of 0.2 wt-%, a viscosity of 315 mPa · s in the form of 6 wt-% dichloromethane solution and an average particle diameter of 1.5 mm with a standard deviation of 0.5 mm) | 100 |
| Methylene chloride (first solvent) | 320 |
| Methanol (second solvent) | 83 |
| 1-Butanol (third solvent) | 3 |
| Plasticizer A (triphenyl phosphate) | 7.6 |
| Plasticizer B (biphenyl diphenyl phosphate) | 3.8 |
| UV agent a: 2(2'-Hydroxy-3',5'-di-tert-butyl phenyl)benzotriazole | 0.7 |
| UV agent b: 2(2'-Hydroxy-3',5'-di-tert-amyl phenyl)-5-chlorobenzotriazole | 0.3 |
| Citric acid ester mixture (mixture of citric acid, monoethyl ester, diethyl ester and triethyl ester) | 0.006 |
| Particulate material (silicon dioxide (particle diameter: 15 nm), Mohs hardness: about 7) | 0.05 |

[Cotton Compound: Cellulose Acetate A Described Below]

The cellulose triacetate A used herein had an acetic acid residue of 0.1% by weight or less, a Ca content of 58 ppm, a Mg content of 42 ppm, a Fe content of 0.5 ppm, a free acetic acid content of 40 ppm and a sulfuric acid ion content of 15 ppm. The degree of substitution in the 6-position acetyl group was 0.91, which is 32.5% of that of all the acetyl groups. The acetone extraction was 8% by weight and the ratio of weight-average molecular weight to number-average molecular weight was 2.5. The yellow index was 1.7. The haze was 0.08. The transparency was 93.5%. Tg (glass transition temperature, measured by DSC) was 160° C. The calorific value of crystallization was 6.4 J/g. The cellulose triacetate A was synthesized from cellulose obtained from cotton as raw material. This will be hereinafter referred to as "cotton TAC".

[Preparation of Cellulose Acylate Solution Dope]

(Dissolution/Filtration of Dope)

Into a 4000 l stainless steel dissolution tank having an agitating blade were charged the aforementioned plurality of solvents in admixture. To the solvent mixture was then gradually added a cellulose acetate powder (flake) with thorough stirring and dispersion to make 2,000 kg. All the solvents used had a water content of 0.5% by weight or less. Firstly, the cellulose acetate powder was dispersed at an agitation shearing rate of 5 m/sec (shear stress: $5 \times 10^4$ kgf/m/sec$^2$) as peripheral speed by a dissolver type eccentric agitating shaft and then at an agitation shearing rate of 1 m/sec (shear stress: $1 \times 10^4$ kgf/m/sec$^2$) as peripheral speed by a central shaft having an anchor blade for 30 minutes. The dispersion began at a temperature of 25° C. The final temperature was 48° C. After the termination of dispersion, the high speed agitation was then suspended. The mixture was then stirred at a peripheral speed of 0.5 m/sec by the anchor blade for 100 minutes to cause the cellulose triacetate flake to expand. The inner pressure of the tank was kept at 0.12 MPa until the termination of expansion. During this procedure, the oxygen concentration in the tank was less than 2 vol-%. Thus, the tank was kept acceptable from the standpoint of explosionproofness. It was further confirmed that the water content in the dope had been 0.5% by weight or less. In the present experiment, the water content in the dope was 0.3% by weight.

The solution thus expanded was heated to 50° C. by a piping with jacket in the tank, and then compressed at 2 MPa so that it was heated to 90° C. to make complete dissolution. The heating time was 15 minutes.

Subsequently, the solution was cooled to 36° C., and then filtered through a filter material having a nominal pore diameter of 8 μm to obtain a dope. During this procedure, the primary filtration pressure was 1.5 Mpa and the secondary filtration pressure was 1.2 Mpa. The filter, housing and piping which are exposed to high temperature were made of hastelloy material having an excellent corrosion resistance equipped with a jacket through which a heat medium for heating is circulated.

(Concentration/Filtration/Defoaming/Additives)

The unconcentrated dope thus obtained was then flushed in a tank at 80° C. and ordinary pressure. The solvent thus evaporated was then isolated and recovered by a condenser. The solid content concentration of the dope thus flushed was 21.8% by weight. The dope was then stirred at a peripheral speed of 0.5 m/sec by an anchor blade attached to the central shaft in the flush tank to undergo defoaming. The temperature of the dope in the tank was 25° C. The average residence time in the tank was 50 minutes. The dope was collected, and then measured for shear viscosity at 25° C. The result was 450 Pa.s at a shear rate of 10 sec$^{-1}$.

Subsequently, the dope was irradiated with weak ultrasonic wave to undergo defoaming. Thereafter, the dope was filtered through a sintered fibrous metal filter having a nominal pore diameter of 10 μm and then through a sintered fibrous filter having a nominal pore diameter of 10 μm while being pressed at 1.5 MPa. The primary pressure at the two filters were 1.5 MPa and 1.2 MPa, respectively. The secondary pressure at the two filters were 1.0 MPa and 0.8 MPa, respectively. The dope thus filtered was then stored in a 2000 l stainless steel stock tank while being adjusted to 36° C. The dope was always stirred at a peripheral speed of 0.3 m/sec by an anchor blade attached to the central shaft in the stock tank. Thus, a cellulose acylate dope (a) was prepared.

(2-1) Solution Casting Method (Band Process)

The aforementioned step of preparing a cellulose acylate solution was followed by a step of casting the dope thus obtained using a band casting machine to prepare a cellulose acylate film from the cellulose acylate solution.

As the metal support (casting band) there was used a band made of stainless steel having a width of 2 m, a length of 56 m (area: 112 m$^2$) and a band thickness of 1.5 mm. The metal support had an arithmetic average roughness (Ra) of 0.006 μm, a maximum height (Ry) of 0.06 μm and a ten-point average roughness (Rz) of 0.009 μm. The measurement of arithmetic average roughness (Ra), maximum height (Ry) and ten-point average roughness (Rz) were conducted according to JIS B 0601. The band used was of a type driven by two drums. During this procedure, the tension of the band was adjusted to 1.5×10$^4$ kg/m. The relative difference in speed between band and drum was 0.01 m/min or less. The band driving speed varied by 0.5% or less.

As the drum in the casting zone there was used one having facilities that allow the circulation of a heat transfer medium (coolant) to cool the support. The other drum was arranged such that a heat transfer medium flows to supply heat for drying. The temperature of the two heat transfer media were 5° C. (casting die side) and 40° C. The temperature of the central part of the support shortly before casting was 15° C. The temperature difference between the two ends of the support was 6° C. or less.

Neither of the drum and the band should have surface defects. Thus, a support having no pinholes having a size of 30 μm or more, one or less pinholes having a size of from 10 μm to 30 μm per m$^2$ and two or less pinholes having a size of 10 μm or less per m$^2$ was used.

Three layers of dope were then co-casted through a casting die over the support. During the co-casting, the flow rate of dope was adjusted such that the complete thickness of the three layers were 4 μm, 73 μm and 3 μm, totaling 80 μm, respectively, in the downward order ad the casting width was 1,700 mm.

(Cast Drying)

The temperature of the casting chamber in which the aforementioned casting die, support and other members are provided was kept at 35° C. The dope which had been casted over the band was dried firstly by blowing drying air in a parallel flow. During drying, the total coefficient of heat transfer from drying air to dope was 24 kcal/m2.hr.° C. The temperature of drying air was 135° C. at the upstream side and 140° C. at the downstream on the upper part thereof. The temperature of the lower part of the band was 65° C. The saturated temperature of the various gases were each close to −8° C. The oxygen concentration in the drying atmosphere on the support was kept at 5 vol-%. The air for keeping the oxygen concentration at 5 vol-% was replaced by nitrogen gas.

For 5 seconds after casting, a wind shield was used to prevent drying air from hitting directly the dope so that the static pressure change in the vicinity of the casting die was kept at not greater than ±1 Pa. When the solvent proportion in the dope reached 50% by weight as calculated in terms of dried amount, the dope was then peeled off the casting support in the form of film. The surface temperature of the film thus peeled was 15° C. The rate of drying on the support was 60% by weight per minute on the average as calculated in terms of dried amount of solvent.

(2-2) Solution Casting Method (Drum Process)

As a step of casting the aforementioned cellulose acylate solution to prepare a cellulose acylate film from the cellulose acylate solution there was effected also a method involving the use of a drum as metallic support.

As the support there was used a stainless steel drum having a width of 2.5 m. The drum used had been polished such that the surface roughness thereof reached 0.05 μm or less. The drum was made of SUS316 to have sufficient corrosion resistance and strength. The total thickness unevenness of the drum was 0.5% or less. The drum was rotated with a precision of 0.2 mm or less as calculated in terms of rotation unevenness. The drum, too, had an average surface of 0.01 μm or less. The drum was plated with chromium to have sufficient hardness and durability. The vertical change of position of the surface of the support with the rotation of the drum directly under the casting die was kept at 200 μm or less. The support was disposed in a casing having a wind pressure vibration inhibiting unit. Three layers of dope were then co-casted through the die over the support. The drum was rotated with a precision of 0.2 mm or less as calculated in terms of rotation unevenness. The drum, too, had an average surface of 0.01 μm or less. The drum was plated with chromium to have sufficient hardness and durability.

The temperature of the central part of the support shortly before casting was −5° C. The temperature difference between the two ends of the support was 2° C. or less.

Neither of the drum and the band should have surface defects. Thus, a support having no pinholes having a size of 30 μm or more, one or less pinholes having a size of from 10 μm to 30 μm per m$^2$ and two or less pinholes having a size of 10 μm or less per m$^2$ was used.

(Cast Drying)

The temperature of the casting chamber in which the aforementioned casting die, support and other members are provided was kept at 25° C. The dope which had been casted over the band was dried firstly by blowing drying air in a parallel flow. During drying, the total coefficient of heat transfer from drying air to dope was 24 kcal/m2.hr.° C. The temperature of drying air was 40° C. The saturated temperature of the various gases were each close to −8° C. The oxygen concentration in the drying atmosphere on the support was kept at 5 vol-%. The air for keeping the oxygen concentration at 5 vol-% was replaced by nitrogen gas.

After casting, when the proportion of solvent in the dope reached 300% by weight or less as calculated in terms of dried amount, the dope was then peeled off the casting support in the form of film. During this procedure, the peel tension was 10 kgf/m. The peeling conditions were predetermined such that the film can be properly peeled off the casting support at a peeling rate (peeling roll draw) of from 100.1% to 110% relative to the speed of the support. The surface temperature of the film thus peeled was 15° C. The rate of drying on the support was 60% by weight per minute on the average as calculated in terms of dried amount of solvent.

After casting by the aforementioned band or drum method, the film thus peeled was then conveyed over a transferring zone comprising a number of rollers. The transferring zone had three rollers and was kept at a temperature of 40° C. The film which was being transferred over the rollers in the transferring zone was given a tension of from 16 N to 160 N.

(3) Tenter Transfer, Drying, Trimming

The film thus peeled was then transferred over the drying zone in the tenter with the both ends thereof fixed by the clip attached to the tenter so that it was dried with drying air. The interior of the tenter had three zones at which the temperature of drying air was 90° C., 100° C. and 110° C., respectively, in the downstream order. The drying air was composed of −10° C. saturated gas. The average drying rate in the tenter was 120 wt-%/min as calculated in terms of dried amount of solvent. The conditions were adjusted such that the amount of residual solvents in the film at the outlet of the tenter was from 7% to 10% by weight. In the tenter, the film was conveyed while being crosswise stretched. The percent width expansion was 103% relative to 100% of the width of the film which had been conveyed into the tenter. The draw ratio of the film between the peeling roller and the tenter inlet (tenter driving draw) was 102%. The actual difference in draw ratio in the tenter between the tenter gripping portion and the position 10 mm or more apart therefrom was 10% or less. The difference in draw ratio between two arbitrary points 20 mm apart from each other was 5% or less. The proportion of the length fixed by the tenter in the base end was 90%. The film was conveyed while the tenter clip was cooled such that the temperature thereof was not higher than 50° C.

The film was then trimmed 50 mm at both ends thereof by an NT type cutter within 30 seconds after leaving the tenter outlet. The concentration of oxygen in the drying atmosphere in the tenter portion was kept at 5 vol-%. The air for keeping the oxygen concentration at 5 vol-% was replaced by nitrogen gas. Prior to being high-temperature dried in the roller conveyance zone described later, the film was pre-heated in a predrying zone in which 100° C. drying air had been supplied. During this procedure, the amount of residual solvents in the film was almost 5% by weight.

(4) Post-drying

The trimmed cellulose triacetate film thus obtained was then high-temperature dried in the roller drying zone. The roller drying zone had four divisions. These divisions were each supplied with a 130° C. drying air. During this procedure, the film was dried at a roller conveyance tension of 100 N/width for about 7 minutes until the residual solvent amount eventually reached 0.3% by weight. Thus, a cellulose acylate film (length: 3,500 m; width: 1,300 mm; average thickness: 80 μm) was produced as a transparent support.

For the measurement of the thickness of the film, a contact process thickness gauge (produced by Anritsu Corporation) was used. In order to examine the thickness unevenness of the film, the film was sampled for measurement on five points equally apart crosswise from each other over 1 m and five points equally apart longitudinally from each other over 1 m, totaling 25 points. The measurement was conducted each on these points.

The crosswise curling of Inventive Sample 1 of the cellulose acylate film thus produced by was −4.5/m.

(5) Evaluation of Cellulose Acylate Film (Measurement of Amount of Plasticizer)

For the measurement of the plasticizer on the surface of the film, a Type FT-IR Magma 760 ATR-IR apparatus (produced by Nicolet Corporation) was used to effect ATR-IR measurement. In some detail, as a crystal for reflection measurement there was used KRS-5. The measurement was effected at an incidence angle of 45°. For the determination of the amount of plasticizer, the intensity of plasticizer absorption peak (1,390 cm$^{-1}$) and cellulose acylate absorption peak (1,470 cm$^{-1}$) were measured. The ratio of the intensity of the two peaks was then determined. The content of the plasticizer was determined on the calibration curve of samples having different plasticizer/cellulose acylate ratios.

For the measurement of the total amount of plasticizer in the film, the same method as mentioned above was used. In some detail, the transmission IR in the thickness direction of the film was determined.

In order to examine the distribution of plasticizer in the film, the film was sampled for measurement on five points equally apart crosswise from each other over 1 m and five points equally apart longitudinally from each other over 1 m, totaling 25 points. The measurement was conducted each on these points.

(Flexibility of Film)

For the comprehensive evaluation of the flexibility of the film, the film was measured for handleability, workability, tear strength, etc.

A: Soft

B: Somewhat soft

C: Fairly flexible

D: Somewhat hard and brittle

E: Hard and brittle (6) Results of Evaluation of Cellulose Acylate Film

Inventive Samples 1 to 13 and Comparative Samples 1 to 3 were prepared in the same manner as mentioned above except that the amount of plasticizer in the cellulose acylate solution, the casting method, post-drying conditions, etc. were changed as set forth in Table 1. Comparative Sample 3 is the same as Sample 1 except that the conveyance speed of the support was doubled. The term "support surface" as used herein is meant to indicate the surface in contact with the metallic support during casting. The term "air surface" as used herein is meant to indicate the surface opposite the metallic support.

As a result, the amount of plasticizer on the surface was changed by changing the amount of the plasticizer to be charged. During this procedure, when the amount of the plasticizer to be charged was 0%, the amount of he plasticizer on the surface was 0%, but the resulting film exhibited a poor flexibility and thus was not suitable for the support of the invention. Referring to the casting method, the drum casting method, which involves a shorter time required to peel the film off the metallic support during casting, can reduce the amount of the plasticizer on the support surface side having a good flatness. Further, Samples 10 and 11, which are obtained under high post-drying conditions, can have a lower plasticizer content on the surface thereof than in the entire film.

TABLE 1

| Example No. | Cellulose acylate solution | Proportion of plasticizer in charged solid content | Casting method | Post-drying conditions | Surface on which inventive spreading is effected | Surface plasticizer content | Range of surface plasticizer content | Surface plasticizer content variation | Plasticizer content in entire film | Film Flexibility | Ave. Thickness | Thickness range | Thickness variation |
|---|---|---|---|---|---|---|---|---|---|---|---|---|---|
| Inventive Sample 1 | a | 10% | Band | 130° C.-8 min | Support side | 13.5% | 10.8%-16.2% | ±20% | 10% | C | 80 µm | 76 µm-84 µm | ±5% |
| Inventive Sample 2 | a | 10% | Band | 130° C.-8 min | Air side | 6.5% | 5.5%-7.5% | ±15% | 10% | C | | | |
| Inventive Sample 3 | b | 12% | Band | 130° C.-8 min | Support side | 15.5% | 12.4%-18.6% | ±20% | 12% | C | 80 µm | 76 µm-84 µm | ±5% |
| Inventive Sample 4 | b | 12% | Band | 130° C.-8 min | Air side | 8.5% | 7.2%-9.8% | ±15% | 12% | C | | | |
| Comparative Sample 1 | c | 18% | Band | 130° C.-8 min | Support side | 21.5% | 16.1%-26.9% | ±25% | 15% | B | 80µm | 76µm-84µm | ±5% |
| Inventive Sample 5 | c | 18% | Band | 130° C.-8 min | Air side | 14.5% | 11.6%-17.4% | ±20% | 15% | B | | | |
| Inventive Sample 6 | d | 6% | Band | 130° C.-8 min | Support side | 9.5% | 8.0%-11.0% | ±15% | 6% | C | 80µm 84µm | 76µm- | ±5% |
| Inventive Sample 7 | d | 6% | Band | 130° C.-8 min | Air side | 3.0% | 2.7%-3.3% | ±10% | 6% | C | | | |
| Inventive Sample 8 | e | 4% | Band | 130° C.-8 min | Support side | 7.5% | 6.3%-8.7% | ±15% | 4% | D | 80µm | 76µm-84µm | ±5% |
| Inventive Sample 9 | e | 4% | Band | 130° C.-8 min | Air side | 1.5% | 1.3%-1.7% | ±10% | 4% | D | | | |
| Comparative Sample 2 | f | 0% | Band | 130° C.-8 min | Support side | 0.0% | 0.0% | ±0% | 0% | E | 80µm | 76µm-84µm | ±5% |
| Inventive Sample 10 | a | 10% | Drum | 140° C.-7 min | Support side | 6.9% | 5.8%-8.0% | ±15% | 10% | C | 80µm 83µm | 77µm- | ±4% |
| Inventive Sample 11 | a | 10% | Drum | 140° C.-7 min | Air side | 6.5% | 5.5%-7.5% | ±15% | 10% | C | | | |
| Inventive Sample 12 | a | 10% | Drum | 90° C.-7 min | Support side | 11.0% | 8.8%-13.2% | ±20% | 10% | C | 80µm | 77µm-83µm | ±4% |
| Inventive Sample 13 | a | 10% | Drum | 90° C.-7 min | Air side | 10.0% | 8.5%-9.8% | ±15% | 10% | C | | | |
| Comparative Sample 3 | a | 10% | Band | 130° C.-4 min | Support side | 11.0% | 8.8%-13.2% | ±20% | 10% | C | 80µm | 75µm-85µm | ±6% |

(7) Preparation and Evaluation of Inventive Samples 51 to 66 and Comparative Samples 51 to 54 of Anti-reflection Film Spread Over Cellulose Acylate Film (Synthesis of Perfluoroolefin Copolymer (1))

Perflurooolefin Copolymer (1)

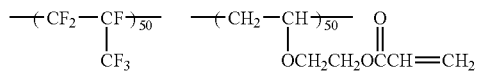

(The ratio 50:50 is by mol)

Into a 100 ml stainless steel autoclave with agitator were charged 40 ml of ethyl acetate, 14.7 g of hydroxyethyl vinyl ether and 0.55 g of dilauroyl peroxide. The air in the system was evacuated and replaced by nitrogen gas. 25 g of hexafluoropropylene (HFP) was introduced into the autoclave. The mixture was then heated to 65° C. When the temperature in the autoclave reached 65° C., the pressure in the autoclave was 5.4 kg/cm². The reaction lasted with the temperature kept at the same value. When the pressure reached 3.2 kg/cm², heating was then suspended so that the mixture was allowed to cool. When the inner temperature reached room temperature, the unreacted monomers were then driven out of the system. The autoclave was then opened to withdraw the reaction solution. The reaction solution thus obtained was poured into large excess of hexane. The solvent was then removed by decantation to withdraw the polymer thus precipitated. The polymer was then dissolved in a small amount of ethyl acetate, and then twice reprecipitated from hexane to fully remove the residual monomers. After drying, 28 g of a polymer was obtained. Subsequently, 20 g of the polymer was dissolved in 100 ml of N,N-dimethylacetamide. To the solution was then added dropwise 11.4 g of acrylic acid chloride under ice cooling. The mixture was then stirred at room temperature for 10 hours. To the reaction solution was then added ethyl acetate. The reaction solution was washed with ethyl acetate. The resulting organic phase was extracted, and then concentrated. The resulting polymer was then reprecipitated from hexane to obtain 19 g of a perfluoroolefin copolymer (1). The polymer thus obtained exhibited a refractive index of 1.421.

(Synthesis of Fluororesin-containing Polymer (FP-8))

Into a reaction vessel equipped with an agitator and a reflux condenser were charged 39.93 g of 1H,1H,7H-dodecafluoroheptyl acrylate, 1.1 g of 2,2'-azobis isobutyrate and 30 g of 2-butanone. The reaction mixture was then heated to 78° C. in a nitrogen atmosphere for 6 hours to complete reaction. The weight-average molecular weight of the reaction product was $2.9 \times 10^4$.

(Preparation of Sol a-1)

Into a reaction vessel equipped with an agitator and a reflux condenser were charged 120 parts by weight of methyl ethyl ketone, 100 parts by weight of acryloyl oxypropyl trimethoxysilane "KBM-5103" (produced by Shin-Etsu Chemical Co., Ltd.) and 3 parts by weight of diisopropoxy aluminum ethyl acetoacetate. The mixture was then stirred. To the mixture were then added 30 parts by weight of deionized water. The reaction mixture was allowed to undergo reaction at 60° C. for 4 hours, and then allowed to cool to room temperature to obtain a sol a-1. The compound thus obtained had a weight-average molecular weight of 1,600. The proportion of components having a molecular weight of from 1,000 to 20,000 in the oligomer components or high components was 100%. The condensation α calculated by the numerical formula (IX) from $^{29}$Si-NMR measurements was 0.88. The gas chromatography of the reaction product showed that none of the acryloyloxy propyl trimethoxysilane as raw material remained.

(Preparation of Sol a-2)

Into a reaction vessel equipped with an agitator and a reflux condenser were charged 70 parts by weight of acryloyloxy propyl trimethoxy silane, 30 parts by weight of methyl trimethoxysilane "KBM-13" (produced by Shin-Etsu Chemical Co., Ltd.) and 3 parts by weight of diisopropoxy aluminum ethyl acetoacetate. The mixture was then stirred. To the mixture were then added 30 parts by weight of deionized water. The reaction mixture was allowed to undergo reaction at 40° C. for 30 minutes to obtain a sol a-2. The compound thus obtained had a weight-average molecular weight of 800. The proportion of components having a molecular weight of from 1,000 to 20,000 in the oligomer components or high components was 30%. The condensation α by $^{29}$Si-NMR was 0.56. The gas chromatography of the reaction product showed that the acryloyloxy propyl trimethoxysilane and methyl trimethoxysilane as raw materials remained was 10.0% or less.

(Preparation of Sol b)

A sol b was obtained in the same manner as the aforementioned sol formulation a-1 except that 6 parts of acetyl acetone were added to the reaction mixture which had been allowed to cool to room temperature.

(Formulation of Anti-glare Hard Coat Layer Coating Solution A-1)

| | |
|---|---|
| PET-30 | 50.0 g |
| Irgacure 184 | 2.0 g |
| SX-350 (30%) | 1.7 g |
| Particulate crosslinked acryl-styrene (30%) | 13.3 g |
| FP-8 | 0.75 g |
| KBM-5103 | 10.0 g |
| Toluene | 38.5 g |

The aforementioned coating solution was filtered through a polypropylene filter having a pore diameter of 30 μm to prepare an anti-glare hard coat layer coating solution A-1.

(Formulation of Anti-glare Hard Coat Layer Coating Solution A-2)

An anti-glare hard coat layer coating solution A-2 was prepared in the same manner as the coating solution A-1 except that 10.0 g of KBM-5103 for anti-glare hard coat layer coating solution A-1 was replaced by 10.0 g of sol a-2.

(Formulation of Anti-glare Hard Coat Layer Coating Solution A-3)

| | |
|---|---|
| PET-30 | 42.3 g |
| Irgacure 184 | 2.0 g |
| SX-350 (30%) | 23.3 g |
| Particulate crosslinking acryl-styrene (30%) | 7.5 g |

-continued

| | |
|---|---|
| FP-8 | 0.07 g |
| KBM-5103 | 9.3 g |
| Toluene | 86.1 g |

(Formulation of Anti-glare Hard Coat Layer Coating Solution A-4)

| | |
|---|---|
| PET-30 | 42.4 g |
| Irgacure 184 | 1.6 g |
| SX-350 (30%) | 23.8 g |
| Particulate crosslinking acryl-styrene (30%) | 3.8 g |
| FP-8 | 0.1 g |
| X-40-2671 G | 10.5 g |
| Toluene | 76.9 g |

The above-described coating solutions were filtered through a polypropylene filter having a pore size of 30 μm to prepare coating solutions A-3 and A-4 for glare-protective hard coat layers, respectively.

(Formulation of Light-diffusing Layer Coating Solution B-1)

| | |
|---|---|
| DeSolite Z7404 | 285 g |
| DPHA | 285 g |
| KBM-5103 | 28 g |
| KE-P150 (30%) | 90 g |
| MXS-300 (30%) | 35 g |
| FP-8 | 0.12 g |
| MEK | 17 g |
| MIBK | 60 g |

The aforementioned coating solution was filtered through a polypropylene filter having a pore diameter of 30 μm to prepare a light-diffusing layer coating solution B-1.

(Formulation of Light-diffusing Layer Coating Solution B-2)

A light-diffusing layer coating solution B-2 was prepared in the same manner as the coating solution B-1 except that 28 g of KBM-5103 for the light-diffusing layer coating solution B-1 was replaced by 28.0 g of sol a-2.

(Formulation of Light-diffusing Layer Coating Solution B-3)

A light-diffusing layer coating solution B-3 was prepared in the same manner as the coating solution B-1 except that 28 g of KBM-5103 for the light-diffusing layer coating solution B-1 was replaced by 28.0 g of X-40-2671G.

The compounds used will be described below.

PET-30: Mixture of pentaerythritol triacrylate and pentaerythritol tetraacrylate [produced by Nippon Kayaku Corporation]

Irgacure 184: Polymerization initiator [produced by Ciba Specialty Chemicals Co., Ltd.]

SX-350: average particle diameter: 3.5 μm; particulate crosslinked polystyrene [refractive index: 1.60, produced by Soken Chemical & Engineering Co., Ltd., 30% toluene dispersion; used after 20 minutes of dispersion at 10,000 rpm by a polytron dispersing machine]

Particulate crosslinked acryl-styrene: average particle diameter: 3.5 μm [refractive index: 1.55, produced by Soken Chemical & Engineering Co., Ltd., 30% toluene dispersion; used after 20 minutes of dispersion at 10,000 rpm by a polytron dispersing machine]

KBM-5103: silane coupling agent (acryloxylpropyl trimethoxysilane) [produced by Shin-Etsu Chemical Co., Ltd.]

X-40-2671G: silane coupling agent oligomer [Manufactured by Shin-Etsu Chemical Co., Ltd.]

Desolate Z7404: particulate $ZrO_2$-containing hard coat agent [refractive index: 1.62, solid content concentration: 60.4%, produced by JSR]

DPHA: mixture of dipentaerythritol pentaacrylate and dipentaerythritol hexaacrylate [produced by Nippon Kayaku Corporation]

KEP-150: particulate silica having an average particle diameter of 1.5 μm [refractive index: 1.46, produced by NIPPON SHOKUBAI CO., LTD., 30% MEK dispersion, used after 20 minutes of dispersion at 10,000 rpm by a polytron dispersing machine]

MXS-300: particulate PMMA having an average particle diameter of 3 μm [refractive index: 1.49, produced by Soken Chemical & Engineering CO., LTD., 30% MIBK dispersion, used after 20 minutes of dispersion at 10,000 rpm by a polytron dispersing machine]

MXS-150H: particulate PMMA having an average particle diameter of 1.5 μm [refractive index: 1.49, produced by NIPPON SHOKUBAI CO., LTD., 30% MIBK dispersion, used after 20 minutes of dispersion at 10,000 rpm by a polytron dispersing machine]

(Preparation of Optical Film)

Using a microgravure roll having a gravure pattern of 110 lines per inch and a depth of 65 μm and a diameter of 50 mm and a doctor blade, the anti-glare hard coat layer coating solution A-1 was spread over a cellulose acylate film prepared as support by casting in the aforementioned examples which was being unwound from roll at a conveyance speed of 30 m/min. The coat layer was then dried at 60° C. for 150 seconds. Using a 160 W/cm air-cooled metal halide lamp (produced by EYE GRAPHICS CO., LTD.), the coat layer was then cured by irradiating with ultraviolet rays at an illuminance of 400 mW and a dose of 200 $mJ/cm^2$ to form an anti-glare hard coat layer (thickness: 6 m) which was then wound. During this procedure, the spread of the coating solution was about 20 $cc/m^2$.

Similarly, using a microgravure roll having a gravure pattern of 135 lines per inch and a depth of 60 μm and a diameter of 50 mm and a doctor blade, the light-diffusing layer coating solution B-1 was spread over the anti-glare hard coat layer at a gravure roll rotary speed of 45 rpm and a conveying speed of 20 m/min. The coat layer was then dried at 100° C. for 40 seconds. Using a 160 W/cm air-cooled metal halide lamp (produced by EYE GRAPHICS CO., LTD.) while the air in the system was being purged with nitrogen, the coat layer was cured by irradiating with ultraviolet rays at an illuminance of 400 mW and a dose of 250 $mJ/cm^2$ to form a light-diffusing layer (thickness: 3.4 μm) as a functional layer which was then wound. During this procedure, the spread of the coating solution was about 20 $cc/m^2$.

(8) Evaluation and Coat Sample and Its Results

[Evaluation of Coat Surface Conditions (Drying Unevenness, Streak)]

The coat products thus obtained were each evaluated for coat surface conditions. For evaluation of coat surface conditions, the film thus prepared was observed under the transmission of light from a three-wavelength fluorescent lamp. Further, a black sheet or a polarizing plate blackened with crossed Nicols was stuck to the back side of the film. The film was then examined for reflection of three-wavelength fluorescent lamp or artificial sunlamp.

For the evaluation of the coat products, the transmission process is severely conducted. However, optical films which pass A to C in the reflection process are acceptable.

The evaluation results were judged according to the following criterion.

A: Little or no unevenness observed;
B: Slight unevenness observed but no special problem;
C: Some unevenness observed but acceptable;
D: Unevenness observed and unacceptable; and
E: Considerably great unevenness observed

[Evaluation of Planarity Attributed to Film Substrate]

The coat products were each then evaluated for surface waviness of from 1 mm to 2 mm pitch as planarity attributed to cellulose acylate film. Those tolerable are defined to be G (good), those somewhat offensive are defined to be F (fair), and those intolerable are defined to be P (poor).

(Preparation and Evaluation of Coat Product)

The results of coat products of Inventive Samples 51 to 66 and Comparative Samples 51 to 54 are set forth in Table 2. In Inventive Samples 51 to 56 and Comparative Sample 51, when the variation of the amount of surface plasticizer varies much, the unevenness in coating worsens. When the variation of amount of surface plasticizer is more than ±25%, the coat products are intolerable in examination under transmitted light and reflected light. Comparative Sample 52, which varies much in variation of thickness, is intolerable in examination under transmitted light and reflected light. Inventive Samples 57 and 58, which are obtained by spreading the coating solution over the air side of the surface, which varies little in the variation of amount of surface plasticizer, exhibit good coat surface conditions but show some unevenness due to planarity of cellulose acylate of the transparent support.

Inventive Samples 59 to 66, which are formed by the coating solution B-1, exhibit similar tendency.

It was found in a reflective test that the conditions of coated surfaces have been improved by use of coating solutions A-2, A-3, and A-4 in place of A-1, and B-2 and B-3 in place of B-1.

TABLE 2

| Sample No. | Cellulose acylate film | Side on which inventive spreading is effected | Variation of amount of surface plasticizer | Coating solution | Coat surface conditions | | Planarity |
| | | | | | Under transmitted light | Under reflected light | |
| --- | --- | --- | --- | --- | --- | --- | --- |
| Inventive Sample 51 | Inventive Sample 8 | Support side | ±15% | A-1 | B | A | G |

TABLE 2-continued

| Sample No. | Cellulose acylate film | Side on which inventive spreading is effected | Variation of amount of surface plasticizer | Coating solution | Coat surface conditions Under transmitted light | Coat surface conditions Under reflected light | Planarity |
|---|---|---|---|---|---|---|---|
| Inventive Sample 52 | Inventive Sample 6 | Support side | ±15% | A-1 | A | A | G |
| Inventive Sample 53 | Inventive Sample 1 | Support side | ±20% | A-1 | C | C | G |
| Inventive Sample 54 | Inventive Sample 3 | Support side | ±20% | A-1 | C | C | G |
| Comparative Sample 51 | Comparative Sample 1 | Support side | ±25% | A-1 | E | E | G |
| Inventive Sample 55 | Inventive Sample 10 | Support side | ±15% | A-1 | A | A | G |
| Inventive Sample 56 | Inventive Sample 12 | Support side | ±20% | A-1 | B | B | G |
| Inventive Sample 57 | Inventive Sample 2 | Air side | ±15% | A-1 | A | A | F |
| Inventive Sample 58 | Inventive Sample 7 | Air side | ±10% | A-1 | A | A | F |
| Comparative Sample 52 | Comparative Sample 3 | Support side | ±20% | A-1 | E | D | P |
| Inventive Sample 59 | Inventive Sample 8 | Support side | ±15% | B-1 | A | A | G |
| Inventive Sample 60 | Inventive Sample 6 | Support side | ±15% | B-1 | A | A | G |
| Inventive Sample 61 | Inventive Sample 1 | Support side | ±20% | B-1 | B | A | G |
| Inventive Sample 62 | Inventive Sample 3 | Support side | ±20% | B-1 | C | C | G |
| Comparative Sample 53 | Comparative Sample 1 | Support side | ±25% | B-1 | E | E | G |
| Inventive Sample 63 | Inventive Sample 10 | Support side | ±15% | B-1 | A | A | G |
| Inventive Sample 64 | Inventive Sample 12 | Support side | ±20% | B-1 | A | A | G |
| Inventive Sample 65 | Inventive Sample 2 | Air side | ±15% | B-1 | A | A | F |
| Inventive Sample 66 | Inventive Sample 7 | Air side | ±10% | B-1 | A | A | F |
| Comparative Sample 54 | Comparative Sample 3 | Support side | ±20% | B-1 | E | D | P |

(9) Preparation of Anti-reflection Film

To the aforementioned Inventive Samples 55 and 63 were each added a low refractive layer.

(Formulation of Low Refractive Layer Coating Solution A)

| Opstar JTA-113 (6%) | 13.0 g |
|---|---|
| MEK-ST-L (30%) [average particle diameter: 45 nm] | 1.3 g |
| Sol a-1 | 10.6 g |
| MEK | 5.0 g |
| Cyclohexanone | 0.6 g |

The aforementioned coating solution was then filtered through a polypropylene filter having a pore diameter of 1 μm to prepare a low refractive layer coating solution A.

(Preparation of Low Refractive Layer Coating Solution B)

A low refractive layer coating solution B was prepared in the same manner as the coating solution A, including the added amount, except that 1.95 g of a hollow silica dispersion (refractive index: 1.31, average particle diameter: 60 nm, solid content concentration: 20%) was used instead of colloidal silica dispersion.

(Formulation of Low Refractive Layer Coating Solution C)

| Opstar JN-7228 (6%) | 15.0 g |
|---|---|
| MEK-ST (30%) [average particle diameter: 15 nm] | 0.6 g |
| MEK-ST-L (30%) [average particle diameter: 45 nm] | 0.8 g |
| Sol a-1 | 0.4 g |
| MEK | 3.0 g |
| Cyclohexanone | 0.6 g |

The coating solution was then filtered through a polypropylene filter having a pore diameter of 1 μm to prepare a low refractive layer coating solution C.

(Formulation of Low Refractive Layer Coating Solution D)

| Perfluoroolefin copolymer (1) | 15.2 g |
|---|---|
| MEK-ST-L (30%) [average particle diameter: 45 nm] | 1.4 g |
| Reactive silicone X-22-164B | 0.3 g |
| Sol a-1 | 7.3 g |
| Irgacure 907 | 0.76 g |
| MEK | 301 g |
| Cyclohexanone | 9.0 g |

The coating solution was then filtered through a polypropylene filter having a pore diameter of 5 μm to prepare a low refractive layer coating solution D.

(Preparation of Low Refractive Layer Coating Solution E)

A low refractive layer coating solution E was prepared in the same manner as the coating solution D, including the added amount, except that 1.95 g of a hollow silica dispersion (refractive index: 1.31, average particle diameter: 60 nm, solid content concentration: 20%) was used instead of colloidal silica dispersion.

The compounds used will be further described below.

Opstar JN: 80 g of a fluorine-containing polymer as described in Example 1 of JP-A-11-189621, 15 g of Simer 303 as a hardening agent (Nippon Scitic Industries Co.), 2.0 g of Catalyst 4050 as a hardening catalyst (Nippon Scitic Industries Co.) were dissolved in MEK so as to form a 6% solution. [refractive index 1.42, concentration of solid content 6%, Manufactured by JSR Co.]

Opstar JTA: A fluorine-containing polymer where HBVE in Example 1 of JP-A-11-189621 are increased in amount. [refractive index 1.44, concentration of solid content 6%, Manufactured by JSR Co.]

P-1: Perfluoroolefin copolymer (1)

MEK-ST: colloidal silica dispersion [average particle diameter: 10 mm to 20 nm; solid content concentration: 30%, produced by NISSAN CHEMICAL INDUSTRIES, LTD.]

MEK-ST-L: colloidal silica dispersion [size: different from that of MEK-ST; average particle diameter: 45 nm; solid content concentration: 30%, produced by NISSAN CHEMICAL INDUSTRIES, LTD.]

Hollow silica: KBM-5103 surface-modified hollow silica sol [percent surface modification on silica: 30 wt-%; CS-60IPA; refractive index: 1.31; average particle diameter: 60 nm; shell thickness: 10 nm; solid content concentration: 20.0%, produced by CATALYSTS & CHEMICALS IND. CO., LTD.]

X-22-164B: reactive silicone [produced by Shin-Etsu Chemical Co., Ltd.]

Irgacure 907 [produced by Ciba Specialty Chemicals Co., Ltd.]

(2) Spreading of Low Refractive Layer

Using a microgravure roll having a gravure pattern of 200 lines per inch and a depth of 30 μm and a diameter of 50 mm and a doctor blade, the low refractive layer coating solutions set forth in Table 3 were each spread over the aforementioned cellulose acylate film having functional layers provided thereon which was being unwound from roll at a gravure roll rotary speed of 30 rpm and a conveyance speed of 15 m/min. The coat layer was dried at 120° C. for 150 seconds, and then dried at 140° C. for 8 minutes. Using a 240 W/cm air-cooled metal halide lamp (produced by EYE GRAPHICS CO., LTD.), the coat layer was then cured by irradiating with ultraviolet rays at an illuminance of 400 mW/cm$^2$ and a dose of 900 mJ/cm$^2$ to form a low refractive layer having a thickness of 100 nm. The resulting anti-reflection film was then wound.

Thus, Inventive Samples 101 to 108 having a low refractive layer provided thereon were prepared.

(Saponification of Anti-reflective Layer)

These anti-reflection films were each then subjected to the following treatment.

A 1.5 mol/l aqueous solution of sodium hydroxide was prepared. The aqueous solution was then kept at 55° C. A diluted 0.01 mol/l aqueous solution of sulfuric acid was prepared. The diluted aqueous solution of sulfuric acid was then kept at 35° C. The anti-reflection films thus prepared were each dipped in the aforementioned aqueous solution of sodium hydroxide for 2 minutes, and then dipped in water so that the aqueous solution of sodium hydroxide was thoroughly washed away. Subsequently, the anti-reflection films were each dipped in the aforementioned diluted aqueous solution of sulfuric acid for 1 minute, and then dipped in water so that the diluted aqueous solution of sodium hydroxide was thoroughly washed away. The samples were each then thoroughly dried at 120° C.

Thus, saponified anti-reflection films (Inventive Sample Nos. 101 to 108) were prepared.

(Evaluation of Anti-reflection Film)

These anti-reflection films thus obtained were each then evaluated for the following properties. The results are set forth in Table 3.

(1) Average Reflectance

Using a spectrophotometer (produced by JASCO), the sample was measured for spectral reflectance at an incidence angle of 5° in the wavelength range of from 380 nm to 780 nm. The results were then converted in terms of integrating sphere average reflectance in the wavelength range of from 450 nm to 650 nm.

(2) Evaluation of Steel Wool Scratch Resistance

Using a rubbing tester, the sample was subjected to rubbing test under the following conditions.

Evaluation atmosphere: 25° C., 60% RH

Rubbing material: A steel wool (Grade No. 0000, produced by Nippon Steel Wool Co., Ltd.) was wound on the forward end (1 cm×1 cm) of a tester which comes in contact with the sample, and then fixed with a band.

Moving distance (one way): 13 cm; rubbing speed: 13 cm/sec; load: 500 g/cm$^2$

Contact area at forward end: 1 cm×1 cm; number of times of rubbing: 10 (reciprocal)

The sample thus rubbed was coated with an oil-based black ink, and then visually observed for scratch on the rubbed area under light. The results were then evaluated according to the following criterion.

E: No scratch observed even when examined very carefully;

G: Slight scratch observed when examined very carefully;

GF: Slight scratch observed;

F: Middle level of scratch observed; and

FP~P: Scratch observed at a glance (3) Evaluation of Wet Swab Rubbing Resistance A swab was fixed to the rubbing forward end of a rubbing tester. The sample was fixed with a clip at the both upper and lower ends thereof in a flat dish. The sample and the swab were then dipped in 25° C. water at room temperature (25° C.). The sample was then subjected to rubbing test at a load of 500 g. The number of times of rubbing was varied. The rubbing conditions are as follows.

Rubbing distance (one way): 1 cm;

Rubbing speed: approx. two reciprocating motions/sec

The sample thus rubbed was then observed for number of times of rubbing required for exfoliation. The results were then evaluated for the following criterion.

P: Exfoliated at 0 to 10 reciprocating motions;

PF: Exfoliated at 10 to 30 reciprocating motions;

F: Exfoliated at 30 to 50 reciprocating motions;

GF: Exfoliated at 50 to 100 reciprocating motions;

G: Exfoliated at 100 to 150 reciprocating motions; and

E: Not exfoliated even at 150 reciprocating motions

The results are set forth in Table 3. In accordance with the invention, an anti-reflection film having excellent surface conditions and a high scratch resistance can be obtained at a high productivity.

TABLE 3

| Sample No. | Cellulose acylate film | Side at which inventive spreading is effected | Functional layer coating solution | Low refractive layer coating solution | % Average reflectance | Steel wool resistance | Wet swab rubbing resistance |
| --- | --- | --- | --- | --- | --- | --- | --- |
| Inventive Sample 101 | Inventive Sample 10 | Surface of support | A-1 | A | 1.7 | G | G |
| Inventive Sample 102 | Inventive Sample 10 | Surface of support | A-1 | B | 1.5 | G | G |
| Inventive Sample 103 | Inventive Sample 10 | Surface of support | A-1 | D | 1.7 | E | G |
| Inventive Sample 104 | Inventive Sample 10 | Surface of support | A-1 | E | 1.5 | E | G |
| Inventive Sample 105 | Inventive Sample 10 | Surface of support | B-1 | C | 1.2 | GF | G |
| Inventive Sample 106 | Inventive Sample 10 | Surface of support | B-1 | B | 1.2 | G | G |
| Inventive Sample 107 | Inventive Sample 10 | Surface of support | B-1 | D | 1.4 | G | G |
| Inventive Sample 108 | Inventive Sample 10 | Surface of support | B-1 | E | 1.2 | G | G |

Samples were prepared in the same manner as Inventive Samples 101 to 108 except that the sol b was used instead of the sol a-1 to be incorporated in the organosilane for low refractive layer coating solution. The resulting coating solutions exhibited a better storage stability and a higher adaptability to continuous spreading.

Samples were prepared in the same manner as Inventive Samples 104 and 108 except that 10 g of a mixture of dipentaerythritol pentaacrylate and dipentaerythritol hexaacrylate (DPHA, produced by Nippon Kayaku Corporation) was added to the low refractive layer coating solution E. These samples were each then spread to prepare anti-reflection films. The anti-reflection films exhibited a remarkably enhanced scratch resistance.

Example 2

A PVA film was dipped in an aqueous solution of 2.0 g/l of iodine and 4.0 g/l of potassium iodide at 25° C. for 240 seconds. The PVA film was dipped in a 10 g/l aqueous solution of boric acid at 25° C. for 60 seconds, introduced into a tenter stretching machine having a form shown in FIG. 2 disclosed in JP-A-2002-86554 where it was then stretched by a factor of 5.3. The tenter was bent as shown in FIG. 2 with respect to the stretching direction. Thereafter, the width of the film was kept constant. The film was dried in a 80° C. atmosphere, and then detached from the tenter. The difference in conveyance speed between the right and left tenter clips was less than 0.05%. The angle of the central line of the film thus introduced with respect to the central line of the film to be fed to the subsequent step was 46°. |L1−L2| was 0.7 mm. W was 0.7 m. Thus, |L1−L2| was equal to W. The substantial stretching direction Ax-Cx at the tenter outlet was obliquely disposed at an angle of 45° to the central line 22 of the film to be fed to the subsequent step. No wrinkles and film deformation were observed at the tenter outlet.

The film thus treated was then stuck to a saponified Fujitac film produced by Fuji Photo Film Co., Ltd. (cellulose triacetate; retardation value: 3.0 nm) with a 3% aqueous solution of PVA (PVA-117H, produced by KURARAY CO., LTD.), and then dried at 80° C. to obtain a polarizing plate having an effective width of 650 mm. The resulting polarizing plate had an absorption axis disposed obliquely at 45° to longitudinal direction. The polarizing plate exhibited a transmission of 43.7% and a percent polarization of 99.97% at 550 nm. The polarizing plate was then cut into a size of 310 mm×233 mm. As a result, a polarizing plate having a percent area efficiency of 91.5% and comprising an absorption axis disposed obliquely at 45° to the size thereof was obtained.

Subsequently, the various inventive film samples (saponified) of Example 1 were each stuck to the aforementioned polarizing plate to obtain an anti-glare anti-reflection polarizing plate. This polarizing plate was then used to prepare a liquid crystal display device having an anti-reflection layer disposed on the outermost layer. The liquid crystal display device thus obtained showed no reflection of external light and hence an excellent contrast. This liquid crystal display device also exhibited anti-glare properties and thus caused no remarkable reflection of image and exhibited an excellent viewability.

Example 3

A triacetyl cellulose film having a thickness of 80 μm which had been dipped in a 1.5 mol/l 55° C. aqueous solution of NaOH for 2 minutes, neutralized and rinsed (TAC-TD80U, produced by Fuji Photo Film Co., Ltd.) was stuck to the both sides of each of polarizers prepared by adsorbing iodine by the various inventive back-saponified triacetyl cellulose films of Example 1 and then stretching the films. The laminates were each then protected to prepare polarizing plates. The polarizing plates thus prepared were each then used to replace the viewing side polarizing plate in the liquid crystal display device (D-BEF, polarization separation film having a polarization selective layer produced by Sumitomo 3M Co., Ltd., disposed interposed between the backlight and the liquid crystal cell) in a note personal computer having a transmission type TN liquid crystal display device incorporated therein in such an arrangement that the anti-reflection layer was disposed on the outermost layer side. As a result, a display device showing little reflection of background and having a very high display quality was obtained.

Example 4

As the protective film on the liquid crystal cell side of the polarizing plate on the viewing side and on the liquid crystal cell side of the polarizing plate on the backlight side of a transmission type TN liquid crystal cell having the inventive sample of Example 1 stuck thereto there was used a viewing angle expansion film (Wide View Film Ace, produced by Fuji Photo Film Co., Ltd.). As a result, a liquid crystal display device having an excellent contrast in the daylight, a very horizontal and vertical viewing angle, an extremely excellent viewability and a high display quality was obtained.

Inventive Samples 104 to 108 (light-diffusing layer coating solution B-1) exhibited a scattered light intensity of 0.06% at an angle of 30° with respect to the incidence angle of 0°. With the light diffusing properties, the liquid crystal display device exhibited a raised viewing angle in the downward direction in particular and an improved yellowish tint. For comparison, films were prepared in the same manner as Inventive Samples 104 to 108 except that the light-diffusing layer coating solution B was freed of particulate crosslinked PMMA and particulate silica. These films exhibited substantially 0% at an angle of 30° with respect to the incidence angle of 30° and hence no rise of downward viewing angle and no improvement of yellowish tin.

Example 5

A cellulose acylate having an acetyl substitution degree of 2.94 was used. An optical anisotropy depressant A-19 and a wavelength dispersion adjustor UV-102 were used in an amount of 49.3% and 7.6% based on the cellulose acylate, respectively. The mixture was subjected to film formation in the same manner as in Example 1 to prepare a cellulose acylate film sample 201 having a thickness of 80 μm. The film thus obtained exhibited a retardation Re as thoroughly small as −1.0 nm (negative because it is a slow axis in TD direction) and a thickness direction retardation Rth as thoroughly small as −2.0 nm. The cellulose acylate film sample was used as a transparent support for protective film for the cell side protective film of the two sheets of protective films for polarizer. The sample of Example 1 of the invention was used as a protective film for polarizer. The sample was then evaluated in the form of liquid crystal display device disclosed in Example 1 of JP-A-10-48420, optically anisotropic layer containing a discotic liquid crystal molecule disclosed in Example 1 of JP-A-9-26572, aligned layer coated with polyvinyl alcohol, VA type liquid crystal display device disclosed in FIGS. 2 to 9 of JP-A-2000-154261 and OCB type liquid crystal display device disclosed in FIGS. 10 to 15 of JP-A-2000-154261. In all these evaluations, good contrast viewing angle properties were obtained.

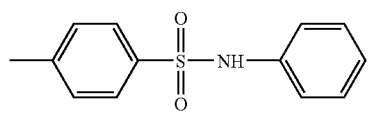

A-19

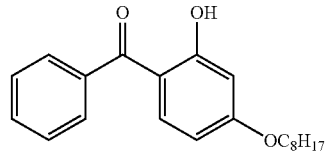

UV-102

Example 6

The inventive sample of Example 1 was stuck to the surface glass sheet of an organic EL display device with an adhesive. As a result, a display device having inhibited reflection on the surface of the glass sheet and a high viewability was obtained.

Example 7

The sample of Example 1 was used to prepare a polarizing plate with one-sided anti-reflection film. A λ/4 sheet was stuck to the side of the polarizing plate opposite the anti-reflection layer. The polarizing plate was then stuck to the surface glass sheet of an organic EL display device. The resulting display device showed no surface reflection and no reflection of interior of the surface glass and hence an extremely high viewability.

The invention provides a good quality optical film having little coating defects such as coating streak and drying unevenness. The invention also provides a method of forming an optical film with a good stability of coating solution and little harmfulness and environmental burden of coating solvent and coating defects such as coating streak and drying unevenness.

The entire disclosure of each and every foreign patent application from which the benefit of foreign priority has been claimed in the present application is incorporated herein by reference, as if fully set forth.

What is claimed is:

1. An optical film comprising:
   a transparent support;
   a surface plasticizer in the surface of the transparent support; and
   at least one functional layer provided on the transparent support,
   wherein an unevenness in thickness of the transparent support is not greater than ±5% from an average thickness of the transparent support, and
   an unevenness in an amount of the surface plasticizer in the surface of the transparent support on the functional layer side thereof is not greater than ±20% from an average residual amount of the surface plasticizer.

2. The optical film as defined in claim 1,
   wherein the unevenness in thickness of the transparent support is not greater than ±5% from the average thickness of the transparent support over a range in the longitudinal direction of not smaller than 1 m and in the crosswise direction of not smaller than 1 m, and
   the unevenness in the amount of the surface plasticizer in the surface of the transparent support on the functional layer side thereof is not greater than ±20% from the average residual amount of the surface plasticizer over a range in the longitudinal direction of not smaller than 1 m and in the crosswise direction of not smaller than 1 m.

3. The optical film as defined in claim 1,
wherein the average thickness of the transparent support is from not smaller than 20 μm to not greater than 120 μm.

4. The optical film as defined in claim 1,
wherein the transparent support is cellulose triacetate.

5. The optical film as defined in claim 1,
wherein the at least one functional layer is a low refractive layer and has anti-reflection properties.

6. The optical film as defined in claim 1,
wherein the at least one functional layer is formed by a coating solution comprising a solvent capable of partially dissolving or swelling the transparent support.

7. The optical film as described in claim 1,
wherein the at least one functional layer comprises at least one of hydrolysate of organosilane and/or partial condensate thereof represented by general formula 1:

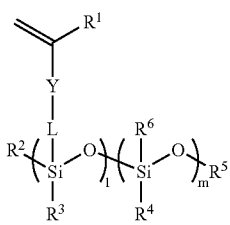

General Formula 1 in the formula 1, $R^1$ represents a hydrogen atom, a methyl group, a methoxy group, an unsubstituted alkoxycarbonyl group, a cyano group, a fluorine atom, or a chlorine atom;

Y represents a single bond, —COO—, —CONH—, or —O—;

L represents a divalent connecting chain;

$R^2$ to $R^4$ each independently represent a halogen atom, a hydroxyl group, an unsubstituted alkoxy group, or an unsubstituted alkyl group;

$R^5$ represents a hydrogen atom or an unsubstituted alkyl group;

$R^6$ represents a substituted or unsubstituted alkyl group, or a substituted or unsubstituted aryl group;

l represents a number meeting the expression l=100−m, and m represents a number of 0 to 50;

wherein, the hydrolysates and/or their partial condensates may be hydrolysates and/or their partial condensates of plural mixtures of the compounds represented by general formula 1.

8. A polarizing plate comprising
two sheets of protective films for a polarizer,
wherein an optical film defined in claim 1 is used as one of the two sheets of the protective films.

9. An image display device comprising:
a display; and
an anti-reflection film defined in claim 5 provided on the outermost surface of the display.

10. An image display device comprising:
a display; and
a polarizing plate defined in claim 8 provided on the outermost surface of the display.

* * * * *